US012664880B2

(12) United States Patent
Maclean et al.

(10) Patent No.: US 12,664,880 B2
(45) Date of Patent: Jun. 23, 2026

(54) ENCODING OR DECODING COMMUNICATION DATA

(71) Applicant: Raptor Data Limited, Aberdeen (GB)

(72) Inventors: Colin Sinclair Maclean, Aberdeen (GB); Ibrahim Budiarjo, Aberdeen (GB); Gordon Cowie, Inverurie (GB)

(73) Assignee: Raptor Data Limited, Aberdeen Aberdeen (GB)

( * ) Notice: Subject to any disclaimer, the term of this patent is extended or adjusted under 35 U.S.C. 154(b) by 0 days.

(21) Appl. No.: 18/863,247

(22) PCT Filed: May 5, 2023

(86) PCT No.: PCT/GB2023/051207
§ 371 (c)(1),
(2) Date: Nov. 5, 2024

(87) PCT Pub. No.: WO2023/218176
PCT Pub. Date: Nov. 16, 2023

(65) Prior Publication Data
US 2025/0308376 A1      Oct. 2, 2025

(30) Foreign Application Priority Data

May 9, 2022      (GB) ....................................... 2206769
Nov. 23, 2022      (GB) ....................................... 2217518

(51) Int. Cl.
*G08C 17/02* (2006.01)
*E21B 47/12* (2012.01)
*H04L 1/00* (2006.01)
(52) U.S. Cl.
CPC ............ *G08C 17/02* (2013.01); *H04L 1/0002* (2013.01); *H04L 1/0009* (2013.01); *H04L 1/0042* (2013.01); *E21B 47/12* (2013.01)

(58) Field of Classification Search
CPC ......... G08C 17/02; E21B 47/12; E21B 47/14; E21B 47/16; H04L 1/0002; H04L 1/0009; H04L 1/0042
See application file for complete search history.

(56) References Cited

U.S. PATENT DOCUMENTS 8,666,528 B2 *    3/2014   Harkness ......... H04N 21/44222
                                                                 725/18
9,941,977 B2 *    4/2018   Getreuer ................ H04B 11/00
(Continued)

FOREIGN PATENT DOCUMENTS

CN        103036841 A       4/2013
CN        114124246 A       3/2022
(Continued)

OTHER PUBLICATIONS

Bamidele Adebisi et al, "Uniformly distributed hopping pattern for MMFSK in power line communications", Power Line Communications and Its Applications, 2008. ISPLC 2008. IEEE International Symposium on, IEEE, Piscataway, NJ, USA, Apr. 2, 2008 (Apr. 2, 2008), p. 244-248.
(Continued)

*Primary Examiner* — Franklin D Balseca
(74) *Attorney, Agent, or Firm* — Banner & Witcoff, Ltd.

(57)      ABSTRACT
A method of decoding a received communication signal is provided. The method may comprising converting the received communication signal to the frequency domain to provide frequency domain data. The method may further comprise combining amplitudes of one or more selected frequency components of the frequency domain data, the one or more frequency components being selected according to a predefined communication symbol comprising one or more selected frequency tones corresponding to the one or more selected frequency components. The method may further comprise detecting the predefined communication
(Continued)

1000

1010 — Convert communication signal to the frequency domain

1020 — Combine amplitudes of one or more selected frequency components

1030 — Detect communication symbol symbol in the received communication signal depending on the combined amplitudes of the one or more selected frequency components of the frequency domain data.

20 Claims, 25 Drawing Sheets

(56)                    References Cited

U.S. PATENT DOCUMENTS

| 11,115,731 | B1 * | 9/2021 | Wild | H04J 13/0022 |
|---|---|---|---|---|
| 11,898,440 | B2 * | 2/2024 | Maclean | H04L 27/103 |
| 2014/0064387 | A1 | 3/2014 | Bonicatto et al. | |

FOREIGN PATENT DOCUMENTS

| KR | 20000002049 | A | 1/2000 |
|---|---|---|---|
| WO | 2005004429 | A1 | 1/2005 |
| WO | 2018196954 | A1 | 11/2018 |
| WO | 2022105588 | A1 | 5/2022 |

OTHER PUBLICATIONS

Won Yong-Yuk et al, "Simultaneous visible LED wireless transmission of discrete multitone and on-off keying signal using a statistical adaptive equalizer", Jun. 1, 2021 (Jun. 1, 2021), vol. {0} 53, No. {0} 6.

Thomas Hosman et al, "Design and Characterization of an MFSK-Based Transmitter/Receiver for Ultrasonic Communication Through Metallic Structures", IEEE Transactions on Instrumentation and Measurement, IEEE, USA, vol. {0} 60, No. {0} 12, Dec. 1, 2011 (Dec. 1, 2011), p. 3767-3774.

Sipal V et al, "Multi-tone frequency shift keying for ultrawideband wireless communications", IET Communications, the Institution of Engineering and Technology, GB, vol. {0} 6, No. {0} 10, Jul. 3, 2012 (Jul. 3, 2012), p. 1170-1178.

Mar. 29, 2023 (GB) Search Report—App. 2206769.8.

Aug. 7, 2023 (PCT) International Search Report and Written Opinion—App. PCT/GB2023/051207.

* cited by examiner

100

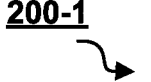
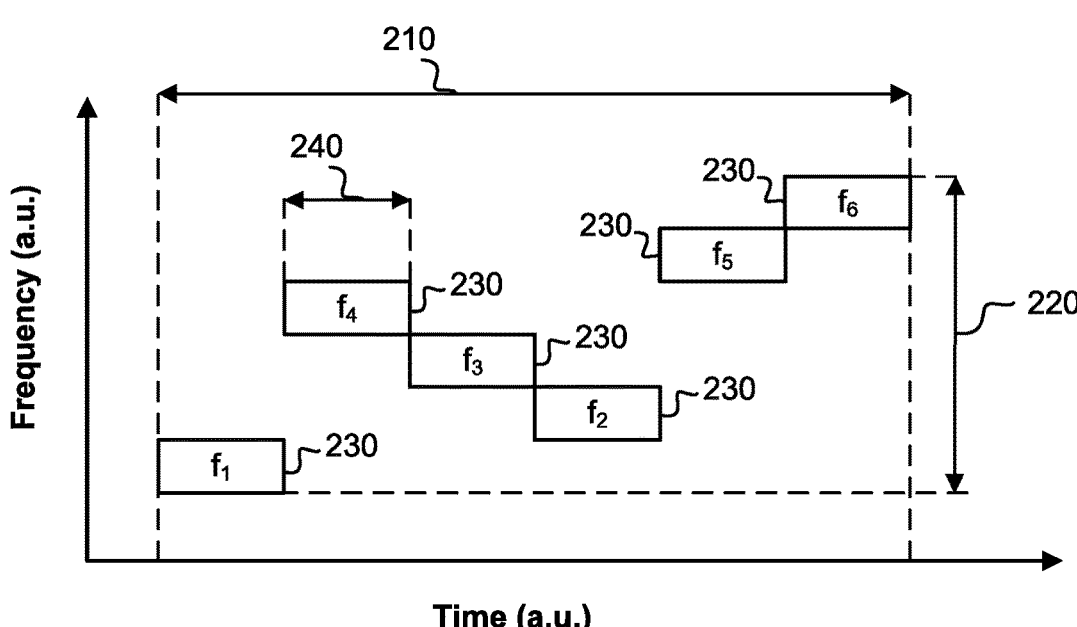
FIG 2a
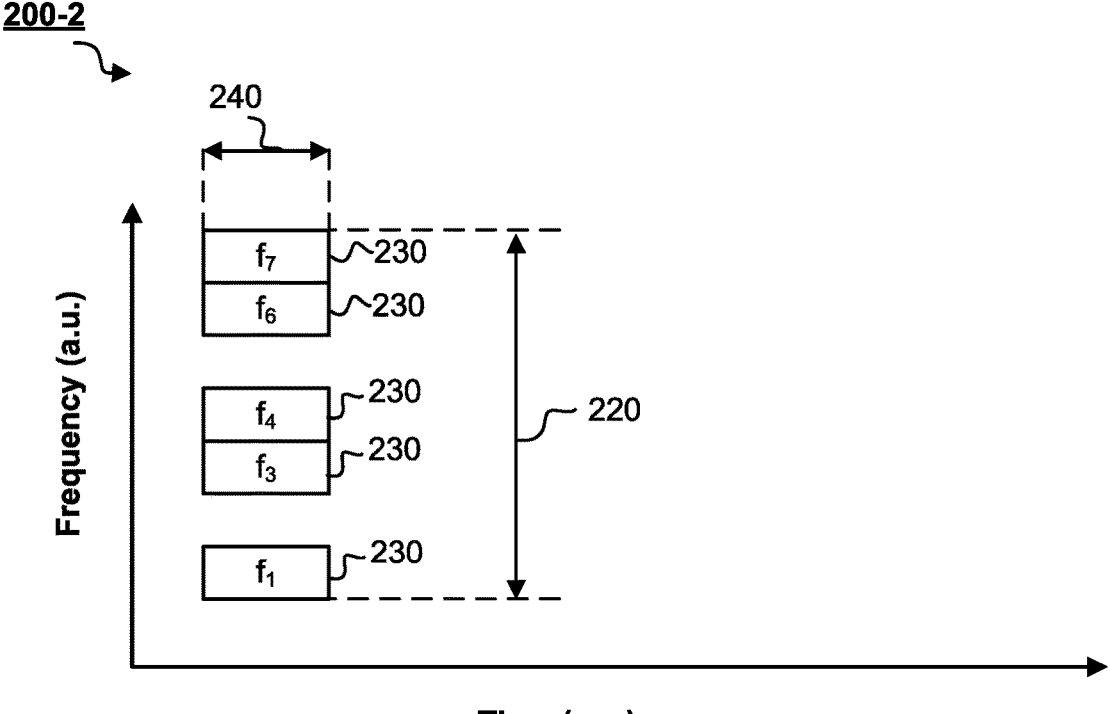
FIG 2b

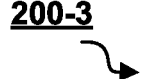
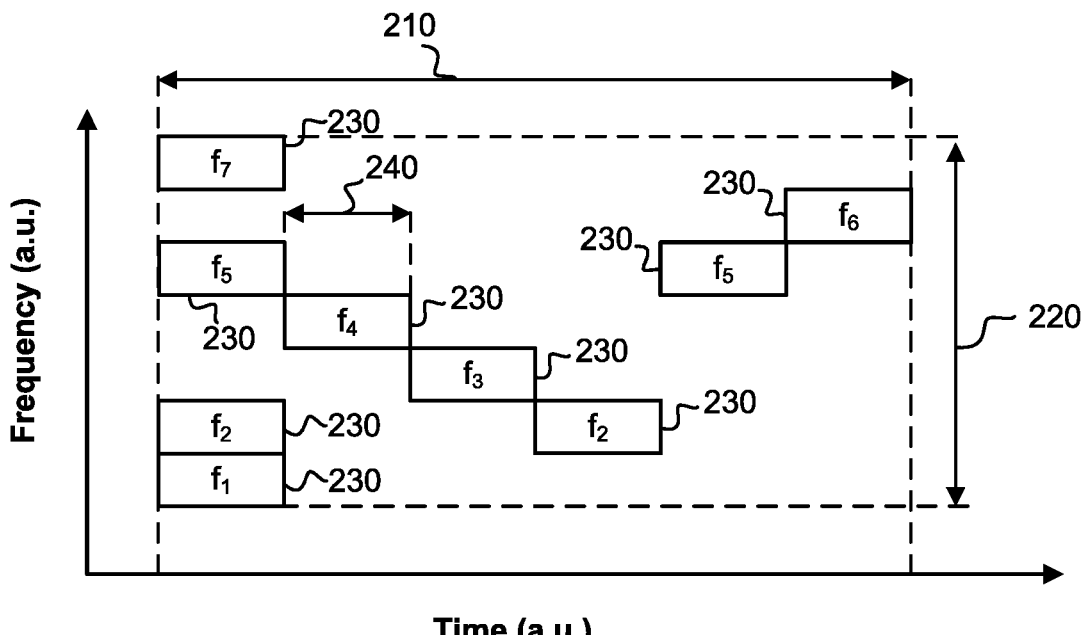
FIG 2c

Time

| | | | | | | |
|---|---|---|---|---|---|---|
| Symbol 1 | f11 | f12 | f13 | f14 | f15 | f16 |
| Symbol 2 | f21 | f22 | f23 | f24 | f25 | f26 |
| Symbol 3 | f31 | f32 | f33 | f34 | f35 | f36 |
| Symbol 4 | f41 | f42 | f43 | f44 | f45 | f46 |
| Symbol 5 | f51 | f52 | f53 | f54 | f55 | f56 |
| Symbol 6 | f61 | f62 | f63 | f64 | f65 | f66 |
| Symbol 7 | f71 | f72 | f73 | f74 | f75 | f76 |
| Symbol 8 | f81 | f82 | f83 | f84 | f85 | f86 |

FIG 4

Detection Time Window 1
Pick-up 0 Passband 0 Symbol 0

| | | | | | |
|---|---|---|---|---|---|
| added | 4119.565430 0.015836 | to acc_bin 0 | from spectral Bin 167 | giving 4119.565430 | from $f_1$ |
| added | 0.015836 | to acc_bin 1 | from spectral Bin 164 | giving 0.015836 | from $f_2$ |
| added | 0.008388 | to acc_bin 2 | from spectral Bin 161 | giving 0.008388 | from $f_3$ |
| added | 0.004419 | to acc_bin 3 | from spectral Bin 158 | giving 0.004419 | from $f_4$ |
| added | 0.003569 | to acc_bin 4 | from spectral Bin 155 | giving 0.003569 | from $f_5$ |
| added | 0.009616 | to acc_bin 5 | from spectral Bin 152 | giving 0.009616 | from $f_6$ |
| added | 0.012303 | to acc_bin 6 | from spectral Bin 149 | giving 0.012303 | from $f_7$ |
| added | 0.003324 | to acc_bin 7 | from spectral Bin 146 | giving 0.003324 | from $f_8$ |

Accumulator
4119.565430 0.015836 0.008388 0.004419 0.003569 0.009616 0.012303 0.000000
Result0 0.003324 Passband 0 Pickup 0 Symbol 0

Detection Time Window 2
Pick-up 0 Passband 0 Symbol 0

| | | | | | |
|---|---|---|---|---|---|
| added | 4119.697754 | to acc_bin 0 | from spectral Bin 164 | giving 8239.263672 | from $f_2$ |
| added | 0.068069 | to acc_bin 1 | from spectral Bin 161 | giving 0.083906 | from $f_3$ |
| added | 0.037148 | to acc_bin 2 | from spectral Bin 158 | giving 0.045536 | from $f_4$ |
| added | 0.034056 | to acc_bin 3 | from spectral Bin 155 | giving 0.038475 | from $f_5$ |
| added | 0.018148 | to acc_bin 4 | from spectral Bin 152 | giving 0.021717 | from $f_6$ |
| added | 0.022723 | to acc_bin 5 | from spectral Bin 149 | giving 0.032339 | from $f_7$ |
| added | 0.006849 | to acc_bin 6 | from spectral Bin 146 | giving 0.019152 | from $f_8$ |
| added | 4119.678711 | to acc_bin 7 | from spectral Bin 167 | giving 4119.678711 | from $f_1$ |

Accumulator
8239.263672 0.083906 0.045536 0.038475 0.021717 0.032339 0.000000 4119.678711
Result 0 0.019152 Passband 0 Pickup 0 Symbol 0

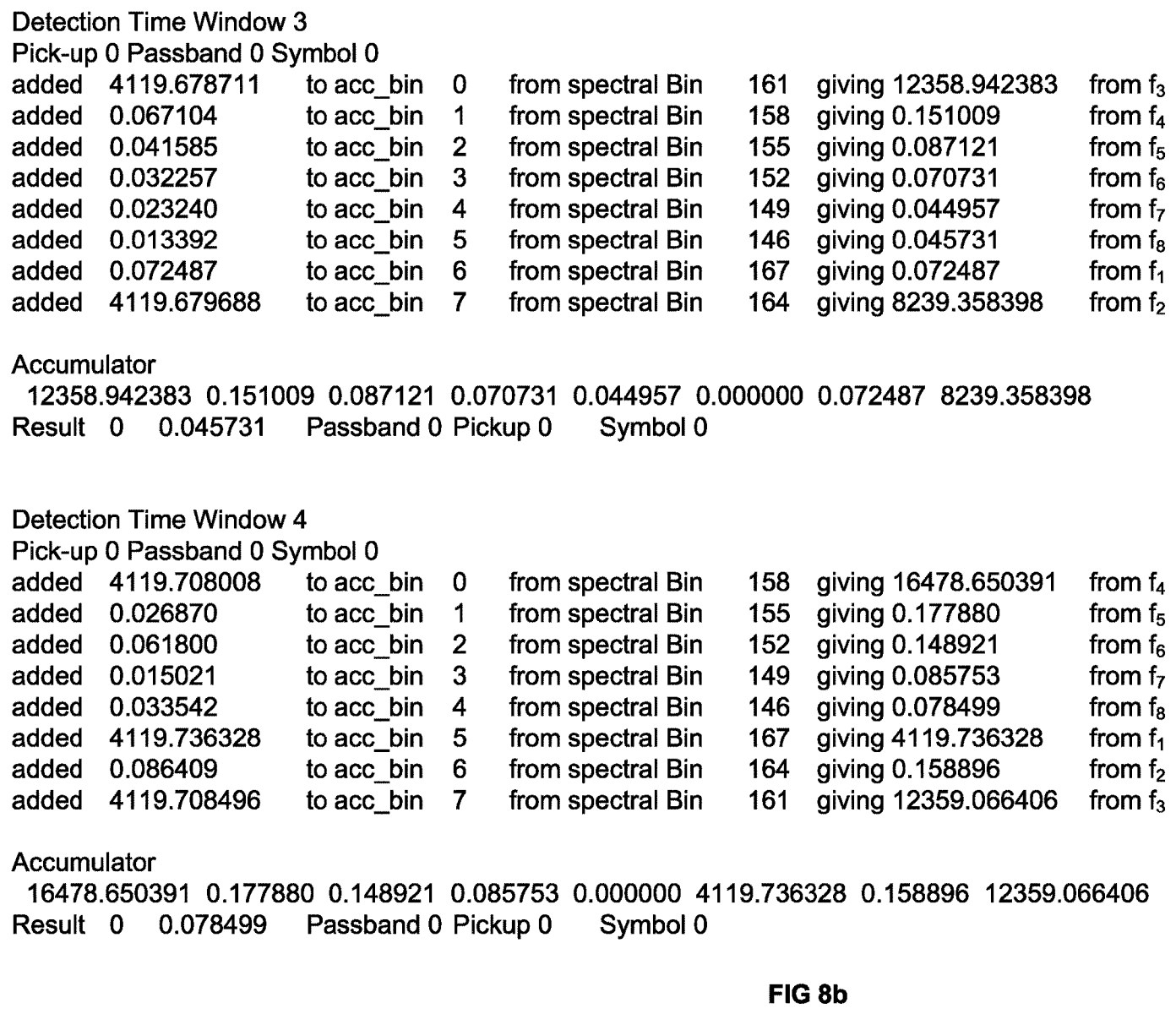

Detection Time Window 3
Pick-up 0 Passband 0 Symbol 0
added 4119.678711 to acc_bin 0 from spectral Bin 161 giving 12358.942383 from $f_3$
added 0.067104 to acc_bin 1 from spectral Bin 158 giving 0.151009 from $f_4$
added 0.041585 to acc_bin 2 from spectral Bin 155 giving 0.087121 from $f_5$
added 0.032257 to acc_bin 3 from spectral Bin 152 giving 0.070731 from $f_6$
added 0.023240 to acc_bin 4 from spectral Bin 149 giving 0.044957 from $f_7$
added 0.013392 to acc_bin 5 from spectral Bin 146 giving 0.045731 from $f_8$
added 0.072487 to acc_bin 6 from spectral Bin 167 giving 0.072487 from $f_1$
added 4119.679688 to acc_bin 7 from spectral Bin 164 giving 8239.358398 from $f_2$ Accumulator
12358.942383 0.151009 0.087121 0.070731 0.044957 0.000000 0.072487 8239.358398
Result 0 0.045731 Passband 0 Pickup 0 Symbol 0

Detection Time Window 4
Pick-up 0 Passband 0 Symbol 0
added 4119.708008 to acc_bin 0 from spectral Bin 158 giving 16478.650391 from $f_4$
added 0.026870 to acc_bin 1 from spectral Bin 155 giving 0.177880 from $f_5$
added 0.061800 to acc_bin 2 from spectral Bin 152 giving 0.148921 from $f_6$
added 0.015021 to acc_bin 3 from spectral Bin 149 giving 0.085753 from $f_7$
added 0.033542 to acc_bin 4 from spectral Bin 146 giving 0.078499 from $f_8$
added 4119.736328 to acc_bin 5 from spectral Bin 167 giving 4119.736328 from $f_1$
added 0.086409 to acc_bin 6 from spectral Bin 164 giving 0.158896 from $f_2$
added 4119.708496 to acc_bin 7 from spectral Bin 161 giving 12359.066406 from $f_3$ Accumulator
16478.650391 0.177880 0.148921 0.085753 0.000000 4119.736328 0.158896 12359.066406
Result 0 0.078499 Passband 0 Pickup 0 Symbol 0

FIG 8b

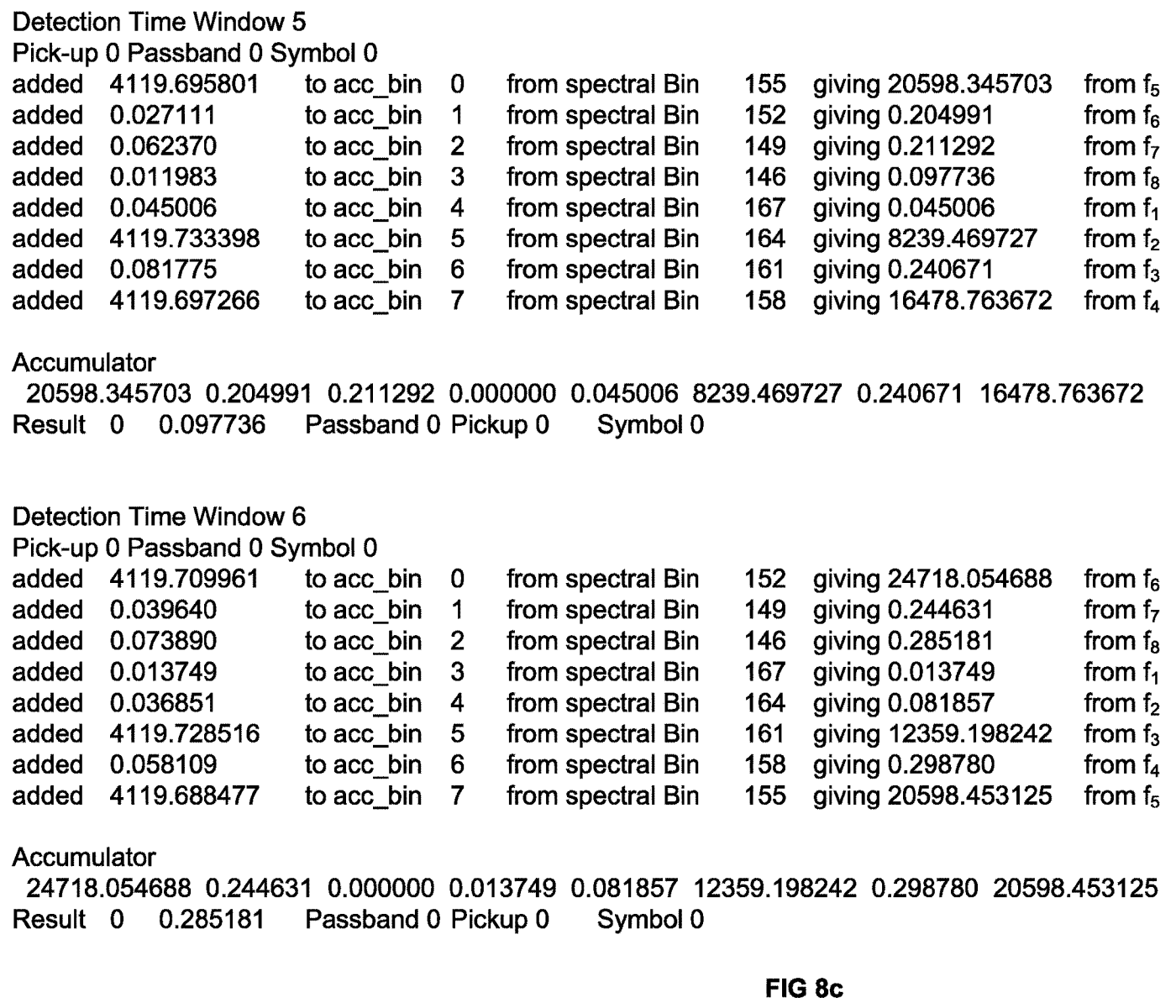

Detection Time Window 5
Pick-up 0 Passband 0 Symbol 0
added 4119.695801 to acc_bin 0 from spectral Bin 155 giving 20598.345703 from $f_5$
added 0.027111 to acc_bin 1 from spectral Bin 152 giving 0.204991 from $f_6$
added 0.062370 to acc_bin 2 from spectral Bin 149 giving 0.211292 from $f_7$
added 0.011983 to acc_bin 3 from spectral Bin 146 giving 0.097736 from $f_8$
added 0.045006 to acc_bin 4 from spectral Bin 167 giving 0.045006 from $f_1$
added 4119.733398 to acc_bin 5 from spectral Bin 164 giving 8239.469727 from $f_2$
added 0.081775 to acc_bin 6 from spectral Bin 161 giving 0.240671 from $f_3$
added 4119.697266 to acc_bin 7 from spectral Bin 158 giving 16478.763672 from $f_4$ Accumulator
20598.345703 0.204991 0.211292 0.000000 0.045006 8239.469727 0.240671 16478.763672
Result 0 0.097736 Passband 0 Pickup 0 Symbol 0

Detection Time Window 6
Pick-up 0 Passband 0 Symbol 0
added 4119.709961 to acc_bin 0 from spectral Bin 152 giving 24718.054688 from $f_6$
added 0.039640 to acc_bin 1 from spectral Bin 149 giving 0.244631 from $f_7$
added 0.073890 to acc_bin 2 from spectral Bin 146 giving 0.285181 from $f_8$
added 0.013749 to acc_bin 3 from spectral Bin 167 giving 0.013749 from $f_1$
added 0.036851 to acc_bin 4 from spectral Bin 164 giving 0.081857 from $f_2$
added 4119.728516 to acc_bin 5 from spectral Bin 161 giving 12359.198242 from $f_3$
added 0.058109 to acc_bin 6 from spectral Bin 158 giving 0.298780 from $f_4$
added 4119.688477 to acc_bin 7 from spectral Bin 155 giving 20598.453125 from $f_5$ Accumulator
24718.054688 0.244631 0.000000 0.013749 0.081857 12359.198242 0.298780 20598.453125
Result 0 0.285181 Passband 0 Pickup 0 Symbol 0

FIG 8c

Detection Time Window 7
Pick-up 0 Passband 0 Symbol 0

| | | | | | | |
|---|---|---|---|---|---|---|
| added | 4119.755859 | to acc_bin | 0 | from spectral Bin | 149 | giving 28837.810547 | from $f_7$ |
| added | 0.005013 | to acc_bin | 1 | from spectral Bin | 146 | giving 0.249644 | from $f_8$ |
| added | 4119.753906 | to acc_bin | 2 | from spectral Bin | 167 | giving 4119.753906 | from $f_1$ |
| added | 0.039487 | to acc_bin | 3 | from spectral Bin | 164 | giving 0.053236 | from $f_2$ |
| added | 0.068348 | to acc_bin | 4 | from spectral Bin | 161 | giving 0.150205 | from $f_3$ |
| added | 4119.755859 | to acc_bin | 5 | from spectral Bin | 158 | giving 16478.953125 | from $f_4$ |
| added | 0.007139 | to acc_bin | 6 | from spectral Bin | 155 | giving 0.305919 | from $f_5$ |
| added | 4119.698242 | to acc_bin | 7 | from spectral Bin | 152 | giving 24718.152344 | from $f_6$ |

Accumulator
28837.810547 0.000000 4119.753906 0.053236 0.150205 16478.953125 0.305919 24718.152344
Result 0 0.249644 Passband 0 Pickup 0 Symbol 0

Detection Time Window 8
Pick-up 0 Passband 0 Symbol 0

| | | | | | | |
|---|---|---|---|---|---|---|
| added | 4119.769531 | to acc_bin | 0 | from spectral Bin | 146 | giving 32957.578125 | from $f_8$ |
| added | 0.015313 | to acc_bin | 1 | from spectral Bin | 167 | giving 0.015313 | from $f_1$ |
| added | 4119.745117 | to acc_bin | 2 | from spectral Bin | 164 | giving 8239.499023 | from $f_2$ |
| added | 0.017230 | to acc_bin | 3 | from spectral Bin | 161 | giving 0.070466 | from $f_3$ |
| added | 0.047422 | to acc_bin | 4 | from spectral Bin | 158 | giving 0.197626 | from $f_4$ |
| added | 4119.754395 | to acc_bin | 5 | from spectral Bin | 155 | giving 20598.707031 | from $f_5$ |
| added | 0.019130 | to acc_bin | 6 | from spectral Bin | 152 | giving 0.325048 | from $f_6$ |
| added | 4119.700684 | to acc_bin | 7 | from spectral Bin | 149 | giving 28837.853516 | from $f_7$ |

Accumulator
0.000000 0.015313 8239.499023 0.070466 0.197626 20598.707031 0.325048 28837.853516
Result 0 32957.578125 Passband 0 Pickup 0 Symbol 0

FIG 8d

Detection Time Window 9
Pick-up 0 Passband 0 Symbol 0

| added | 0.053268 | to acc_bin | 0 | from spectral Bin | 167 | giving | 0.053268 | from $f_1$ |
| added | 0.014058 | to acc_bin | 1 | from spectral Bin | 164 | giving | 0.029371 | from $f_2$ |
| added | 4119.707031 | to acc_bin | 2 | from spectral Bin | 161 | giving | 12359.206055 | from $f_3$ |
| added | 0.024047 | to acc_bin | 3 | from spectral Bin | 158 | giving | 0.094513 | from $f_4$ |
| added | 0.059158 | to acc_bin | 4 | from spectral Bin | 155 | giving | 0.256784 | from $f_5$ |
| added | 4119.704102 | to acc_bin | 5 | from spectral Bin | 152 | giving | 24718.410156 | from $f_6$ |
| added | 0.046728 | to acc_bin | 6 | from spectral Bin | 149 | giving | 0.371777 | from $f_7$ |
| added | 4119.714844 | to acc_bin | 7 | from spectral Bin | 146 | giving | 32957.570313 | from $f_8$ |

Accumulator
0.053268 0.029371 12359.206055 0.094513 0.256784 24718.410156 0.371777 0.000000
Result 0   32957.570313   Passband 0 Pickup 0   Symbol 0

FIG 8e

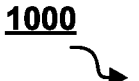
1000
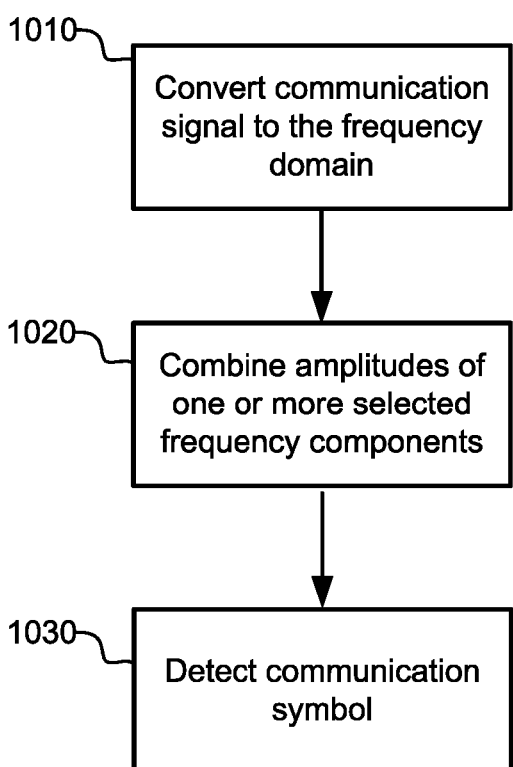
1010 — Convert communication signal to the frequency domain
1020 — Combine amplitudes of one or more selected frequency components
1030 — Detect communication symbol
FIG 10

| Time | | | | | | | | | | |
|------|------|------|------|------|------|------|------|------|------|------|
| Symbol 1 | f11 | f12 | f13 | f14 | f15 | f16 | f17 | f18 | f19 | f110 |
| Symbol 2 | f21 | f22 | f23 | f24 | f25 | f26 | f27 | f28 | f29 | f210 |
| Symbol 3 | f31 | f32 | f33 | f34 | f35 | f36 | f37 | f38 | f39 | f310 |
| Symbol 4 | f41 | f42 | f43 | f44 | f45 | f46 | f47 | f48 | f49 | f410 |

FIG 12

Time

| | | | | |
|---|---|---|---|---|
| Symbol 1 | f11 | f12 | f13 | f14 |
| Symbol 2 | f21 | f22 | f23 | f24 |
| Symbol 3 | f31 | f32 | f33 | f34 |
| Symbol 4 | f41 | f42 | f43 | f44 |
| Symbol 5 | f51 | f52 | f53 | f54 |
| Symbol 6 | f61 | f62 | f63 | f64 |
| Symbol 7 | f71 | f72 | f73 | f74 |
| Symbol 8 | f81 | f82 | f83 | f84 |
| Symbol 9 | f91 | f92 | f93 | f94 |
| Symbol 10 | f101 | f102 | f103 | f104 |
| Symbol 11 | f111 | f112 | f113 | f114 |
| Symbol 12 | f121 | f122 | f123 | f124 |

1910 — Convert communication signal to the frequency domain

1920 — Decode a plurality of messages

1930 — Determine the validity of the messages

1940 — Generate Indication of suitability of symbol(s)

1950 — Cause performance of operation

2100

2110 — Encode first communication data

2120 — Encode channel sounding message(s)

2130 — Obtain indication

2140 — Encode second communication data

ENCODING OR DECODING COMMUNICATION DATA

CROSS-REFERENCES TO RELATED APPLICATIONS

This application is a national stage application under 35 U.S.C. § 371 of International Application No. PCT/GB2023/051207, filed May 5, 2023, which claims priority to United Kingdom Patent Application No. 2217518.6, filed Nov. 23, 2022, and United Kingdom Patent Application No. 2206769.8, filed Sep. 5, 2022. The entire contents of each of the foregoing applications are incorporated herein by reference.

BACKGROUND

A borehole or well may be drilled in the earth's subsurface in order to explore for or exploit underground resources such as underground oil, gas, shale or water. During such drilling it may be useful to communicate with (e.g., to command or control) one or more downhole tools or sensors situated in the borehole or well, or to acquire data from the borehole or well. For example, it may be useful to acquire data from drilling rig sensors to monitor and manage drilling operations, to record information relating to geological formations penetrated by the borehole, to generate operations statistics and performance benchmarks and to provide well planners with accurate historical operations performance data which can be referred to in future operations. Data may be communicated from sensors in the borehole or well to nodes closer to or at the surface. Such communications can be challenging to implement at the exploration site as they are typically remote (often offshore and hundreds or thousands of meters below sea level) and the environment can vary significantly in terms of the surrounding geological features and the thermal and mechanical properties of the materials present in an established well (such as the pipework (e.g. drill string, riser, etc.) and production tubing, casing, lining, mud, hydrocarbons (i.e. "product"), lubricants and seawater). Downhole conditions are also hostile with unstable, difficult communication conditions and high temperatures. The high temperature environment also restricts hardware computational resources to low speed processors with small amounts of on-board memory.

For "in-well" communications, the communications medium is often solid—for instance, a drill string, a casing or a riser. Communications technologies based on transmission and reception of electromagnetic waves suffer disadvantages in providing in-well and underwater communications. Therefore, for in-well and many underwater applications, it is more usual to adopt acoustic telemetry, fluid pulse telemetry (which typically uses fluid pulse signals comprising pressure pulses that propagate within a column of drilling fluid or product (e.g. oil) inside a drill string), such as mud pulse telemetry (using pressure pulses that propagate within the column of drilling fluid inside the drill string) or product pulse telemetry (using pressure pulses that propagate within the column of extracted oil/gas or other product inside the drill string), or other ultrasonic communications technologies. In acoustic telemetry, for instance, an encoded sound wave may be generated by a suitable transmitter. The sound wave may then propagate along the pipework, casing and/or production tubing. A receiver may then extract the data from the signal. The transmitter may be located "downhole", while the receiver may be placed at or near the wellhead, at or near the cement head, at the surface or vice versa. Any portion of the drilling operation below the site of a wellhead may be referred to as "downhole".

Due to the harsh downhole environment, there remains a need for a communication technique that provides for sufficient immunity to noise while also providing for acceptable data rates. Due to the limited hardware computational resources available, there also remains a need for a means of processing received data more efficiently.

BRIEF DESCRIPTION OF THE DRAWINGS

Examples are further described with reference to the accompanying drawings, in which:

FIGS. 2a-c schematically illustrate example communication symbols;

FIG. 4 illustrates a plurality of symbols each comprising a plurality of frequency tones in a respective predefined time sequence;

FIGS. 8a-e illustrate example log data for a plurality of combiners;

FIG. 10 is a flow diagram of a method of decoding a communication signal;

FIG. 12 illustrates a plurality of symbols in accordance with a first example configuration;

FIG. 13 illustrates a plurality of symbols in accordance with a second example configuration;

DETAILED DESCRIPTION

Apparatuses, methods and communications nodes are described below in relation to FIGS. 1-23 for decoding or encoding a communication signal. Also described are computer program products and non-transitory computer readable media.

Figure 1:
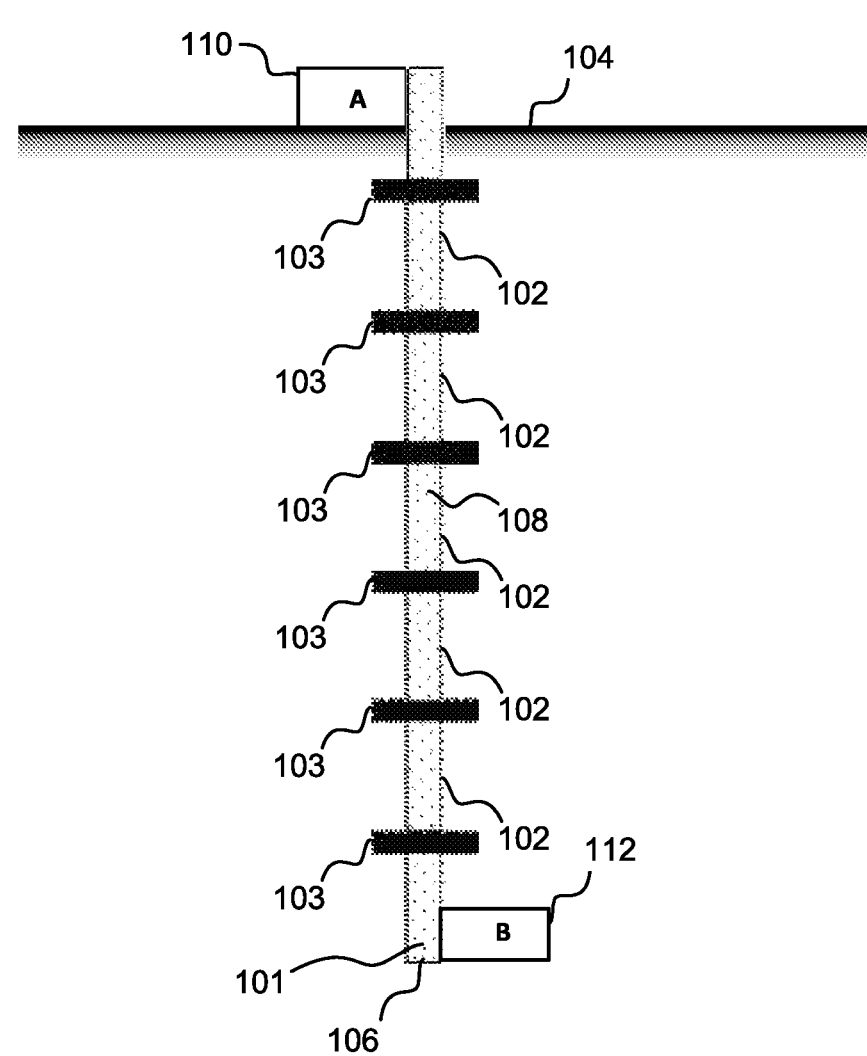
FIG. 1 schematically illustrates a drill string extending along borehole between first and second communications nodes.

FIG. 1 shows an example drilling rig having a drill string 100 extending longitudinally down a borehole 108, the drill string 100 comprising a drill bit 101 at a downhole longitudinal extent thereof and plurality of solid, hollow, tubular drill string sections 102 connected to each other longitudinally by couplings 103 and to the drill bit 101, the drill string 100 extending between a surface 104 and a lower longitudinal extent 106 of the borehole (or wellbore) 108, the borehole 108 being drilled by the drill bit 101. Downhole equipment (not shown) may be provided down the borehole 108, such as any one or more of: sensors, such as temperature sensors or pressure gauges; valves; chokes; firing heads; packers; perforators; samplers; flow meters; fluid analysers. The surface 104 may be a land surface or a surface of a sea bed, for example. The drill string sections 102 each have bores defined by solid, tubular walls and the sections 102 may be coupled together such that their bores are in fluid communication with each other and, typically, such that fluid tight seals are provided at the joints between sections 102. Drilling fluid may be transmitted through the bores of the tubular sections 102 from the surface 104 to the drill bit 101 and circulated back up to the surface 104 through an annular gap between the tubular drill string sections 102 and the side walls of the borehole 108. Torque may be applied to the drill bit 101 by way of torque applied to the tubular sections 102 of the drill string 100, for example by a top drive (not shown). A first communications node 110 may be provided at the surface 104 and a second communications node 112 may be provided at the lower longitudinal extent 106 of the borehole 108. The second node 112 may be communicatively coupled to the downhole equipment. It will be understood that the first communications node 110 may alternatively be provided beneath the surface 104, while the second communications node 112 may be provided above the lower extent 106 of the borehole 108. The first communications node 110 may be provided vertically closer to the surface 104 than the second communications node 112 is to the surface 104. The first and second nodes 110, 112 may be mechanically connected to the drill string 100, for example by way of respective couplers. The drill string 100 may be connected to a wellhead or a cement head (not shown) at the surface 104. In this case, the wellhead or cement head may comprise the first communications node 110, although it will be understood that the first communication node 110 may alternatively be provided for example on the top drive, above or below slips supporting the drill string 100 below the top drive, or as part of the drilling rig.

Although only two nodes 110, 112 are illustrated in FIG. 1, it will be understood that any number of communications nodes may be provided. For example, there may be a surface node and a plurality of downhole communications nodes. There may be a plurality of downhole communications nodes, such as a plurality of downhole communications nodes at different depths below the surface, a plurality of downhole communications nodes at the same respective depths below the surface or both. It will be understood that features of the communications between first and second nodes 110, 112 (indeed features of any communications between nodes) discussed herein is equally applicable to communications between any such pair of such nodes. Any features of an individual node discussed herein may additionally or alternatively be features of any other node.

Data, such as telemetry data or command or control data, may be communicated between the first and second nodes 110, 112 by way of a communications channel. For example, command or control data may be transmitted from the first node 110 to the second node 112, for example to control, activate or modify the operation of downhole equipment (e.g. a test valve or a sand screen or packer), request sensor data from downhole monitoring equipment or command the second node 112 to reconfigure the codec it will use to code or decode communication signals (i.e., to change communications protocols) for example based on a data rate or a type of sensor data that is to be communicated. It may be that the second node 112 is communicatively coupled to the said downhole equipment, and may be configured to forward command or control data received from the first node 110 to the downhole equipment. In another example, command acknowledgement or monitoring data such as sensor data from downhole equipment (e.g., any one or more of: pressure data from one or more pressure sensors; temperature data from one or more temperature sensors; weight data from one or more weight sensors; torque data from one or more torque sensors) may be transmitted from the second node 112 to the first node 110. Again in this case, it may be that the second node 112 is communicatively coupled to the downhole equipment such that the second node 112 can receive the command acknowledgement or monitoring data from the downhole equipment and forward it to the first node 110. In another example, event driven data may be communicated. For example, event driven data (e.g., flags) may be communicated from sub-surface tools by way of a sub-surface node (e.g., to a surface node) related to events occurring in-well. Event driven data may be preset or autonomously communicated, for example by sub-surface tools, for example by way of a surface node (e.g., as opposed to in response to a command from the surface). For example, progressive alarms, which may be based on thresholds to indicate if certain parameters are being exceeded, for example, or alarms signifying an event has occurred (e.g., a packer, sand screen or liner being fully set, or that there has been a failure to fully set), may be communicated.

It may be that the communication channel between the first node 110 and the second node 112 (hereinafter "the communication channel") has a dynamically variable transfer function. It may be that one or more frequency band(s) which are open for data communication by way of the communication channel change dynamically over time. It may be that the communication channel is noisy, lossy or noisy and lossy. It will be assumed in the following discussion, by way of example, that data is communicated between the first and second communications nodes 110, 112 by way of acoustic signals. It may be that the acoustic signals are transmitted and received through the solid longitudinal walls of the drill string sections 102 extending from the surface 104 to the lower longitudinal extent 106 of the borehole 108, the solid longitudinal walls of the drill string sections 102 acting as a communication channel by way of which data is communicated acoustically. However, it will be understood that data additionally or alternatively may be communicated between the first and second communications nodes 110, 112 by any other suitable way such as electromagnetically or by way of pressure pulses in fluid flowing through the drill string 100, or through the annular gap between the drill string 100 and the side walls of the borehole 108, such as mud, drilling fluid or product from the borehole 108, such as oil or water, or any combination thereof. Thus, the communication channel may comprise or consist of any matter extending or flowing between the first and second communications nodes 110, 112, such as solid matter or fluid propagating between the first and second communications nodes 110, 112. It may be that the communication channel comprises a communications medium, such as an acoustic communications medium. It may be that the communications medium is a wireless communications medium. An additional or alternative acoustic communication channel to the drill string 100 may be provided for example by coiled tubing or production tubing which may extend between the first and second communications nodes 110, 112. It may be that the communication channel is a downhole, "in well" or underwater communication channel. It may be that the communication channel comprises a solid communication channel such as any one or more of a drill string, a casing, production tubing, a riser, coiled tubing extending between the first and second nodes 110, 112, or a fluid communication channel such as mud, product or any combination thereof propagating between the first and second nodes 110, 112. It may be that a portion of the (e.g., solid) downhole communication channel extending between the nodes extends above the surface. For example when one of the nodes is provided at or above the surface, the portion of the downhole communication channel extending above the surface may do so to couple to the surface node. The downhole communication channel may even extend above the surface node, for example to couple to a cement head, tree, wellhead or top drive (whether on the sea bed, on land or on rig) which may be provided above the surface node. A portion of the channel above the surface node may influence signals transmitted or detected by the surface node, for example by causing signal echoes or reflections.

Transceivers (see below) of nodes 110, 112 may be selected according to the selected communications medium (e.g. the transceivers may be electromagnetic or acoustic transceivers for example). It will be understood that the transceivers may comprise separate transmitters and receivers (e.g., having a (e.g., piezoelectric) transducer for generating acoustic signals to be transmitted on the channel separate from one or more sensors (e.g., accelerometers, strain gauges or piezoelectric transducers) for receiving acoustic signals from the channel) or integrated transmitters and receivers (e.g., transmitters and receivers which share a transducer which both generates acoustic signals to be transmitted on the channel and receives acoustic signals from the channel).

The nodes 110, 112 may each further comprise processing circuitry communicatively coupled (e.g., wired or wirelessly) to the transceiver. The nodes 110, 112 may each further comprise a memory in data communication with its transceiver.

The drill string 100 may have a periodic structure which causes it to act as a mechanical filter, trapping (i.e. damping) signals having frequencies that lie within certain bands. The filtered nulls, where frequencies do not propagate, are called stopbands; the frequencies where signals may be allowed to propagate are called passbands. The stopbands may be caused by joints or couplers 103 provided between adjacent longitudinal sections thereof. Additional factors may affect the transmission path and attenuation (energy loss) of a signal propagating along the drill string, such as tension or compression of the drill string sections 102, contact of the drill string sections 102 with the side walls of the borehole 108, drilling fluid density passing through the drill string and mode coupling. Within these passbands there may be a number of instabilities. Their exact position and width vary from well to well, and can also vary dynamically during communications. The passbands may have a ripple (or 'fine structure'). The number of drill string sections 102 that the transmission energy has to pass through may primarily determine the number of ripples. The ripples may also vary over time with the changes in the depth and deviation of the well. Certain passbands may have more noise in them than others at any given time. The noise in particular passbands may reduce or the attenuation may change thus providing an increase in usable bandwidth. The frequency of a "passband", where communication is more effective, may vary over time.

It will be understood that other types of communication channel, such as other types of acoustic communication channel, may have different passbands and stop bands from a drill string. For example, coiled tubing may be considered to be acoustically joint-less for long distances, despite welds such as helical welds, which they may have. Coiled tubing may thus (but do not necessarily) provide broader frequency passbands in its acoustic frequency response than a drill string. In another example, it may be that production tubing is a more suitable acoustic communication channel at higher acoustic frequencies than a drill string, with a different arrangement of passbands and stop bands. Candidate passbands of the communication channel can be determined empirically.

As discussed above, the communication channel between the communications nodes 110, 112 may be noisy, lossy and dynamically changing. As will be discussed further below, in order to account for such a harsh communication environment, the present technique utilises a communication protocol based on one or more (e.g., predefined) communication symbols which may be highly immune to noise. A communication symbol may be predefined in that it is defined prior to encoding or decoding data based on that communication symbol. A computationally efficient symbol detection method may be provided where amplitude(s) of frequency components of a symbol are combined to facilitate detection of the symbol in a received communication signal. It is to be understood that the combining of amplitude(s) of frequency component(s) in accordance with the present disclosure encompasses combining one or more of such amplitudes. Combining a single amplitude of a frequency component may refer to modifying (e.g., initialised) data (e.g., symbol indicator data, as will be discussed further below) depending on the said single amplitude, for example by accumulating (e.g., summing) the data and the single amplitude. Combining a plurality of amplitudes of frequency components may refer to modifying the said data depending on a combination of the plurality of amplitudes, for example by accumulating (e.g., summing) the data and the plurality of amplitudes.

A communication symbol may comprise one or more selected frequency tones. It may be that each of the one or more selected frequency tones has a corresponding tonal length (e.g., a temporal tonal length). It may be that each of the said one or more selected frequency tones has any one or more of: a substantially constant (e.g., substantially constant root mean squared) amplitude (e.g., for the duration of its tonal length); a substantially constant frequency (e.g., for the duration of its tonal length); a substantially unmodulated phase (e.g., the tones may be sinusoidal for the duration of its tonal length). In examples where a communication symbol comprises a plurality of selected frequency tones, the plurality of selected frequency tones may comprise any plural number of selected frequency tones having any frequency and residing in a single passband or spanning a plurality of passbands.

Spectrally adjacent passbands of the plurality of passbands may be spectrally separated by respective stopbands. As mentioned above, the passbands may be (e.g., empirically) predetermined. For example, the passbands may be (e.g., empirically) predetermined based on frequencies determined to be likely suitable (e.g., signal to noise ratio likely to be above a predetermined threshold) for communications.

It will be assumed for simplicity in the discussion below that a frequency tone consists of a single frequency. However, it will be understood that a frequency tone may instead cover a small range of frequencies (e.g., less than 5 Hz, less than 10 Hz or less than 20 Hz in bandwidth). For example, it may be that individual frequency tones each comprise a respective (e.g., linear) chirp pulse spanning said small range of frequencies.

A communication symbol may comprise one or more sets of frequency tones, each of the one or more sets of frequency tones comprising one or more selected frequency tones.

A communication symbol may comprise or consist of one set of frequency tones consisting of one selected frequency tone i.e., the communication symbol may comprise or consist one single selected frequency tone.

A communication symbol may comprise a plurality of sets of frequency tones, each of the one or more sets of frequency tones comprising a single selected frequency tone, the sets (i.e., the respective frequency tones of the sets) being provided (e.g., transmitted) sequentially in a predefined time sequence. An example of such a communication symbol is discussed further below in relation to FIG. 2a.

A communication symbol may comprise or consist of one (e.g., a single) set of a plurality of fully or partially temporally overlapping tones. An example of such a communication symbol is discussed further below in relation to FIG. 2b.

A communication symbol may comprise a plurality of sets of frequency tones, wherein each of the sets of frequency tones comprises one or more selected frequency tones, the respective sets (i.e., the respective one or more selected frequency tones of the sets) being provided (e.g., transmitted) sequentially in a predefined time sequence. It may be that each of one or more (or each) of the sets of the plurality of sets comprises a plurality of fully or partially temporally overlapping frequency tones. An example of such a communication symbol is discussed further below in relation to FIG. 2c.

In examples where a communication symbol comprises a plurality of sets of selected frequency tones provided (e.g., transmitted) sequentially in a predefined time sequence, a symbol length of the communication symbol may correspond to a combined temporal length of the sets of selected frequency components in the predefined time sequence (e.g., in addition to any time interval(s) between sets of frequency tones, if present).

It may be that a communication symbol comprises a stepped time sequence of discrete selected frequency tones. It may be that the plurality of selected frequency tones each comprise a discrete frequency tone having a temporal tone length. In some examples, it may be that the discrete selected frequency tones of the stepped time sequence are temporally contiguous (e.g., directly temporally adjacent to each other, e.g., with substantially no time gap between temporally adjacent frequency tones or temporally adjacent frequency tones being separated in time by a predefined duration). In other examples, temporally adjacent ones of the discrete selected frequency tones may be temporally separated by a time interval. In some examples, it may be that the discrete selected frequency tones of the stepped time sequence are contiguous in frequency (e.g., directly adjacent to each other in frequency, e.g., with substantially no frequency gap between spectrally adjacent frequency tones or spectrally adjacent frequency tones being separated by one or more guard bands e.g., of predefined spectral width). In other examples, temporally adjacent ones of the discrete selected frequency tones may be separated in frequency by a frequency interval. For example, it may be that the discrete selected frequency tones of the stepped time sequence may be spread across a plurality of passbands to provide a spread spectrum time sequence of discrete selected frequency tones.

FIG. 2a schematically illustrates an example communication symbol 200-1 comprising a plurality of selected frequency tones provided (e.g., transmitted) in a predefined time sequence. The example communication symbol 200-1 has a symbol length 210 and bandwidth 220. The example communication symbol 200-1 comprises a plurality of temporally contiguous selected frequency tones 230 provided individually in a predefined time sequence. As shown, the example communication symbol 200-1 comprises six selected frequency tones 230, denoted $f_1$-$f_6$, provided in the followed time sequence: $f_1$, $f_4$, $f_3$, $f_2$, $f_5$, $f_6$. Each of the selected frequency tones 230 has a temporal tone length 240. It is to be understood that example communication symbol 200-1 is merely for illustrative purposes and does not limit the present disclosure. As discussed above, a communication symbol comprising a plurality of selected frequency tones provided in a predefined time sequence may comprise any number of any frequency tones, with or without time intervals therebetween, and the frequency tones of the symbol 200-1 may be within a single passband or spread across a plurality of different passbands.

In examples where a communication symbol comprises a plurality of fully or partially temporally overlapping frequency tones, the communication symbol may comprise a plurality of selected frequency tones provided (e.g., transmitted) simultaneously or substantially simultaneously. It may be that the plurality of selected frequency tones of the symbol comprise orthogonal or pseudo-orthogonal frequency tones to enable the tones to be discriminated from each other at a receiver.

Communication symbols in accordance with the symbol of FIG. 2a may be based on the following:

Rx$_f$ is: Transmitter sampling rate

F$_{start}$: the start frequency of the band (Hz)

F$_b$: the bandwidth of the channel (Hz)

N$_{frequencies}$: The number of discrete frequencies in the sequence

TB: time bandwidth product of the stepped chirp pulse $$TxLen_{rx_{samples}} = TB \times \frac{Rx_f}{Fb}:$$

Length of a Stepped pulse in receiver samples.

$$df = \frac{N_{frequencies} \times Fb}{TB}:$$

Spectral frequency separation of the Fast Fourier Transform (FFT)

The frequency at sample $f_1$ of the transmitted pulse is given by $$Tx\_f_i = F_{start} + \left( floor \left( floor \left( \frac{i \times N_{frequencies}}{TxLen_{rx_{samples}}} \right) \times \right. \right. \qquad \text{Equation 1}$$

-continued $$\frac{(Fb)}{N_{frequencies}-1}\Bigg)\Bigg)\times df$$

From the equation the Stepped pulse can be generated:

$$Tx_{t_i} = Amp \times \sin\left(i \times 2 \times \pi \times \frac{Tx_{f_i}}{Rx_f}\right)$$

FIG. 2b schematically illustrates an example communication symbol 200-2 comprising a plurality of selected frequency tones provided (e.g., transmitted) simultaneously or substantially simultaneously. The example communication symbol 200-2 comprises five selected frequency tones denoted $f_1$, $f_3$, $f_4$, $f_6$, and $f_7$, each of which having a temporal tone length 240. In this case, the five selected frequency tones denoted $f_1$, $f_3$, $f_4$, $f_6$, and $f_7$ fully temporally overlap each other. Temporally overlapping frequency tones may be orthogonal or pseudo-orthogonal to each other. The example communication symbol 200-2 has a symbol length 210 which may in this case correspond or substantially correspond to the temporal tonal length 240. The example communication symbol 200-2 has a bandwidth 220. It is to be understood that the example communication symbol 200-2 is merely for illustrative purposes and does not limit the present disclosure. As discussed above, a communication symbol comprising a plurality of temporally overlapping frequency tones may comprise any number of any frequency tones having any respective frequency. The frequency tones of the symbol 200-2 may be within a single passband or spread across a plurality of different passbands.

FIG. 2c schematically illustrates an example communication symbol 200-3 comprising a plurality of sets of frequency tones provided (e.g., transmitted) sequentially in a predefined time sequence, wherein each of the plurality of sets of frequency tones comprise one or more selected frequency tones. In this example, where a set of frequency tones comprises a plurality of frequency tones, the tones fully temporally overlap each other. Temporally overlapping frequency tones may be orthogonal or pseudo-orthogonal to each other. The example communication symbol 200-3 comprises six temporally contiguous sets of one or more selected frequency tones provided (e.g., transmitted) sequentially in a predefined time sequence. The first set in the time sequence comprises four fully temporally overlapping frequency tones denoted $f_1$, $f_2$, $f_5$, and $f_7$. Each of the second, third, fourth, fifth, and sixth sets of frequency tones consist of one frequency tone each: the second set comprises the frequency tone denoted $f_4$; the third set comprises the frequency tone denoted $f_3$; the fourth set comprises the frequency tone denoted $f_2$; the fifth set comprises the frequency tone denoted $f_5$; and the sixth set comprises the frequency tone denote $f_6$. The example communication symbol 200-3 has a symbol length 210 and a bandwidth 220. It is to be understood that example communication symbol 200-3 is merely for illustrative purposes and does not limit the present disclosure. As discussed above, a communication symbol comprising a plurality of sets of frequency tones (each set comprising one or more selected frequency tones) provided (e.g., transmitted) sequentially in a predefined time sequence may comprise any number of any such sets, with or without time intervals therebetween temporally adjacent sets, wherein each of the said sets may comprise any number of (e.g., temporally overlapping) frequency tones, such as one (e.g., a single) frequency tone or a plurality of (e.g., temporally overlapping) frequency tones (e.g., of any number greater than one).

It may be that the plurality of sets of selected frequency tones are temporally contiguous (e.g., directly temporally adjacent to each other) as discussed above, or temporally adjacent sets of one or more of the plurality of sets of frequency tones may be separated by a time interval. In some examples, sets of selected frequency tones comprising a plurality of (e.g., orthogonal or pseudo-orthogonal) temporally overlapping frequency tones may comprise any number of temporally overlapping frequency tones of any frequency, such as of frequencies within a single passband or frequencies spread across a plurality of passbands.

A symbol length of a communication symbol comprising a plurality of sets of selected frequency tones provided (e.g., transmitted) sequentially in a predefined time sequence as described above may correspond to a combined temporal length of the plurality of sets (e.g., in addition to any time interval(s) between sets, if present).

Although the above description relates to one predefined communication symbol comprising one or more sets of frequency tones, each of the one or more sets of frequency tones comprising one or more frequency tones, it will be understood that communication data may be encoded and decoded in units of communication symbols of a plurality of different communication symbols, such as different communication symbols having the same number of frequency tones per symbol having the same tone length. This is illustrated in FIG. 4 which shows eight different communication symbols 1-8, each comprising a respective predefined time sequence comprising eight frequency tones fn1-fn6 (where n is the symbol number) transmitted individually offset in time from each other in a predefined time sequence. Although eight symbols are shown each with six frequency tones, it will be understood that any suitable number of symbols each with any suitable number of frequency tones or sets of frequency tones may be provided.

It may be that the symbols of the plurality of different communication symbols can be discriminated from each other, for example at a receiving node, even if they are transmitted simultaneously or substantially simultaneously. For example, it may be that the symbols of the plurality of different communication symbols are orthogonal or pseudo-orthogonal to each other. It may be that symbols of the plurality of symbols can be transmitted simultaneously so as to increase the data rate of the communication system (e.g. as compared to a system which allows only a single one of the communication symbols to be transmitted at a time).

Thus, data may be encoded and decoded based on different symbols.

Encoding data may comprise keying one or more symbols. When symbols are detected (e.g., by the symbol detector 326 shown in FIG. 3 and discussed below) the detected symbols may be decoded for example into a bit-stream, which may depend on a keying method used in the encoding, the bit-stream being a reconstruction of the originally encoded data. Some example keying methods will be described below.

In some examples it may be that the different symbols are not orthogonal or pseudo-orthogonal to each other, in which case they may be communicated at times offset from each other (e.g., temporally offset by a tone length); such symbols may, however, (e.g., partially) temporally overlap each other.

Possible ways in which different communication symbols may differ are discussed below.

As discussed, a communication symbol may comprise one or more sets of frequency tones (e.g., a plurality of sets of tones provided sequentially in a predefined time sequence), each of the one or more sets of frequency tones comprising one or more selected frequency tones.

As discussed, in some examples, a given communication symbol may differ from a another communication symbol (subsequently referred to as a "different communication symbol") such that the communication symbols can be discriminated from each other at a receiver. In some examples, a given communication symbol may differ from a different communication symbol in respect of a configuration of their respective sets of frequency tones.

For example, it may be that the given communication symbol comprises or consists of a different number of sets of frequency tones than a different communication symbol. For example, a given symbol may consist of a single set of frequency tones and a different communication symbol may comprise or consist of a plurality of sets of frequency tones (e.g., in a predefined time sequence). In these examples, it may be that said plurality of sets of frequency tones of the different communication symbol does not comprise said single set of frequency tones of the given communication symbol. That is, it may be that each of the sets of frequency tones of the different communication symbol is different from the single set of frequency tones of the given communication symbol. This allows the single set of frequency tones of the given communication symbol to be transmitted in parallel with the sets of frequency tones of the different communication symbol such that the given symbol and the different symbol can be discriminated from each other at a receiving node.

A set of frequency tones may be different from another set of frequency tones such that they can be discriminated from each other by a receiver. For example, the two sets of frequency tones may be orthogonal or pseudo-orthogonal to each other. For example, it may be that no one frequency tone is common to both sets of frequency tones.

It may be that a given communication symbol comprises or consists of a first predefined time sequence comprising a first plurality of sets of frequency tones offset from each other in time and the different communication symbol may comprise or consist of a second predefined time sequence comprising a second plurality of sets of frequency tones offset from each other in time, the second plurality comprising more sets of frequency tones than the first plurality. In these examples, it may be that the second predefined time sequence of sets of frequency tones does not comprise the first predefined sequence of sets of frequency tones. That is, it may be that there is no sub-sequence of the second predefined time sequence of sets of frequency tones comprising consecutive sets of frequency tones that collectively correspond to the first predefined time sequence of sets of frequency tones (and in some cases vice versa).

It may be that a given communication symbol and a different communication symbol each comprises or consists of a same number of sets of frequency tones, wherein one or more sets of frequency tones of the given communication symbol are different to the sets of frequency tones of the different communication symbol. That is, at least one of the sets of frequency tones of the given communication symbol may be different from the sets of frequency tones of the different communication symbol.

It may be that a given communication symbol and a different communication symbol each comprises or consists of the same sets of frequency tones provided in different predefined orders in different respective predefined time sequences. For example, it may be that the given communication symbol and the different communication symbol comprise or consist of orthogonal or pseudo-orthogonal predefined time sequences of sets of frequency tones.

It may be that each of a plurality of different communication symbols are orthogonal or pseudo-orthogonal to each other to thereby enable each of the plurality of different communication symbols to be provided (e.g., transmitted) in parallel (e.g., simultaneously or substantially simultaneously or otherwise temporally overlapping) such that they may be discriminated from each other at a receiving node. In some examples, it may be that each frequency tone of each of the plurality of different communication symbols is orthogonal or pseudo-orthogonal to each other frequency tone of each of the plurality of different communication symbols. In other examples, it may be that each of the plurality of different communication symbols comprises a respective plurality of selected frequency tones, and the said orthogonality or pseudo-orthogonality results from the particular sequences of the communication symbols. For example, two or more of the plurality of different communication symbols may comprise one or more selected frequency tones in common but at non-overlapping times when transmitted simultaneously.

The communication symbols may represent data by way of any suitable keying technique. For example, on-off keying may be performed based on the respective communication symbols, where the presence of a predefined communication symbol represents a first piece of information (e.g., a binary "1") and the absence of that predefined communication symbol represents a second piece of information (e.g., a binary "0") different from the first piece of information.

In examples where on-off keying is performed, data comprising a given bit stream having a given combination of binary values may be represented (e.g., communicated) by either transmitting or not transmitting (i.e., based on the corresponding bit stream values) a particular predefined communication symbol in successive (e.g., contiguous) transmission windows of a transmission stream associated therewith. It may be that each of the said transmission windows has a temporal length at least equal to a symbol length of the symbol associated therewith. For example, presence of a symbol may represent a binary '1' and absence of that symbol may represent a binary '0' or vice versa.

A plurality of transmission streams such as those described above may be transmitted simultaneously or substantially simultaneously. In this case each of the said plurality of transmission streams may be associated with (e.g., based on) a different (e.g., orthogonal or pseudo-orthogonal) predefined communication symbol comprising a respective one or more selected frequency tones. In these examples, a plurality of different bit streams may be represented (e.g., communicated) simultaneously or substantially simultaneously by way of such a plurality of simultaneous or substantially simultaneous transmission streams, wherein each of the said transmissions streams represents (e.g., communicates) a respective one of the plurality of different bit streams by way of on-off keying a respective communication symbol (e.g., one, such as a different one, of a plurality of different (e.g., orthogonal or pseudo-orthogonal) communication symbols). The respective predefined communication symbol may be uniquely associated with (e.g., uniquely used in) that transmission stream with respect to said the plurality of transmission streams.

More than one transmission stream may be associated with the same communication symbol (e.g., may on-off key that the same communication symbol to represent (e.g., communicate) respective data) provided that the said transmission streams are temporally offset from each other so as to enable discrimination therebetween at a receiver. For example, each of the said transmission streams may be temporally offset from each other by a tonal length, or by any integer multiple of a tonal length, or by any other suitable amount.

Figure 5:
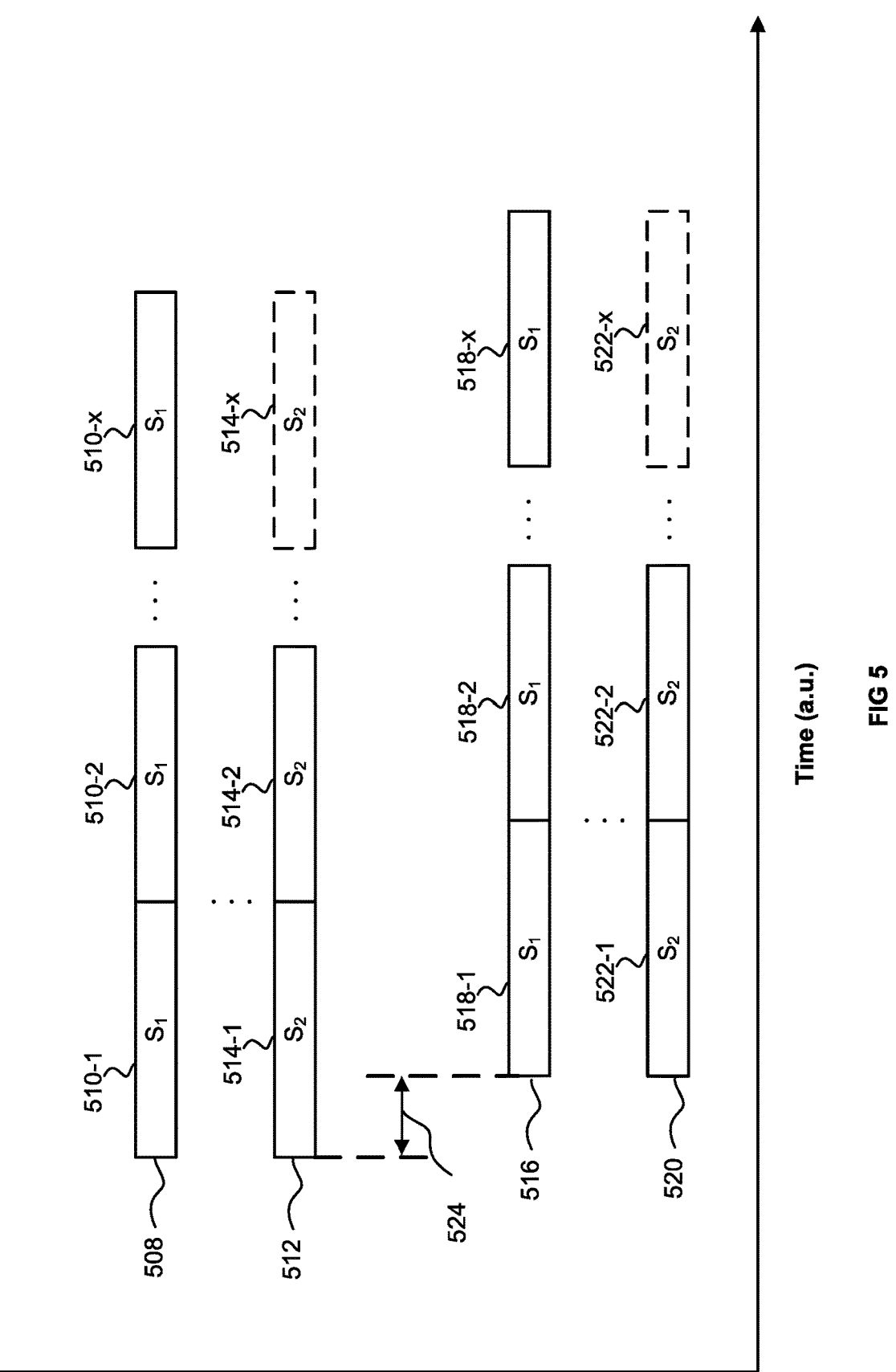
FIG. 5 schematically illustrates example transmission streams based on on-off keying.

To illustrate an example of on-off keying, FIG. 5 schematically illustrates four example transmission streams 508, 512, 516, 520, each comprising a respective plurality of contiguous transmission windows (e.g., transmission windows 510-1 to 510-x in the case of the first transmission stream 508, transmission windows 514-1 to 514-x in the case of the second transmission stream 512, transmission windows 518-1 to 518-x in the case of the third transmission stream 516, and transmission windows 520-1 to 520-x in the case of the fourth transmission stream 508, where x may be any integer value e.g., greater than 1).

As shown in FIG. 5, each of the plurality of transmission streams is associated with a respective communication symbol (as indicated by the symbol denoted in each of the transmission windows). For a given transmission stream (e.g., the first transmission stream 508), the communication symbol associated therewith (e.g., symbol $S_1$ in the case of the first transmission stream 508) may be either transmitted or not transmitted in each of the corresponding transmission windows in order to communicate a desired bit stream.

The first and second transmission streams 508, 512 are associated with different (e.g., orthogonal or pseudo-orthogonal) communication symbols ($S_1$ and $S_2$, respectively) and may therefore may be transmitted simultaneously as shown. Similarly, the third and fourth transmission streams 516, 520 are associated with different (e.g., orthogonal or pseudo-orthogonal) communication symbols ($S_1$ and $S_2$, respectively) and may therefore may be transmitted simultaneously as shown.

The first and third transmission streams 508, 516 are associated with the same communication symbol $S_1$, and thus, are temporally offset from each other by an amount 524, which may comprise e.g., a temporal tone length or any other suitable temporal length. Similarly, the second and fourth transmission streams 512, 520 are associated with the same communication symbol $S_2$, and thus, are temporally offset from each other by an amount 524, which may comprise e.g., a temporal tone length or any other suitable temporal length.

In other examples, a multi-bit keying method may be predefined where the presence of a particular symbol represents a plurality of bits. For example, n bits of information may be communicated per communication symbol by providing 2" different communication symbols and allocating n bits of information to each of the symbols.

For illustrative purposes, Table 1 shows an example communication symbol configuration for multi-bit keying. Table 1 illustrates an example of 16 different communication symbols denoted $S_1$-$S_{16}$, wherein each of the 16 different communication symbols comprises 8 sets of one selected frequency tone provided in a predefined time sequence (in the order of set 1 to set 8 with each of the sets 1-8 being temporally offset from each other). In this example, there are a total of 16 different frequency tones denoted $f_0$-$f_{15}$. Each of the frequency tones $f_0$-$f_{15}$ may correspond to a different (e.g., discrete) frequency tone having a (e.g., discrete) tonal length. The frequency tones $f_0$-$f_{15}$ may span a single passband or may span a plurality of passbands. As shown in Table 1, each of the communication symbols $S_1$-$S_{16}$ comprises a different group (e.g., combination) of selected frequency tones. As shown in table 1, each of the symbols $S_1$-$S_{16}$ corresponds to a particular bit pattern of 4 bits. Accordingly, in this example, any bit stream having a length of any integer multiple of 4 bits may be communicated by sequentially transmitting the communication symbols corresponding to those bits. As an illustrative example, the bit stream "00100001" could be communicated by transmitting the symbol sequence "$S_3S_2$".

TABLE 1

| Symbol | Set 1 | Set 2 | Set 3 | Set 4 | Set 5 | Set 6 | Set 7 | Set 8 | Bit Pattern |
|---|---|---|---|---|---|---|---|---|---|
| $S_1$ | f10 | f8 | f11 | f15 | f9 | f1 | f13 | f12 | 0000 |
| $S_2$ | f0 | f14 | f1 | f5 | f15 | f7 | f3 | f2 | 0001 |
| $S_3$ | f8 | f6 | f9 | f13 | f7 | f15 | f11 | f10 | 0010 |
| $S_4$ | f12 | f10 | f13 | f1 | f11 | f3 | f15 | f14 | 0011 |
| $S_5$ | f13 | f11 | f14 | f2 | f12 | f4 | f0 | f15 | 0100 |
| $S_6$ | f4 | f2 | f5 | f9 | f3 | f11 | f7 | f6 | 0101 |
| $S_7$ | f2 | f0 | f3 | f7 | f1 | f9 | f5 | f4 | 0110 |
| $S_8$ | f5 | f3 | f6 | f10 | f4 | f12 | f8 | f7 | 0111 |
| $S_9$ | f9 | f7 | f10 | f14 | f8 | f0 | f12 | f11 | 1000 |
| $S_{10}$ | f3 | f1 | f4 | f8 | f2 | f10 | f6 | f5 | 1001 |
| $S_{11}$ | f11 | f9 | f12 | f0 | f10 | f2 | f14 | f13 | 1010 |
| $S_{12}$ | f7 | f5 | f8 | f12 | f6 | f14 | f10 | f9 | 1011 |
| $S_{13}$ | f6 | f4 | f7 | f11 | f5 | f13 | f9 | f8 | 1100 |
| $S_{14}$ | f15 | f13 | f0 | f4 | f14 | f6 | f2 | f1 | 1101 |
| $S_{15}$ | f1 | f15 | f2 | f6 | f0 | f8 | f4 | f3 | 1110 |
| $S_{16}$ | f14 | f12 | f15 | f3 | f13 | f5 | f1 | f0 | 1111 |

In examples where multi-bit keying is performed, data comprising a given bit stream having a given combination of binary values may be represented (e.g., communicated) by successively transmitting a sequence of one or more different communication symbols in successive (e.g., contiguous) transmission windows of a transmission stream. It may be that each of the said transmission windows has a temporal length at least equal to a symbol length of each of the said communication symbols.

A plurality of multi-bit keying transmission streams such as those described above may be transmitted, said transmission streams being temporally offset from each other so as to enable discrimination therebetween at a receiving node. For example, each of the said transmission streams may be temporally offset from each other by a tonal length, or by any integer multiple of a tonal length, or by any other suitable amount. It may be that a plurality of transmission streams implementing multi-bit keying may not be suitable for simultaneous transmission as each stream may comprise one or more communication symbols in common, which may therefore result in interference between the said streams if transmitted simultaneously.

Figure 6:
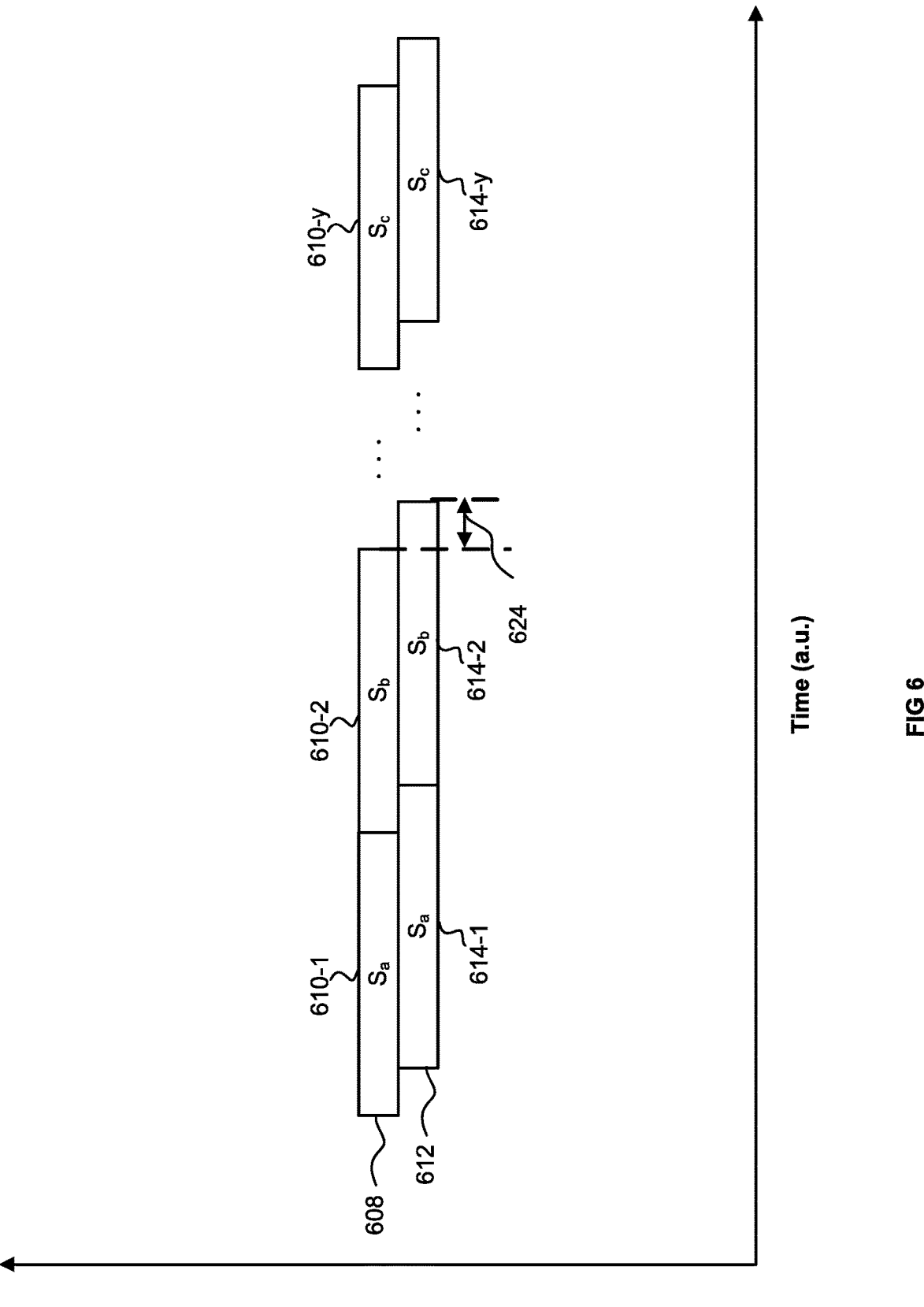
FIG. 6 schematically illustrates example transmission streams based on multi-bit keying.

To illustrate an example of multi-bit keying, FIG. 6 schematically illustrates two example transmission streams 608 and 612, each comprising a respective plurality of contiguous transmission windows (e.g., transmission windows 610-1 to 610-y in the case of the first transmission stream 608, and transmission windows 614-1 to 614-y in the case of the second transmission stream 612, where y may be any integer value e.g., greater than 1).

As shown in FIG. 6, each of the plurality transmission streams may successively transmit any combination of one or more communication symbols (denoted $S_a$, $S_b$, $S_c$) of a plurality of different commination symbols, where each of Sa, Sb, and Sc may be the same or different from each other (e.g., depending on the bit stream being represented).

The first and second transmission streams 610 and 614, are temporally offset from each other by an amount 624, which may comprise e.g., a temporal tone length or any other suitable temporal length, to avoid interference therebetween.

While (assuming communication symbols having a common temporal length) it may be that one on-off keyed communication symbol represents a single bit and one multi-bit keyed communication symbol represent a plurality of bits, maximum achievable data rates for each the said keying methods may be substantially similar owing to the fact that different transmission stream associated with different on-off keyed communication symbols can be sent simultaneously or substantially simultaneously.

However, for a given data rate, multi-bit keying may provide for a reduced maximum communication energy density.

As will be discussed further below, data may be encoded or decoded based on different encoding or decoding schemes each of which may utilise one or more communication symbols in accordance with any of those communications symbols discussed herein. Such encoding or decoding schemes may differ from the other encoding or decoding schemes, for example, in terms of the keying method used to encode or decode the data. Additionally or alternatively, different communication data may be encoded or decoded based on different communication symbols. As discussed above, the communication symbols based on which the different communication data may be encoded may differ from each other by way of one or both of a number of constituent frequency components per symbol and the constituent frequency components of the symbol. Additionally or alternatively the communication symbols may differ from each other by way of the temporal configuration of the constituent frequency components of the symbol, such as whether the frequency components are temporally overlapping or whether they are provided in a predefined time sequence or any combination thereof.

Figure 3:
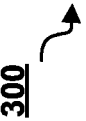
FIG. 3 schematically illustrates an apparatus of a communications node of FIG. 1.

FIG. 3 schematically illustrates an apparatus 300 of the first communications node 110 for decoding a received communication signal. The received communication signal may comprise, for example, one or more predefined communication symbols disclosed herein, such as, for example, any of the communication symbols discussed in relation to FIGS. 2a-c. The second communications node 112 may have an apparatus comprising the same or similar features. Indeed, it will be assumed in the following discussion that the second communications node 112 has an apparatus comprising the same features as those discussed in relation to the apparatus 300 shown in FIG. 3. As such, the second communications node 112 will not be described separately here.

The apparatus 300 may comprise processing circuitry 320 and a memory 310 communicatively coupled 312 to the processing circuitry 320, for example by wired connection (s) or by any other suitable communicative coupling means. The processing circuitry 320 may be configured to obtain a received communication signal 323 from a receiver comprising one or more sensors (e.g., accelerometers, strain gauges or piezoelectric transducers), for example by way of wired or wireless communications or any suitable communicative coupling means. The processing circuitry 320 may be configured to decode the received communication signal 323.

In some examples, the receiver may be part of a transceiver operable to both transmit and receive communication signals. In these examples, the transceiver may comprise a discrete transmitter and a discrete receiver, which may, for example, each comprise a respective transducer such as a respective acoustic transducer, or the transceiver may comprise an integrated transmitter and receiver which share hardware. For example, the transceiver may comprise an integrated transmitter and receiver which share a transducer such as an acoustic transducer, or any other type of transducer.

The processing circuitry 320 may comprise general purpose processing circuitry or special purpose processing circuitry. The functionality of the processing circuitry 320 described herein may be implemented in software, hardware or firmware, or a combination of any of software, hardware and firmware. For example, the processing circuitry 320 may be configured to retrieve and execute computer program instructions stored in the memory 310 to thereby provide its functionality described herein. The memory 320 may comprise any suitable memory such as cache memory, random access memory (RAM), read only memory (ROM), flash memory, magnetic or optical disk or any combination thereof.

The receiver may be configured to receive acoustic signals, for example by way of an acoustic communication channel such as the drill string 100. The receiver may be operable to receive signals over a plurality of frequency bands. The receiver may be communicatively coupled to the communication channel by one or more couplers. The receiver may comprise one or more transducers, such as one or more acoustic transducers (e.g., accelerometers, strain gauges or piezoelectric transducers), which may be operable to detect acoustic signals over a plurality of frequency bands. It may be that the receiver is an acoustic, electromagnetic or fluid (e.g. mud or product) pulse receiver configured to receive acoustic, electromagnetic or fluid pulse signals, respectively. However, it will be assumed herein that the receiver is an acoustic receiver. It may be that the transducer(s) are capable of converting acoustic signals to electrical signals, electrical signals to acoustic signals or both. It may be that the node (e.g., the node 110 or the node 112) is configured to receive acoustic signals by the receiver converting received acoustic signals to electrical signals by way of an analogue to digital converter and passing the electrical signals to the processing circuitry 320. It may be that the analogue to digital converter samples output(s) of the one or more transducers at a sampling rate and that the electrical signals passed to the processing circuitry 320 correspond to a plurality of discrete sampled values (subsequently referred to as "receiver data").

The functionality of the processing circuitry 320 is described further below in relation to a plurality of functional blocks of the processing circuitry 320. The functional blocks comprise: a time domain to frequency convertor 322; one or more combiners 324-1 to 324-k (e.g., where k may be an integer greater than 1); and a symbol detector 326. It is to be understood that these functional blocks and indeed any functional block(s) disclosed herein are merely for illustrative purposes. Any functionality described in relation to any one functional block disclosed herein may alternatively be implemented by any other functional block(s) such as by any one or more of any other functional blocks disclosed herein. Any functional block disclosed herein may be implemented by any one of hardware, software, firmware, or any combination thereof. It is to be understood that neither the functional blocks described in relation to the processing circuitry 320 nor any functional block(s) disclosed herein are intended to limit to e.g., any specific hardware configuration (e.g., hardware architecture), any specific software configuration (e.g., program structure), or any specific firmware configuration. Rather, each of the functional blocks disclosed herein are merely intended to illustrate a particular functionality e.g., of an associated apparatus.

The time domain to frequency domain converter 322 is arranged to convert time domain data to frequency domain data (e.g., to perform a discrete Fourier transform). It may be that the time domain to frequency domain converter 322 is arranged to repeatedly (e.g., periodically, cyclically, substantially continuously or otherwise) receive (e.g., a stream of) groups of samples of receiver data (the receiver data being time domain data) and to (e.g., successively or otherwise) convert each of the groups of samples of receiver data into corresponding groups of frequency domain samples. The respective groups of samples of the receiver data may be received from the receiver. The respective groups of samples of the receiver data may each be based on a respective detection time window. That is, a group of samples of receiver data may be samples of time domain data received by the receiver within a respective time window.

It may be that each detection time window has a temporal length substantially equal to or at least comprising a temporal tone length of a predefined communication symbol. Accordingly, the predetermined number of receiver data samples belonging to each detection time window may depend on the temporal tone length of the symbol and a sampling rate used in generating the receiver data.

Figure 7A:
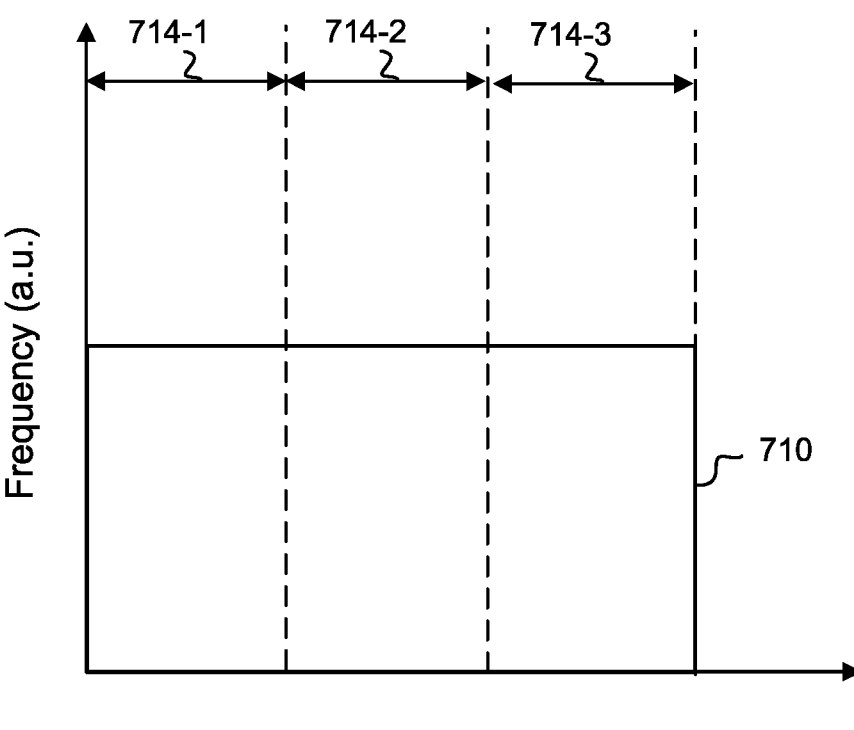
FIGS. 7a-b schematically illustrates example detection time windows of receiver data.

In some examples, successive detection time windows into which the receiver data is apportioned may be contiguous detection time windows. As an illustrative example, FIG. 7a shows an example of contiguous detection time windows 714-1, 714-2, and 714-3 in relation to receiver data 710. As shown, each of the detection time windows may encompass non-overlapping (e.g., temporally discrete) groups of samples of receiver data.

Figure 7B:
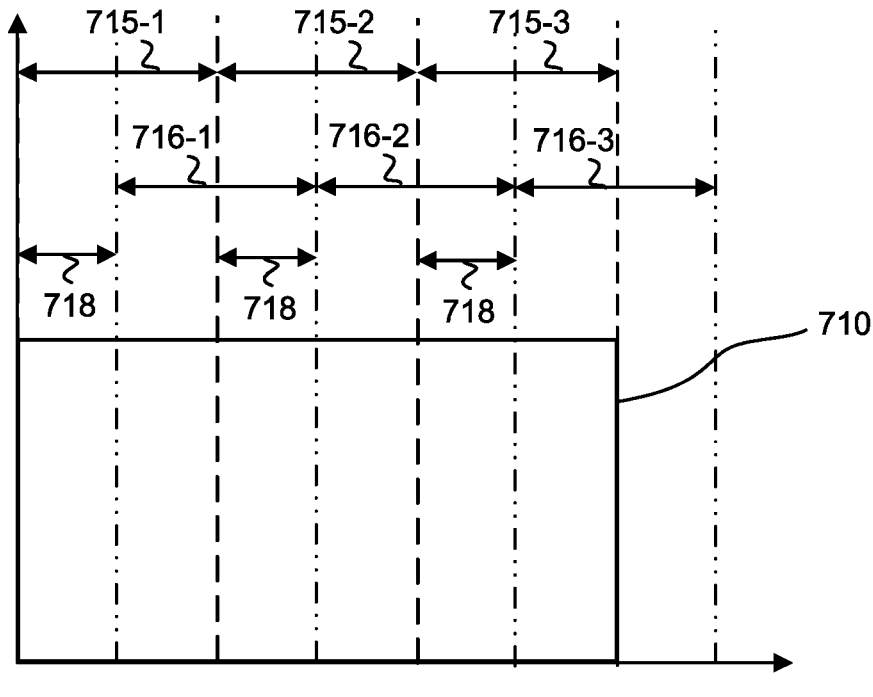

In some examples, the receiver data may be apportioned into respective groups corresponding to a plurality of temporally overlapping and temporally offset detection time windows. In these examples, each of the detection time windows (e.g., each of the detection time windows corresponding to a tone or set of tones to be detected in the symbol) may temporally overlap by a predefined fraction of a temporal tone length (i.e., less than a full temporal tone length) of a predefined communication symbol. For example, the predefined fraction may be any one of an eighth of the said temporal tone length, a quarter of the said temporal tone length, a half of the said temporal tone length, or any other fraction. As an illustrative example, FIG. 7b shows an example of temporally overlapping and temporally offset detection time windows 715-1, 715-2, 715-3, 716-1, 716-2, and 716-3 in relation to the receiver data 710. In the example shown, the detection time windows 716-1, 716-2, and 716-3 are temporally overlapping with and temporally offset from the detection time windows 715-1, 715-2, and 715-3, respectively, by a temporal offset 718. This will be explained in more detail further below.

As discussed above, the time domain to frequency domain converter 322 may convert each of the received respective groups of samples of receiver data into corresponding groups of frequency domain samples. In doing so, the time domain to frequency converter 322 may utilise any suitable technique, including but not limited to the fast Fourier transform (FFT). As an illustrative example, it may be that each of the respective groups of samples of receiver data comprises s samples (e.g., where s is any positive integer including but not limited to any power of 2), and the time domain to frequency domain converter 322 may perform an s-point FFT for each of the said respective groups.

The time domain to frequency domain converter 322 may provide (or make available) each group of frequency domain samples (e.g., as generated based on a corresponding group of transducer samples corresponding to a detection time window of the receiver data) to the one or more combiners 324-1-324-_k_.

As will be discussed further below, the one or more combiners 324-1 to 324-_k_ may be collectively arranged to cyclically or periodically provide (e.g., generate) respective symbol indicator data to enable detection (e.g., by the symbol detector 326) of a predefined communication symbol in the receiver data (or equivalently in the received communication signal), the predefined communication symbol comprising one or more sets of selected frequency tones as discussed herein.

In some examples, it may be that the apparatus 300 comprises a plurality of combiners 324-1 to 324-_k_ arranged to enable detection of a (i.e., the same) predefined communication symbol in the receiver data (or equivalently in the received communication signal) at detection times offset from each other (e.g., the detection times of combiners configured to detect temporally adjacent instances of the predefined communication symbol may be temporally offset by at least a temporal tone length or at least by a detection time window), for example to thereby facilitate detection of the symbol at different times, for example to thereby facilitate detection of different instances of the communication symbol offset from each other in time.

Where a plurality of different communication symbols are provided (e.g., transmitted in parallel), different groups of combiners may be provided at the receiving node, wherein each group of combiners is configured to capture a respective symbol of the plurality of symbols in the received communication signal.

For the sake of simplicity, in the following discussion, the abbreviated expression "one or more sets of the predefined communication symbol" is used to refer to the one or more sets of selected frequency tones of the predefined communication symbol, each of the one or more sets of selected frequency tones comprising one or more selected frequency tones, as discussed.

The number of combiners (i.e., the value of k) 324-1 to 324-_k_ (or the number of combiners in a group of combiners) may depend on the number of sets of the (e.g., respective) predefined communication symbol. For example, it may be that there is a one to one correspondence between combiners and the number of sets of the predefined communication symbol. As an illustrative example, if the predefined communication symbol were to comprise one set, the one or more combiners 324-1 to 324-_k_ may comprise one combiner 324-1. As another illustrative example, if the predefined communication symbol were to comprise two sets, the one or more combiners 324-1 to 324-_k_ may comprise two combiners 314-1 to 314-2 and so on.

Each of the one or more combiners 324-1 to 324-_k_ may be configured to generate data indicative of whether the predefined communication symbol is present in a received communication signal.

For example, it may be that the communication symbol comprises a plurality of sets of frequency tones in a predefined time sequence, each of the plurality of sets of frequency tones comprising one or more frequency tones. It may be that each of the one or more combiners 324-1 to 324-_k_ is configured to combine different frequency components of the frequency domain data over time, the different frequency components corresponding to the respective sets of frequency tones of the predefined communication symbol, in accordance with the temporal order in which the different sets of frequency tones appear in the predefined time sequence of the predefined communication symbol. Thus, after combining the different constituent sets of frequency components of the predefined communication symbol, the respective combiners may each generate data indicative of the presence or absence of the predefined communication symbol in the communication signal. Each of the one or more combiners 324-1 to 324-$k$ may be configured to generate data indicative of the presence (or absence) of the respective sets of frequency tones of the predefined communication symbol in the received communication signal at detection times offset from each other. Thus, at a given time, it may be that each of the one or more combiners 324-1 to 324-$k$ is configured to generate data indicative of the presence (or absence) of a different set of frequency tones of the plurality of sets of frequency tones of the predefined communication symbol.

As an illustrative example, consider a predefined communication symbol comprising two sets of one or more selected frequency tones and two combiners arranged to enable the detection thereof. It may be that the first combiner is arranged to generate data indicative of whether the first set of one or more selected frequency tones is present in the received communication signal, and then later the first combiner is arranged to generate data indicative of whether the second set of one or more selected frequency tones is present in the received communication signal. This process may repeat cyclically such that after generating data indicative of whether the second set of frequency tones is present in the received communication signal, the first combiner reverts to generating data indicative of whether the first set of one or more selected frequency tones is present in the received communication signal. The first combiner may then be arranged to generate data indicative of whether the second set of one or more selected frequency tones is present in the received communication signal, and so on.

It may be that the second combiner is arranged to generate data indicative of whether the first set of one or more selected frequency tones is present in the received communication signal at a detection time offset from the detection time at which the first combiner is arranged to generate data indicative of whether the first set of one or more selected frequency tones is present in the received communication signal. The second combiner may be arranged to later generate data indicative of whether the second set of one or more selected frequency tones is present in the received communication signal. This process may repeat cyclically as above. In this way, each of the example first and second combiners may be arranged to "look" for different sets of the predefined communication symbol at a given time. Accordingly, if the receiver data were to comprise the example predefined communication symbol, one of the first and second combiners may facilitate the detection of the symbol. If the receiver data were to comprise consecutive different instances of the first symbol, the detection of each instance of the first symbol may be facilitated by the first and second combiners respectively.

It may be that for each group of frequency domain values (e.g., corresponding to a detection time window) each of the one or more combiners 324-1 to 324-$k$ is arranged to combine amplitudes of one or more selected frequency components of the group of frequency domain values corresponding to a set of frequency tones of the predefined communication symbol. In some examples, combining amplitudes may comprise accumulating the said amplitudes. In some examples, combining amplitudes may comprise summing the said amplitudes (or e.g., scaled variants thereof).

For each group of frequency domain values, it may be that each of the one or more combiners 324-1 to 324-$k$ selects the amplitudes of the said frequency components to combine in accordance with the one or more selected frequency tones of a particular set of the predefined communication symbol.

In a first example, the one or more combiners 324-1 to 324-$k$ may each comprise a single combiner bin. In a second example, the one or more combiners 324-1 to 324-$k$ may each comprise a plurality of combiner bins. Each of these first and second examples are discussed in turn in the following.

As discussed above, a predefined communication symbol may comprise a plurality of sets of frequency components provided in a predefined time sequence, wherein each of the plurality of sets of frequency components comprise one or more frequency tones.

In accordance with the first example, the combiners 324-1 to 324-$k$ may each comprise a single combiner bin. A respective symbol indicator value associated with each combiner bin of the one or more combiners 324-1 to 324-$k$ may be initialised (e.g., upon start-up of the apparatus 300) to a predetermined default value, such as zero, or any other predetermined default value. For the sake of simplicity, it is assumed that they are initialised to zero, however, it is to be understood that the present disclosure is not so limited.

Following initialisation of the respective symbol indicator values, the symbol indicator values of the combiners 324-1 to 324-$k$ may be updated based on successive groups of frequency domain values from the time domain to frequency domain converter 322, the successive groups of frequency domain values corresponding to successive (e.g., contiguous) detection time windows of the receiver data. In particular, it may be that for each received group of frequency domain values, the symbol indicator values associated with each of the one or more combiners 324-1 to 324-$k$ may be updated based on amplitudes of one or more selected frequencies of that group of frequency domain values, the one or more frequencies being selected in accordance with a respective set of one or more selected frequency tones of the predefined communication symbol.

For example, for a symbol of N sets of frequency tones, each of the sets of frequency tones comprising one or more selected frequency tones, N combiners each comprising a single combiner bin may have their respective associated symbol indicator values updated for each of the sets of frequency components of the predefined communication symbol over a detection time period corresponding to a symbol length. The symbol indicator values associated with the combiner bins of the plurality of combiners may each be updated based on the respective sets of frequency tones of the symbol based on respective time periods in the order in which the sets appear in the predefined time sequence of the symbol. In this way each of the combiners can generate symbol indicator data indicative of the presence or absence of the predefined communication symbol in the received communication signal.

When the symbol indicator value of a combiner bin has been updated based on all of the sets of frequency tones in the predefined communication symbol, the symbol indicator value may be output as symbol indicator data for that combiner to the symbol detector 326. If the predefined communication symbol is present in the received communication signal, and if the sets of frequency tones of the predefined communication symbol in the communication signal are in (e.g., substantial) temporal alignment with the sets of frequency tones based on which the symbol indicator value of a combiner bin is updated, the combiner bin will have a peak value indicating the presence of the symbol in the received communication signal. As will be discussed in more detail below, the symbol detector 326 may detect the peak value, thereby determining the presence of the symbol in the communication signal (and thus, in some examples, the presence of one or more binary digits in the incoming data may be detected depending on the keying method employed).

The symbol indicator values of the respective combiners may be updated based on respective sets of frequency tones of the symbol at times which are correspondingly offset from each other to generate symbol indicator data indicative of the presence or absence of the predefined communication symbol in the received communication signal at times which are offset from each other. This allows different instances of the same symbol in the received communication signal to be detected by different combiners 324-1 to 324-k.

As an illustrative example, consider a predefined communication symbol comprising two sets of one or more selected frequency tones arranged in a predefined time sequence where a first of the two sets is transmitted before the second of the two sets, and two combiners are arranged to enable the detection thereof. It may be that the respective symbol indicator values of the two combiners are initialised to zero. It may be that for a first group of frequency domain samples received post initialisation of the symbol indicator values, the first combiner is arranged to combine (e.g., accumulate or e.g., sum) amplitudes of one or more selected frequency components of the first group of frequency domain samples corresponding to the one or more selected frequency tones of the first set of one or more selected frequency tones and to update its associated symbol indicator value accordingly (e.g., by an amount based on the said combining e.g., by adding the combined value to the symbol indicator value). In this example, it may be that for the first group of frequency domain samples received post initialisation of the symbol indicator values, the second combiner is arranged to not update its symbol indicator value.

Continuing with the above illustrative example, it may be that for a second group of frequency domain samples received post initialisation of the symbol indicator values, the first combiner is arranged to combine (e.g., accumulate or e.g., sum) amplitudes of one or more selected frequency components of the second group of frequency domain samples corresponding to the one or more selected frequency tones of the second set of one or more selected frequency tones and to update its associated symbol indicator value accordingly. In this example, it may be that for the second group of frequency domain samples received post initialisation of the symbol indicator values, the second combiner is arranged to combine (e.g., accumulate or e.g., sum) amplitudes of one or more selected frequency components of the second group of frequency domain samples corresponding to the one or more selected frequency tones of the first set of one or more selected frequency tones and to update its symbol indicator value. In this way, the respective symbol indicator values of the example first and second combiners may be updated based on selected sets of the predefined communication symbol at detection times (e.g., based on detection time windows) offset from each other.

This pattern may be continued such that, for a symbol of k sets of frequency tones, each of the sets of frequency tones comprising one or more selected frequency tones, k combiners each comprising a single combiner bin may have their respective associated symbol indicator values updated for each of the sets of frequency components of the predefined communication symbol over a time period corresponding to a symbol length. That is, after k cycles of each combiner updating its symbol indicator value (k corresponding to the number of sets of the predefined communication symbol, where in this illustrative example k=2) the symbol indicator value associated with that combiner may be output as symbol indicator data to the symbol detector 326 for that combiner and the symbol indicator value for that combiner may be re-initialised to the predetermined default value. For example, with regard to the example first combiner, after updating its associated symbol indicator value based on the second group of frequency domain values, the first combiner may output its symbol indicator value as corresponding symbol indicator data to the symbol detector 326 and may subsequently re-initialise its symbol indicator value to the predetermined default value. With regard to the example second combiner, after updating its associated symbol indicator value based on the third group of frequency domain values, the second combiner may output its symbol indicator value as corresponding symbol indicator data to the symbol detector 326 and may subsequently re-initialise its symbol indicator value to the predetermined default value.

In line with the discussion above, it will be understood that each of the one or more combiners 324-1 to 324-k may (e.g., periodically) output their respective symbol indicator data to the symbol detector 326 after having combined frequency domain values corresponding to the respective sets of frequency components in the order of the predefined time sequence of the predefined communication symbol.

Thus, for each of a plurality of groups of frequency domain values, each of the one or more combiners 324-1 to 324-k may be associated with a different set of the one or more sets of the predefined communication symbol, and for each group of received frequency domain values, the symbol indicator value associated with each combiner bin of each of the one or more combiners 324-1 to 324-k may be updated based on the set of the predefined communication symbol associated with that combiner for that group of frequency domain values. In addition, it may be that the set of the predefined communication symbol associated with each of the combiners 324-1 to 324-k is changed for each successive group of frequency domain values e.g., according to an order in which the sets are provided in the predefined communication symbol. For each group of frequency domain values, it may be that each of the one or more combiners 324-1 to 324-k selects the amplitudes of the said frequency components to combine in accordance with the one or more selected frequency tones of the set of the predefined communication symbol associated with that combiner for that group of frequency domain values. That is, for each group of frequency domain values, it may be that each of the one or more combiners 324-1 to 324-k selects, for combining, the amplitudes of the frequency components of the group of frequency domain values corresponding to the frequencies of the frequency tones of the set of the predefined communication symbol associated with that combiner for that group of frequency values.

Thus, by providing a plurality of combiners having combiner bins which have associated symbol indicator values being each updated based on the respective sets of frequency tones of the symbol in the order in which the sets appear in the predefined time sequence of the symbol, each of the combiners can generate symbol indicator data indicative of the presence or absence of the predefined communication symbol in the received communication signal.

By the symbol indicator values of the respective combiners being updated based on respective sets of frequency tones of the symbol at times which are offset from each other, the respective combiners generate symbol indicator data indicative of the presence or absence of the predefined communication symbol in the received communication signal at times which are offset from each other. This allows different instances of the same symbol in the received communication signal to be detected by different combiners 324-1 to 324-k.

By detecting predefined communication symbols based on: combining amplitudes of one or more selected frequency components of the frequency domain data, the one or more frequency components being selected according to a predefined communication symbol comprising one or more selected frequency tones corresponding to (e.g., having the same frequencies as) the one or more selected frequency components; and detecting the predefined communication symbol in the received communication signal depending on the combined amplitudes of the one or more selected frequency components of the frequency domain data, a flexible and computationally efficient method of encoding and decoding data is provided.

It will be understood that, where the predefined communication symbol consists of a plurality of temporally overlapping frequency tones, it may be that a single combiner having a single combiner bin may be provided. In this case, a symbol indicator value associated with the single combiner bin may be updated (e.g., by accumulation, e.g., summing) based on frequency domain values relating to each of the temporally overlapping tones of the predefined communication symbol from the time domain to frequency domain converter 322 for each of the detection time windows.

The second example of how the combiners may operate may be substantially similar to the first example with the following differences.

As mentioned above, in accordance with the second example, the combiners 324-1 to 324-k may each comprise a plurality of combiner bins. A respective symbol indicator value associated with each of the plurality of combiner bins of the one or more combiners 324-1 to 324-k may be initialised (e.g., upon start-up of the apparatus 300) to a predetermined default value, such as zero, or any other predetermined default value. For the sake of simplicity, it is assumed that they are initialised to zero, however, it is to be understood that the present disclosure is not so limited.

Following initialisation of the respective symbol indicator values, each of the plurality of combiner bins of each of the one or more combiners 324-1 to 324-k may receive a respective stream of successive groups of frequency domain values from the time domain to frequency domain converter 322, the successive groups of frequency domain values corresponding to successive (e.g., contiguous) detection time windows of the receiver data.

For each combiner of the one or more combiners 324-1 to 324-k, a symbol indicator value of each combiner bin of that combiner may be updated based on a different stream of successive groups of frequency domain values from the time domain to frequency domain converter 322. The streams may be temporally offset from each other (e.g., each by a predetermined fraction of a tone length), but they may be temporally overlapping with each other. Successive groups of frequency domain values of each of the said streams may correspond to respective successive detection time windows of the receiver data. The detection time windows of the streams may be temporally overlapping with and temporally offset from each other (e.g., by a predetermined fraction of a tonal length).

As an illustrative example, and referring again to FIG. 7b, the detection time windows 715-1, 715-2, and 715-3 of FIG. 7b may be considered to correspond to a first stream for the provision of successive groups of frequency domain values to a first combiner bin of a combiner, and the detection time windows 716-1, 716-2, and 716-3 of FIG. 7b may be considered to correspond to a second stream, different from the first stream, for the provision of successive groups of frequency domain values to a second combiner bin of the combiner. In this example, the respective detection time windows to which the groups of frequency domain values of the second stream relate are offset from the respective time windows to which the groups of frequency domain values of the first stream relate by half a tone length.

It may be that for each received group of frequency domain values, the symbol indicator values associated with a respective combiner bin of each of the one or more combiners 324-1 to 324-k may be updated based on amplitudes of one or more selected frequencies of that group of frequency domain values, the one or more frequencies being selected in accordance with a respective (e.g., different) set of one or more selected frequency tones of the predefined communication symbol.

The plurality of combiner bins of a combiner may combine (e.g., the symbol indicator values for each of the combiner bins of a combiner may be updated depending on) frequency domain values corresponding to the same set of frequency tones of the symbol in respect of corresponding detection time windows of the respective streams, wherein the corresponding detection time windows of the respective streams in respect of which the combiner bins combine (e.g., in respect of which the symbol indicator values for each of the combiner bins of a combiner are updated depending on) frequency domain values corresponding to the same set of frequency tones of the symbol are temporally offset from each other (e.g., by a fraction of a temporal tonal length) and temporally overlap each other. The set of frequency tones based on which the symbol indicator value of each combiner bin is updated may change for each successive detection time window to the next set of frequency tones in accordance with the order in which the sets of frequency tones are provided in the predefined time sequence of the predefined communication symbol. When the symbol indicator value of a combiner bin has been updated based on all of the sets of frequency tones in the predefined communication symbol, the symbol indicator value may be output to provide symbol indicator data for that combiner bin. When the symbol indicator values of the respective combiner bins of a combiner have been updated based on all of the sets of frequency tones in the predefined communication symbol, the symbol indicator value of the respective combiner bin is combined (e.g., concatenated) with the symbol indicator values of any combiner bins of the combiner which have already been updated based on all of the sets of frequency tones in the predefined communication symbol. When the symbol indicator values of all of the combiner bins of the combiner have been combined, symbol indicator data based on the combination of the symbol indicator values for that combiner may be output to the symbol detector 326.

The symbol indicator values of the respective combiner bins of the combiner may thus be updated based on respective sets of frequency tones of the symbol at times which are temporally offset from each other to generate symbol indicator data indicative of the presence or absence of the predefined communication symbol in the received communication signal at times which are temporally offset from each other. In this way, the symbol indicator data for each of the one or more combiners of the second example may provide for a more granular indication of the presence or absence of the predefined communication symbol relative to e.g., the symbol indicator data for each of the one or more combiners of the first example. Accordingly, as will be discussed further below, the symbol indicator data for each of the one or more combiners of the second example may enable a more robust determination of the presence or absence of the predefined communication symbol in the received communication signal by disambiguating which of two combiners captures an instance of a communication symbol (or equivalently each selected frequency tone thereof) in the received communication signal. This will be explained in more detail below.

As in the first example above, the symbol indicator data of the respective combiners are based on frequency domain data corresponding to the respective sets of frequency tones of the symbol detected at times which are offset from each other. As such, the respective combiners again generate symbol indicator data indicative of the presence or absence of the predefined communication symbol in the received communication signal at times which are offset from each other. As before, this allows different instances of the same symbol in the received communication signal to be detected by different combiners 324-1 to 324-$k$.

It may be that the symbol indicator values associated with corresponding combiner bins of the different combiners are updated based on different sets of frequency tones of the predefined symbol obtained based on communication signals received in the same time window (e.g., from the same stream or a corresponding stream from another sensor (e.g., piezo-electric transducer, strain gauge or accelerometer) for the same time window). For example, based on a communication signal received in a first detection time window, the symbol indicator value associated with a first combiner bin of a first combiner may be updated based on a first frequency tone (or first set of tones) of the predefined communication symbol while the symbol indicator value associated with a first combiner bin of a second combiner may be updated based on a second frequency tone (or second set of tones) of the predefined communication symbol temporally adjacent to the first frequency tone (or first set of tones) in the predefined time sequence of the predefined communication symbol.

As in the first example above, the symbol indicator values of the corresponding combiner bins of the respective combiners may be updated based on respective sets of frequency tones of the symbol at times which are offset from each other to generate respective symbol indicator data indicative of the presence or absence of the predefined communication symbol in the received communication signal at times which are offset from each other. As above, the set of frequency tones based on which the symbol indicator value of each combiner bin is updated may change for each successive detection period to the next set of frequency tones in accordance with the order in which the sets of frequency tones are provided in the predefined time sequence of the predefined communication symbol. In this way, different instances of the same symbol in the received communication signal may be detected by different combiners 324-1 to 324-$k$.

To illustrate an example operation of combiner bins, FIGS. 8$a$-$e$ depict example log data pertaining to an example plurality of combiner bins, the example plurality comprising eight combiner bins labelled "acc_bin 0", "acc_bin 1", "acc_bin 2", "acc_bin 3", "acc_bin 4", "acc_bin 5", "acc_bin 6", and "acc_bin 7", as listed in the example log data at positions corresponding to that indicated by the dashed box 810 in FIG. 8$a$.

Each of the eight combiner bins acc_bin 0 to acc_bin 7 may individually relate to a different one of eight example combiners. It may be that, in accordance with the first example disclosed herein, each of the said eight combiners comprises a single combiner bin only (e.g., a single one of the combiner bins acc_bin 0 to acc_bin 7 e.g., a first combiner of the eight combiners may comprise the "acc_bin 0" combiner bin only, a second combiner of the eight combiners may comprise the "acc_bin 1" combiner bin only, and so on). Alternatively, it may be that, in accordance with the second example disclosed herein, each of the said eight combiners comprises a respective plurality of combiners (e.g., a single one of the combiner bins acc_bin 0 to acc_bin 7 in addition to other combiner bins not shown, e.g., a first combiner of the eight combiners may comprise a plurality of combiner bins including the combiner the "acc_bin 0" combiner bin, a second combiner of the eight combiners may comprise a plurality of combiner bins including the "acc_bin 1" combiner bin, and so on).

The respective symbol indicator values associated with each of the combiner bins acc_bin 0 to acc_bin 7 are listed in the example log data at positions corresponding to that indicated by the dashed box 812. The amounts added to the symbol indicator values associated with the combiner bins acc_bin 0 to acc_bin 7 for each respective detection time window are listed in the example log data at positions corresponding to that indicated by the dashed box 813.

The example log data shown in FIGS. 8$a$-$e$ relates to the capturing of one communication symbol comprising eight selected frequency tones, denoted $f_1$-$f_8$, provided sequentially in the following time sequence: $f_1$, $f_2$, $f_3$, $f_4$, $f_5$, $f_6$, $f_7$, $f_8$.

The example log data shown in FIGS. 8$a$-$e$ shows an example way in which each of the symbol indicator values of the combiner bins acc_bin 0 to acc_bin 7 may be updated across a total of nine detection time windows (each of the nine detection time windows corresponding to respective groups of frequency domain values generated based on respective portioned of a received communication signal in accordance with examples disclosed herein) encompassing the predefined communication symbol discussed above, wherein the particular detection time window to which respective portions of the example log data relate is specified in corresponding positions to that indicated by the dashed box 814 in FIG. 8$a$.

In the example log data shown in FIGS. 8$a$-$e$, for a given detection time window (having associated frequency domain data in accordance with examples disclosed herein), the symbol indicator value associated with each of the combiner bins acc_bin 0 to acc_bin 7 is updated based on a different one of the eight selected frequency tones of the communication symbol (e.g., based on an amplitude of a frequency component of the frequency domain data for that detection time window corresponding to a different one of the eight selected frequency tones of the communication symbol).

The selected frequency tone of the eight selected frequency tones $f_1$-$f_8$ of the communication symbol based on which each of the combiner bins updates its symbol indicator value for a particular detection time window is specified in the example log data at positions corresponding to that indicated by the dashed box 816 in FIG. 8$a$.

It can be seen from the example log data shown in FIGS. 8*a-e*, that the selected frequency tone of the communication symbol based on which each of the combiners updates its symbol indicator value is varied for each detection time window in accordance with the time sequence order in which the selected frequency tones are provided in the communication symbol. For example, for Detection Time Window 1, it can be seen that the acc_bin 0 combiner bin updates its symbol indicator value based on the $f_1$ frequency tone (e.g., based on an amplitude of a frequency component of the frequency domain data for Detection Time window 1 corresponding to the $f_1$ frequency tone), and for the next detection time window (Detection time Window 1), it can be seen that the acc_bin 0 combiner bin updates its symbol indicator value based on the next selected frequency tone in the order in which the selected frequency tones of the communication symbol are provided (frequency tone $f_2$), and so on. Similarly, for Detection Time Window 1, it can be seen that the acc_bin 1 combiner bin updates its symbol indicator value based on the $f_2$ frequency tone, and for the next detection time window (Detection Time Window 2), it can be seen that the acc_bin 1 combiner bin updates its symbol indicator value based on the next selected frequency tone in the order in which the selected frequency tones of the communication symbol are provided (frequency tone $f_3$), and so on.

In the example log data shown in FIGS. 8*a-e*, a first of the above-discussed communication symbols comprising the tones f-$f_8$ is present in the received communication signal such that the $f_1$ tone thereof resides in Detection Time Window 1, the $f_2$ tone thereof resides in Detection Time window 2, the $f_3$ tone thereof resides in Detection Time Window 3, and so on. By Detection Time Window 9, no frequency components of that first communication symbol are present in the received communication signal. Accordingly, it can be seen that for each of the Detection Time Windows 1-8 shown in FIGS. 8*a-d*, the symbol indicator value of the acc_bin 0 is correspondingly updated. After Detection Time Window 8 (i.e., after k cycles of that combiner bin having updated its symbol indicator value (k corresponding to the number of sets of the predefined communication symbol, where in this illustrative example k=8)), the symbol indicator value of the acc_bin 0 may be output as (e.g., part of) symbol indicator data for the corresponding combiner, and the said symbol indicator value is re-initialised to default value, which is zero in this example.

For Detection Time Window 9, the acc_bin 0 combiner bin is configured to update its symbol indicator value based on the $f_1$ frequency tone again. However, no $f_1$ frequency tones of the communication symbol are present in the received communication signal during Detection Time Window 9. Accordingly, the symbol indicator value of the acc_bin 0 combiner bin is updated by a much smaller amount (e.g., due to noise) than when it was updated for Detection Time Windows 1-8.

In accordance with the first example disclosed herein, it may be that following Detection Time Window 8, the symbol indicator value of the acc_bin 0 combiner bin is output as symbol indicator data for that combiner. Alternatively, in accordance with the second example disclosed herein, in may be that following Detection Time window 8, the symbol indicator value of the acc_bin 0 is output (e.g., to a buffer or memory) for combining (e.g., concatenating) with other symbol indicator values of other combiner bins of that combiner.

Different instances of the predefined communication symbol start to be captured in detection windows 2, 4, and 7 by acc_bin7, acc_bin5 and acc_bin2 respectively.

While the above discussed first and second examples each relate to a predefined communication symbol comprising a plurality of sets of frequency components provided in a predefined time sequence, the present disclosure is not so limited. In examples where a predefined communication symbol comprises a single set of one or more temporally overlapping selected frequency tones, a single combiner having the functionality of any one of the combiners discussed above in relation to both the first and second examples may be arranged to provide for detection of the said predefined communication symbol.

In either of the first or second examples of how the combiners 324-1 to 324-*k* may operate, the symbol detector 326 may be arranged to detect the predefined communication symbol in a received communication signal (e.g., the receiver data) depending on respective symbol detection data of the combiner (i.e., the combined amplitudes of the one or more selected frequency components of the frequency domain data). That is, the symbol detector 326 may be arranged to detect the predefined communication symbol in the received communication symbol based on the symbol indicator data provided thereto by the one or more combiners 324-1 to 324-*k*.

In accordance with the first and second examples described above of how the combiners 324-1 to 324-*k* may operate, it may be that the symbol detector 326 is arranged to detect the predefined communication symbol based on the symbol indicator data using peak detection. Any suitable peak detection method may be employed. For example, it may be that the symbol detector 326 is arranged to detect the predefined communication symbol based on a determination of a peak value in the symbol indicator data and a comparison of the peak value to a predetermined threshold, or using any other suitable method.

In accordance with the second example described above, it may be that the symbol detector is arranged to detect the predefined communication symbol based on the symbol indicator data comprising a combination of associated symbol indicator values of the corresponding combiner bins based on a composition or a distribution (e.g., a shape) of the symbol indicator data points.

For example, the symbol detector 326 may be arranged to detect the predefined communication symbol based on the symbol indicator data using any or one or more of the following techniques: clustering based techniques, including but not limited to either of k means clustering and fuzzy C-Means clustering; window-threshold based techniques; wavelet transform based techniques; Hilbert transform based techniques; artificial neural network based techniques; techniques using templates; morphology filtering based techniques; nonlinear filtering based techniques; Kalman filtering based techniques; Gabor filtering based techniques; Gaussian second derivative filtering based techniques; linear prediction analysis based techniques; higher-order statistics based techniques; Empirical Mode Decomposition based techniques; techniques based on hidden Markov models; Savitzky-Golay filtering based techniques; techniques based on a smoother nonlinear energy operator; any other suitable technique.

It may be that the symbol detector 326 is arranged to detect the predefined communication symbol based on a ratio of a peak (e.g., maximum) value of the symbol indicator data to a trough (e.g., minimum) value of the symbol indicator data for the respective combiner. For example, it may be that the symbol detector is arranged to detect the predefined communication symbol based on a value of one minus said ratio (i.e., a value of 1-R, where R is the ratio of a peak (e.g., maximum) value of the symbol indicator data to a trough (e.g., minimum) value of the symbol indicator data). It may be that the symbol detector is arranged to detect the predefined communication symbol based on said value being greater than a threshold (e.g., a threshold of 0.5 or 0.6). Additionally or alternatively, it may be that the symbol detector is arranged to detect the predefined communication symbol based on pattern recognition in the symbol indicator data.

In some examples, it may be that a selected frequency tone of a communication symbol spans part of one detection time window and part of the next (e.g., contiguous) detection time window i.e., it may be that the said selected frequency tone of the said communication symbol temporally resides in a received communication signal such that when the received communication signal is apportioned according to a plurality of detection time windows in accordance with any example disclosed herein, the said selected frequency tone spans two successive detection time windows.

In these examples, if a first combiner is to update its symbol indicator value based on the said selected frequency tone in a first detection time window in which it resides (e.g., update its symbol indicator value based on an amplitude of a frequency component corresponding to the said selected frequency tone of the frequency domain data for the said first detection time window), and if a second combiner (different from the first combiner) is to update its symbol indicator value based on the said selected frequency tone in a next detection time window in which it resides (e.g., update its symbol indicator value based on an amplitude of a frequency component corresponding to the said selected frequency tone of the frequency domain data for the said next detection time window), it may be that both combiners ambiguously update their respective symbol indicator values based on the same frequency tone of the same communication symbol.

Accordingly, in some circumstances, such as when each combiner comprises a single combiner bin (in accordance with the first example disclosed herein), it may be that any peak value of respective symbol indicator data generated by the said combiners based on such a frequency tone or tones spanning different detection windows may not be well defined.

Advantageously, the more granular symbol indicator data of the combiners of the second example disclosed herein may for provide for clearer peak detection in the above-described circumstance where selected frequency tone(s) of a communication symbol span different detection windows by disambiguating which of the two combiners captures the communication symbol (or equivalently each selected frequency tone thereof).

As discussed above, each set of frequency tones of a symbol has a tone length. The tone length for a symbol may be selected to match a length of the FFT used to convert the received time domain communication signal comprising the communication symbol to the frequency domain. The equation below shows relationship between the frequency resolution of the FFT ($\Delta f$) and the sampling frequency:

$$\Delta f = f_s / N$$

where $\Delta f$ is the spectral resolution (Hz), $f_s$ is the sampling frequency and N is the length of the FFT. Based on the restriction above:

$$L_p = N / f_s$$
$$L_p = 1 / \Delta f$$

where $L_p$ is the pulse length in seconds
Channel Symbol Rate=$1/L_p$
In an example:
N=2048
$f_s$=8522 Hz
$\Delta f$=4.16 Hz
Lp=0.24 seconds In this case, if the bandwidth of a passband is 100 Hz, 24 orthogonal carriers lie across the passband. That is, a constellation of 24 carriers per passband may be defined. There is therefore in this case a theoretical maximum of 24 frequency tones in a symbol (assuming one tone per set) and in theory 24 orthogonal symbols can be built from 24 tones. In practice this figure may be halved. The more tones per symbol (increased $L_p$), the greater the signal compression ratio (1/N) of the pulse captured by the combiners, the greater the noise immunity of the symbol and the number of orthogonal symbol sequences that can be simultaneously encoded with bits. However, the symbol rate $1/L_p$ is correspondingly reduced.

Thus, by providing an increased number of frequency tones per symbol, improved noise immunity may be achieved due to increased frequency diversity. By providing frequency tones spread across different passbands in a communication symbol, improved noise immunity may be achieved due to increased frequency diversity. This may be at no cost to data rate compared to a symbol comprising the same number of tones in a single frequency band.

By providing frequency tones in a predefined time sequence (rather than frequency tones temporally overlapping in time), improved noise immunity may be achieved due to increased temporal diversity in the signal (e.g., where the transfer function of the communication channel is fast changing). This may come at the cost of a reduced data rate compared to providing temporally overlapping frequency tones in a symbol.

As discussed above, it may be that different communication data is communicated (e.g., simultaneously or substantially simultaneously) using different predefined communication symbols (and in some cases different encoding schemes) which may be orthogonal or pseudo-orthogonal to each other. In this case, it may be that the apparatus 300 is configured to decode first communication data in units of one or more first predefined communication symbols each comprising one or more selected frequency tones (e.g., one or more sets of one or more frequency tones) and second communication data in units of one or more second predefined communication symbols each comprising one or more selected frequency tones (e.g., one or more sets of one or more frequency tones), wherein the second predefined communication symbols are different from (e.g., orthogonal or pseudo-orthogonal to) the first predefined communication symbols. It may be that the apparatus 300 is configured to receive the first communication data and the second communication data simultaneously. It may be that the apparatus 300 is configured to decode the first communication data and the second communication data simultaneously.

As discussed above, the communication symbols based on which the different communication data may be encoded and decoded may differ from each other by way of one or both of a number of constituent frequency components (or sets of constituent frequency components) per symbol and the constituent frequency components (or sets of constituent frequency components) of the symbol. Additionally or alternatively, the symbols may differ from each other by way of the temporal configuration of the constituent frequency components of the symbol, such as whether the frequency components are temporally overlapping or whether they are provided in a predefined time sequence or any combination thereof.

In an example, the first communication data may comprise relatively low-bit rate command or control data (e.g., first communication data to be communicated from a first, e.g., surface node to a second, e.g., downhole node to command or control a second node to transmit particular data to the first node or to communicate communication settings from the first node to the second node) and the second communication data may comprise relatively higher-bit rate packetized data, such as sensor data from one or more downhole sensors (e.g., from a first, e.g., downhole node to a second, e.g., surface node).

It may be that the first communication data is of higher priority than the second communication data; that is, it may be more important that the first communication data is received by the second node than for the second communication data to be received by the second node. Accordingly, it may be that the first communication symbol is to have greater noise immunity than the second communication symbol.

In this case, the first communication symbols may comprise a greater number of frequency tones per symbol than the second communication symbols to provide increased frequency diversity (and therefore improved noise immunity). It may be that the first communication symbols may comprise a plurality of sets of frequency tones (each set comprising one or more frequency tones) in a predefined time sequence, whereas the second communication symbols may comprise a temporally shorter predefined time sequence, a single frequency tone or a plurality of temporally overlapping frequency tones to provide the first symbols with increased temporal diversity (and therefore improved noise immunity) as compared to the second symbols.

As also mentioned above, it may be that a first predefined communication symbol is to be captured by a first group of combiners of the apparatus 300 and a second predefined communication symbol is to be captured by a second group of combiners of the apparatus 300. In each case, the combiners of the first and second groups may each comprise a single combiner bin in accordance with the first example combiners described above or a respective plurality of combiner bins to combine data for a respective plurality of temporally overlapping and temporally offset detection windows in accordance with the second example combiners described above.

The operation of the combiners described above (i.e., each of the combiners outputting, at times offset from each other, their respective symbol indicator data to the symbol detector 326 after having combined frequency domain values corresponding to the respective sets of frequency components in the order of the predefined time sequence of the predefined communication symbol) may be considered a symbol detection mode of the combiners. In the symbol detection mode, it may be that the symbol indicator data of the respective combiners (e.g., the combiners of a group of combiners configured to capture the same communication symbol) is provided to the symbol detector 326 (e.g., in a temporal sequence) for symbol detection, at times temporally offset from each other, for example after frequency domain values corresponding to (all of) the respective sets of frequency components of the predefined communication symbol have been combined by the combiner bin(s) of the combiner, for example in the order of the predefined time sequence of the predefined communication symbol.

In the event that there are any frequency tones in the first communication symbol which also appear in the second communication symbol (e.g., at different portions of the symbols), or in the event that significant noise appears at particular frequencies of one of the first and second communication symbols, it may be erroneously determined by the symbol detector 326 based on the signal detection data provided by one or more of the combiners operating in the symbol detection mode, that the first or second communication symbol is present in the received communication signal. This may depend on the relative temporal alignment between such frequencies appearing in the received communication signal and the times at which the respective combiner bins of the first and second groups of combiners are configured to update their signal detection values based on those frequency components. Additionally or alternatively, signal reflections on the communication channel can cause symbol ambiguity—that is, signal reflections can cause one symbol to look like another at the receiving node. Again, this may depend on the relative temporal alignment between frequencies of reflected signals appearing in the received communication signal and the times at which the respective combiner bins of the first and second groups of combiners are configured to update their signal detection values based on those frequency components.

Although the symbols can be designed to mitigate against frequency tones or combinations of frequency tones of the first communication symbol also appearing in the second communication symbol, thereby reducing false symbol detections, it is more difficult to mitigate against signal reflections causing one symbol to look like another at the receiving node.

Accordingly, in order to reduce the possibility of erroneous symbol detection, it may be that the combiner bins of the combiners are (e.g., initially) operated in an onset detection mode so as to discriminate which symbol of the first and second predefined communication symbols is being detected. The apparatus may be to switch to the symbol detection mode after the symbol of the first and second predefined communication symbols being captured is determined (e.g., after it has been determined which of the first and second predefined communication symbols is being captured in the received communication signal) in the onset detection mode. After the symbol of the first and second predefined communication symbols being captured is determined in the onset detection mode, it may be that the apparatus is to stop or pause attempting to detect the other of the first and second predefined communication symbols (i.e., the symbol determined not to be present in the received communication signal) so as to save processing resource and electrical power.

It may additionally or alternatively be determined more quickly in the onset detection mode than in the symbol detection mode which of first and second predefined communication symbols is being captured in the received communication signal, thereby allowing the apparatus to stop or pause attempting to detect the other of the first and second predefined communication symbols (i.e., the symbol determined not to be present in the received communication signal) so as to save processing resource and electrical power more quickly.

The onset detection mode is described in more detail as follows.

It may be that the predefined communication symbol comprises a plurality of selected frequency tones provided sequentially in a predefined time sequence. It may be that the combining is to be performed by a combiner having an associated symbol indicator value, wherein the symbol indicator value associated with the combiner is updated based on amplitudes (e.g., by combining, e.g., summing amplitudes) of selected frequency components of the frequency domain data corresponding to the respective selected frequency tones of the symbol according to the predefined time sequence of the symbol. The combiner may cycle through different frequency components of the frequency domain data derived from the received communication signal according to the predefined time sequence of frequency tones of the predefined communication symbol, combining the amplitudes of the respective frequency components in the symbol indicator value.

As discussed, in some examples, it may be that the predefined communication symbol comprises a plurality of sets of selected frequency tones provided sequentially in a time sequence, wherein each of the sets of selected frequency tones of the sequence comprises one or more selected frequency tones (e.g., each of the sets of selected frequency tones comprising one or more selected frequency tones in parallel, e.g., partially or fully overlapping each other in time). In this case, for each detection time window, the symbol indicator value may be updated depending on amplitudes (e.g., by combining, e.g., summing amplitudes) of one or more selected frequency components of the frequency domain data corresponding to a respective set of selected frequency tones of the sequence of sets defined by the symbol as the combiner cycles through the sets of tones of the sequence defined by the symbol.

The onset detection mode may comprise determining (e.g., by the processing circuitry 320) whether the received communication signal comprises the predefined communication symbol depending on a variation over time (e.g., over a plurality of, e.g. consecutive, detection time windows) of the symbol indicator value associated with the combiner. For example, it may be determined that the received communication signal comprises the predefined communication symbol depending on the symbol indicator value associated with the combiner increasing over time (e.g., over a plurality of, e.g. consecutive, detection time windows). For example, it may be determined that the received communication signal comprises the predefined communication symbol depending on the symbol indicator value associated with the combiner indicating that a predefined number of the selected tones of the communication symbol have been detected in the received communication signal, for example by way of a predefined number of step increases in the value of the symbol indicator value, e.g., wherein each of the predefined number of step increases are step increases greater than or equal to a predefined threshold quantity.

In a specific illustrative example, a predefined communication symbol may comprise N Tones in a temporal sequence, such as N=32 tones, where the amplitudes of the respective tones H(0) to H(N−1), for example H(0) to H(31), of the symbol in the received communication signal vary as follows (in the frequency domain, arbitrary units)

|H(0)=10|H(1)=15|H(2)=10| . . . |H(31)=12|

The symbol indicator value for the combiner may vary over time by summing the respective selected frequency components for each respective detection time window as the combiner cycles through the tones of the symbol as follows:

|10|25|35| . . . ‖

The contribution of each detected tone (or, in some examples, a set of tones comprising a plurality of tones) of the symbol to the symbol indicator value may be determined by comparing the symbol indicator value for the previous detection time window with the symbol indicator value updated for the current detection time window. That is, the difference (delta) between the symbol indicator value for the current detection time window and the symbol indicator value for the immediately temporally previous detection time window is the contribution of the tone (or, in some examples, a set of tones comprising a plurality of tones) detected in the current detection time window. A threshold delta value may be defined (e.g., predefined), above which it may be considered that a respective tone (or, in some examples, a respective set of tones comprising a plurality of tones) of the communication symbol has been detected successfully. That is, if the difference between the symbol indicator value updated for the immediately previous detection window and the symbol indicator value updated for the current detection window is greater than the threshold delta value, it is considered that the tone(s) of the symbol to be detected in the current detection time window has (have) been successfully detected. For example, in the arbitrary units of the example shown above, a delta threshold of '8' may be defined. In this case, if the difference between the symbol indicator value for the immediately previous detection window and the symbol indicator value updated for the current detection window is greater than '8', then it may be considered that the tone(s) has (have) been successfully detected.

If a sufficient number of tones of the communication symbol is successfully detected on this basis, it may be considered that the communication symbol is being detected in the received communication signal. For example, if the number of tones of the communication symbol successfully detected is greater than or equal to a threshold number, K, then it may be determined that the communication symbol is being detected in the received communication signal. It may be that K is less than the total number of tones in the communication symbol. For example, in examples in which the communication symbol comprises N=32 tones, K may be set to 12 (for example). Thus, it may be determined before the combiner has cycled through all of the tones of a given communication symbol that the symbol is present in the received communication signal. Continuing with the above specific example, Delta values indicating the contributions of specific tones may be calculated by comparing the symbol indicator value of a previous detection time window with the symbol indicator value of a current detection time window as follows.

Immediately Previous Detection Time Windows
    symbol_indicator_value=0|symbol           indicator
       value=10|symbol indicator value=25
Current Detection Time Windows
    symbol_indicator_value=10|symbol indicator value=25|
       symbol indicator value=35

Thus, the delta values are:

Delta=10|Delta=15|Delta=10

In this case, for the first three detection time windows, "Delta" exceeds the predefined threshold of 8 in each case, resulting in a count of three successfully detected tones for the first three detection time windows. When a count of more than K (e.g., K=12) successfully detected tones of the communication symbol is obtained (before all of the tones of the communication symbol have been cycled through by the combiner), it may be determined that the communication symbol is being detected in the received communication signal.

Upon determining that a combiner is validly detecting a predefined communication symbol, that combiner (and in some examples other combiners configured to detect the predefined symbol) may be transitioned to symbol detection mode in which the processing circuitry 320 is configured to detect, depending on the symbol indicator value of the combiner obtained after cycling through (all of) the tones of the symbol, instances of the symbol in the received communication signal.

If a sufficient number of tones of the communication symbol is not successfully detected on this basis, it may not be determined (e.g., by the processing circuitry 320) that the communication symbol is being detected in the received communication signal. If a sufficient number of tones of the communication symbol is not successfully detected on this basis, it may be determined (e.g., by the processing circuitry 320) that the communication symbol is not being detected in the received communication signal.

It may be determined (e.g., by the processing circuitry 320) that a combiner is not validly detecting a predefined communication symbol depending on the determination that another combiner (e.g., a combiner of another group of combiners) is validly detecting a corresponding (e.g., different) predefined symbol, for example if only one of the first and second combiners can validly detect a corresponding predefined symbol according to the communication protocol. Additionally or alternatively, it may be determined (e.g., by the processing circuitry 320) that a combiner is not validly detecting a predefined communication symbol depending on a determination that that combiner is not validly detecting a corresponding predefined symbol. For example, based on a determination that a sufficient number of (e.g., K) tones of the communication symbol is not being detected by the combiner, it may be determined (e.g., by the processing circuitry 320) that a combiner is not validly detecting a predefined communication symbol.

Upon determining that a combiner is not validly detecting a predefined communication symbol, operation of that combiner may be paused or stopped (e.g., by the processing circuitry 320).

It will be understood that, although the specific example above describes a particular way in which the variation in time of the symbol indicator value may be analysed, the present disclosure is not so limited and any other suitable analysis of the variation in time of the symbol indicator value may be performed.

For example, it may be determined (e.g., by the processing circuitry 320) whether the received communication signal comprises the predefined communication symbol depending on the trend of the symbol indicator value over time, for example depending on whether the symbol indicator value maintains a (e.g., positive) rate of change greater than or equal to a predefined threshold (e.g., positive) rate of change over a predetermined time period.

It will be understood that, if the symbol indicator value of the combiner increases over time in line with what would be expected if the communication symbol were present in the received communication signal, it can be determined with confidence (e.g., by the processing circuitry 320) that the symbol is being detected in the received communication signal. By way of contrast, if the symbol indicator value of the combiner does not increase over time in line with what would be expected if the communication symbol were present in the received communication signal, it can be determined with confidence (e.g., by the processing circuitry 320) that the symbol is not being detected in the received communication signal. The variation (e.g., trend) of the symbol indicator value over time provides additional information beyond the final symbol indicator value obtained after all of the tones of the symbol have been cycled through by the combiner. This allows a determination to be made sooner (e.g., as K may be significantly less than the total number of tones in the symbol) and more accurately (e.g., by the processing circuitry 320) as to whether a particular communication symbol is present in the received communication signal. This allows combiners corresponding to symbols detected in the received communication signal to be switched to the symbol detection mode more quickly, and with greater confidence. Additionally or alternatively, combiners corresponding to symbols determined not to be in the received communication signal can be paused or switched off sooner, saving battery power and processing resource.

Thus, if the processing circuitry 320 were to be operating first and second combiners in onset detection mode, the first combiner being configured to capture a first predefined communication symbol and the second combiner being configured to capture a second predefined communication symbol (e.g., different from the first symbol), it may be determined, based on their symbol indicator values, that the first combiner is validly detecting the first predefined communication symbol in the received communication signal and the second combiner is not detecting a second predefined communication symbol in the received communication signal. Upon determining that the first combiner is validly detecting the first predefined communication symbol, the first combiner (and in some examples other combiners configured to detect the first predefined communication symbol) may be transitioned to the symbol detection mode. Operation of the second combiner (and in some examples other combiners configured to detect the second predefined communication symbol) may be stopped or paused, for example based on the determination that the first combiner is validly detecting the first predefined symbol (e.g., if only one of the first and second combiners can validly detect a corresponding predefined symbol according to the communication protocol) or based on the determination that the second combiner is not validly detecting the second predefined symbol (e.g., if it is possible for both the first and second combiners to validly detect a corresponding predefined symbol according to the communication protocol).

For example, during operation, the apparatus 300 may be arranged to always attempt to detect the first communication data (which may comprise higher priority data such as command or control data, or data indicative of a communications protocol to be used by the node) and to switch between attempting to detect and not attempting to detect the second communication data (which may comprise lower priority data such as sensor data) depending on whether it is determined in onset detection mode that the symbols of the second communication data are being validly detected.

It may be that the combiner is arranged to receive preamble data prior to receiving a data payload. For example, it may be that one or both of the first and second communication data discussed herein comprises a combination (e.g., a concatenation) of preamble data and payload data. Preamble data may comprise a known (e.g., predefined) pattern (e.g., ordered sequence) based on a respective predefined symbol. It may be that the combiner is arranged to operate in onset detection mode until an incoming valid symbol (e.g., of the preamble data) is detected thereby, after which the combiner (and in some examples other combiners configured to detect said predefined symbol) may transition into symbol detection mode for detection of the corresponding communication data (e.g., the preamble data and payload data). Following said detection, the combiner(s) may transition back to onset detection mode or remain in symbol detection mode for a predetermined time period and transition back to onset detection mode if a new symbol is not detected within the predetermined time period. In these examples, the presence of the preamble data may provide for a more robust detection of the corresponding payload data.

In other examples, the combiner may be arranged to receive payload data of communication data not preceded by preamble data. In these examples, the said communication data may comprise a single communication symbol. In these examples, the combiner may be arranged to operate in onset detection mode until an incoming valid symbol (e.g., of the communication data comprising a single communication symbol) is detected thereby, at which point the combiner may transition to symbol detection mode. Following a detection of the corresponding symbol, the combiner may revert to onset detection mode for detection of the next incoming symbol. In these examples, it may be the said single communication symbol is a particularly noise immune communication symbol (e.g., owing to its selected frequency tone configuration, in accordance with examples disclosed herein).

As set out above, the processing circuitry 320 may be configured to perform the combining by a plurality of combiners (e.g., a group of combiners configured to capture the symbol in the received communication signal, for example at times offset from each other), each of the plurality of combiners having an associated symbol indicator value, wherein the symbol indicator value associated with each of the combiners is updated based on amplitudes (e.g., by combining, e.g., by summing amplitudes) of selected frequency components of the frequency domain data corresponding to the respective selected frequency tones of the symbol according to the predefined time sequence of the symbol. The respective combiners of the plurality of combiners may be to capture the predefined communication symbol at times which are temporally offset from each other (e.g., to thereby detect different data streams comprising the predefined communication symbol). In this case, in the onset detection mode, it may be determined whether the received communication signal comprises a predefined communication symbol depending on a variation over time (e.g., over a plurality of, e.g. consecutive, detection time windows) of an onset value, wherein the onset value comprises or consists of the highest symbol indicator value of the symbol indicator values of the plurality of combiners at a given time. In this way, the symbol indicator value of the combiner most likely to be detecting the communication symbol may be monitored without having to monitor the variation in time of the symbol indicator value of each of the combiners individually.

As also set out above, it may be that the combiner, or each of the plurality of combiners, comprises a plurality of combiner bins, each of the combiner bins having an associated symbol indicator value, wherein the symbol indicator values associated with the respective combiner bins are updated based on amplitudes (e.g., by combining, e.g., by summing amplitudes) of respective frequency components of the frequency domain data corresponding to the respective selected frequency tones of the symbol according to the predefined time sequence of the symbol at times offset from each other, e.g., the time offsets between combiner bins (or at least between temporally adjacent combiner bins) being less than a tone length (or a detection time window corresponding to a respective tone of the symbol) in the time sequence. In this case, in the onset detection mode, it may be determined whether the received communication signal comprises a predefined communication symbol depending on a variation over time (e.g., over a plurality of, e.g. consecutive, detection time windows) of an onset value, wherein the onset value comprises or consists of the highest symbol indicator value of the symbol indicator values of the plurality of combiner bins (if there are also a plurality of combiners, such as a group of combiners configured to capture the symbol in the received communication signal, for example at times offset from each other, the highest symbol indicator value of the symbol indicator values of the plurality of combiner bins of the plurality of combiners) at a given time. In this way, the symbol indicator value of the combiner bin most likely to be detecting the communication symbol may be monitored without having to monitor the variation in time of the symbol indicator value of each of the combiner bins individually.

As above, it may be determined (e.g., by the processing circuitry 320) whether the received communication signal comprises the predefined communication symbol depending on a variation over time (e.g., over a plurality of, e.g. consecutive, detection time windows) of the onset value. For example, it may be determined that the received communication signal comprises the predefined communication symbol depending on the onset value increasing (e.g., depending on a determination that the onset value increases) over time (e.g., over a plurality of, e.g. consecutive, detection time windows). For example, it may be determined that the received communication signal comprises the predefined communication symbol depending on the onset value indicating that a predefined number of the selected tones of the communication symbol have been detected in the received communication signal, for example by way of a predefined number of step increases in the value of the onset value, e.g., wherein each of the predefined number of step increases are step increases greater than or equal to a predefined threshold quantity. As above, it may be determined (e.g., by the processing circuitry 320) whether the received communication signal comprises the predefined communication symbol depending on the variation over time of the onset value by analysing the variation over time of the onset value in any suitable way. For example, it may be determined (e.g., by the processing circuitry 320) whether the received communication signal comprises the predefined communication symbol depending on the trend of the onset value over time, for example depending on whether the onset value maintains a (e.g., positive) rate of change greater than or equal to a predefined threshold (e.g., positive) rate of change over a predetermined time period.

Further discussion relating to the use of groups of combiners for detecting a particular predefined communication symbol in the onset detection mode is discussed as follows.

As discussed, it may be that each of the plurality of combiners of a group of combiners is configured to combine different frequency components of the frequency domain data over time, the different frequency components corresponding to the respective sets of frequency tones of the predefined communication symbol, in accordance with the temporal order in which the different sets of frequency tones appear in the predefined time sequence of the predefined communication symbol. The combiners of the group may be configured to capture the respective tones of the symbol at detection times offset from each other (e.g., the detection times of combiners configured to detect temporally adjacent instances of the predefined communication symbol may be temporally offset by at least a temporal tone length or at least by a detection time window). The combiners of the group may be to detect different instances of the communication symbol in the received communication signal offset in time from (and in some cases temporally overlapping with) each other.

When a group of combiners is operating in the onset detection mode, the processing circuitry 320 may be arranged to, for each of a plurality of (e.g., consecutive) detection time windows, update an onset value associated with that group of combiners based on a combiner bin of the group of combiners having the highest associated symbol indicator value.

For example, with regard to the first example discussed above where each combiner comprises a single combiner bin having an associated symbol indicator value, it may be that after each symbol indicator value is updated based on a given group of frequency domain values, the processing circuitry 320 is arranged to determine the combiner bin having the highest associated symbol indicator value and to update the associated onset value based on the said highest associated symbol indicator value.

For example, the onset value may be set equal to the highest symbol indicator value of the symbol indicator values associated with the combiners of the group of combiners. As set out above, the symbol indicator value may be a combined value of the amplitudes of the tones of the symbol detected by that combiner up to the time at which the symbol indicator value is observed.

As another example, with regard to the second example discussed above where each combiner comprises a plurality of combiner bins each having an associated symbol indicator value, it may be that following each time the plurality of combiner bins of a combiner are updated, the processing circuitry 320 is arranged to determine the combiner bin having the highest associated symbol indicator value and to update the associated onset value based on the said highest associated symbol indicator value. For example, the onset value may be set equal to the highest symbol indicator value of the symbol indicator values associated with the combiner bins of the combiners of the group of combiners.

As set out above, the symbol indicator value may be a combined value of the amplitudes of the tones of the symbol detected in that combiner bin up to the time at which the symbol indicator value is observed.

In updating an onset value for a group of combiners as discussed above, with increasing detection time, the onset value for a group of combiners may be increasingly indicative of whether or a not a group of combiners is validly receiving a predefined communication symbol. This may be understood as follows.

If a group of combiners were to be combining selected frequency components of a received communication signal comprising a predefined communication symbol which that group of combiners is configured to capture, the onset value described above for that group of combiners would periodically increase (e.g., by substantially constant increments) with each subsequently received set of one or more selected frequency tones of the predefined communication symbol in successive detection time windows.

By way of contrast, if a group of combiners were to be combining selected frequency components of a received communication signal comprising e.g., a predefined communication symbol which that group of combiners is not configured to capture or e.g., noise coinciding with the said selected frequencies, while a corresponding onset value may increase during certain detection time windows, it would not increase steadily in the manner described above in relation to a valid symbol capture.

Thus, if each of first and second groups of combiners were to be operating in onset mode, the first group of combiners being configured to capture a first predefined communication symbol and the second group of combiners being configured to capture a second predefined communication symbol, it may be determined, based on their respective onset values, that one of the first and second groups of combiners is validly detecting a corresponding predefined communication symbol and the other of the first and second groups of combiners is not. For example, it may be determined that either of the first or second groups of combiners is validly detecting a corresponding predefined communication symbol based on its onset value exceeding a threshold, or using any other suitable method. As above, it may be determined (e.g., by the processing circuitry 320) whether either of the first or second groups of combiners is validly detecting a corresponding predefined communication symbol depending on a variation over time (e.g., over a plurality of, e.g. consecutive, detection time windows) of the onset value. For example, it may be determined that the received communication signal comprises the predefined communication symbol depending on the onset value increasing over time (e.g., over a plurality of, e.g. consecutive, detection time windows). For example, it may be determined that the received communication signal comprises the predefined communication symbol depending on the onset value indicating that a predefined number of the selected tones of the communication symbol have been detected in the received communication signal, for example by way of a predefined number of step increases in the value of the onset value, e.g., wherein each of the predefined number of step increases are step increases greater than or equal to a predefined threshold quantity. As above, it may be determined (e.g., by the processing circuitry 320) whether the received communication signal comprises the predefined communication symbol depending on the variation over time of the onset value by analysing the variation over time of the onset value in any suitable way. For example, it may be determined (e.g., by the processing circuitry 320) whether the received communication signal comprises the predefined communication symbol depending on the trend of the onset value over time, for example depending on whether the onset value maintains a (e.g., positive) rate of change greater than or equal to a predefined threshold (e.g., positive) rate of change over a predetermined time period.

Upon determining that a group of combiners is validly detecting a predefined commination symbol, that group of combiners may transition to its symbol detection mode, while operation of the other group of combiners may be stopped or paused. During operation, the apparatus 300 may be arranged to always attempt to detect the first communication data (which may comprise higher priority data such as command or control data, or data indicative of a communications protocol to be used by the node) and to switch between attempting to detect and not attempting to detect the second communication data (which may comprise lower priority data such as sensor data) depending on whether it is determined in onset detection mode whether the symbols of the second communication data are being detected.

It may be that one or more or each group of combiners is arranged to operate in onset detection mode by default (e.g., upon start-up of the apparatus 300).

It may be that one or more or each of the groups of combiners is arranged to receive preamble data prior to receiving a data payload. For example, it may be that one or both of the first and second communication data discussed herein comprises a combination (e.g., a concatenation) of preamble data and payload data. Preamble data may comprise a known (e.g., predefined) pattern (e.g., ordered sequence) based on a respective predefined symbol. It may be that said group of combiners is arranged to operate in onset detection mode until an incoming valid symbol (e.g., of the preamble data) is detected thereby, after which the group of combiners may transition into symbol detection mode for detection of the corresponding communication data (e.g., the preamble data and payload data). Following said detection, the said group of combiners may transition back to onset detection mode or remain in symbol detection mode for a predetermined time period and transition back to onset detection mode if a new symbol is not detected within the predetermined time period. In these examples, the presence of the preamble data may provide for a more robust detection of the corresponding payload data.

In other examples, one or more or each of the groups of combiners disclosed herein may be arranged to receive payload data of communication data not preceded by preamble data. In these examples, the said communication data may comprise a single communication symbol. In these examples, the said group of combiners may be arranged to operate in onset detection mode until an incoming valid symbol (e.g., of the communication data comprising a single communication symbol) is detected thereby, at which point the said group of combiners may transition to symbol detection mode. Following a detection of the corresponding symbol, the group of combiners may revert to onset detection mode for detection the next incoming symbol. In these examples, it may be the said single communication symbol is a particularly noise immune communication symbol (e.g., owing to its selected frequency tone configuration, in accordance with examples disclosed herein).

Figure 9:
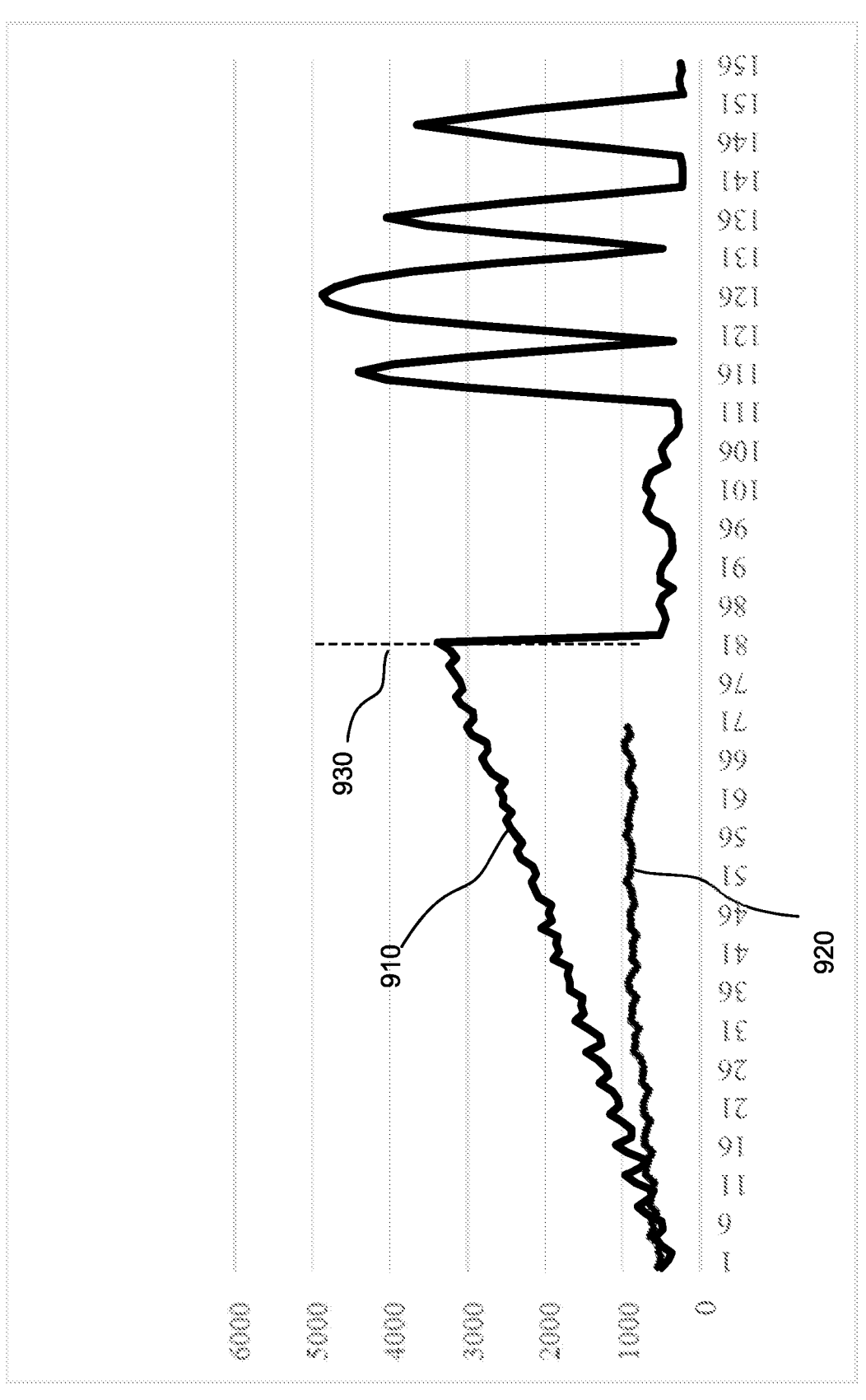
FIG. 9 is a plot illustrating an onset detection mode.

FIG. 9 shows an example plot of respective onset values of example first and second groups of combiners during reception of a predefined communication symbol which the first group of combiners are arranged to detect. To the left hand side of the dashed line 930 both of the example first and second groups of combiners are operating in onset detection mode. It can be seen that the onset value 910 of the example first group of combiners increases periodically with a substantially constant increment. By way of contrast, it can be seen that the onset value 920 of the example second group of combiners increases initially but substantially plateaus thereafter. Accordingly, it may be determined (e.g., based on threshold or based on a variation of an onset value over time as discussed above) that the example first group combiners are validly detecting a predefined communication symbol while the example second group of combiners are not. Based on this determination, the example first group of combiners may transition to its symbol detection mode (as shown to the right hand side of the line 930) to capture the corresponding symbol while operation of the example second group of combiners may be stopped or paused.

It may be that signals of different frequencies have different group delays when propagating on the communication channel. As group delay is frequency dependent, this can cause changes in alignment between frequency tones (e.g., of a predefined time sequence of frequency tones) of a predefined communication symbol in a communication signal received by a receiver. That is, the frequency dependent group delay may cause frequency dependent phase differences (or additional phase differences) between different frequency components of the received communication signal. Additionally or alternatively, the frequency dependent group delay may cause frequency dependent discrepancies in amplitudes of different frequency components of the received communication signal at the receiver.

To compensate for such frequency dependent phase differences and amplitude discrepancies, the processing circuitry 320 may perform amplitude compensation, phase compensation or amplitude and phase compensation to the frequency domain values before they are used to update to the symbol indicator values associated with the combiner bins. For example, the processing circuitry 320 may be configured to analyse the phases, amplitudes or phases and amplitudes of the one or more frequency components of the predefined communication symbol to determine one or more amplitude, phase or amplitude and phase compensation factors. The amplitude, phase or amplitude and phase compensation factors may be to normalise amplitudes of different frequency components of the predefined communication symbol in the received communication signal, to restore a phase relationship between the frequency components of the predefined communication symbol in the received communication signal, or both. The processing circuitry 320 may then apply the one or more amplitude, phase or amplitude and phase compensation factors to the one or more selected frequency components of the frequency domain data to thereby normalise amplitudes of different frequency components of the predefined communication symbol in the received communication signal, to restore a phase relationship between the frequency components of the predefined communication symbol in the received communication signal, or both. The amplitude, phase or amplitude and phase compensated frequency components may then be provided to the combiners to capture the symbol in the received communication signal as before.

Additionally or alternatively, the processing circuitry 320 of the receiving node (which will be referred to below as the second node) may be configured to analyse the phases, amplitudes or phases and amplitudes of the one or more frequency components of the predefined communication symbol to determine one or more amplitude, phase or amplitude and phase pre-compensation factors. The processing circuitry 320 of the second node may be further configured to cause a signal indicative of the amplitude, phase or amplitude and phase pre-compensation factors to be transmitted to the originally transmitting node (which will be referred to below as the first node). The amplitude, phase or amplitude and phase compensation factors may be applied by the first node to pre-emphasise amplitudes of one or more frequency components of the predefined communication symbol in a future communication signal transmitted to the second node, to pre-emphasise the phases of one or more frequency components of the predefined communication symbol in a future communication signal transmitted to the second node so as to provide the expected phase relationship between the frequency components of the predefined communication symbol in signals received by the second node in accordance with the predefined symbol, or both.

As discussed above, the receiver may comprise a plurality of sensors (e.g., piezo-electric transducers, strain gauges or accelerometers), each of the sensors being configured to receive communication signals from the communication channel. The sensors may be spatially offset from each other so as to provide spatial diversity. Each of the plurality of sensors may be in (e.g., wired or wireless) data communication with the processing circuitry 320 of the apparatus 300.

It may be that one or more sensors of the plurality of sensors are spatially positioned to detect particular frequencies with greater signal to noise ratios than other sensors of the plurality of sensors (e.g., due to a spatial alignment between a standing acoustic wave peak and the spatial position of the particular sensor). Accordingly, it may be desirable to capture particular frequency tones from a received communication signal based on frequency domain values derived from data from a particular sensor of the plurality of sensors in order to improve received signal quality.

Accordingly, for each detection time window, it may be that each group of frequency domain values is generated based on the time domain data detected by the one or more sensors of the plurality of sensors for that time window. It may be that the processing circuitry 320 is configured to update the symbol indicator values associated with the respective combiners based on frequency domain values derived from respective sensors of the plurality of sensors determined to have the highest received signal strengths for the respective tones of the predefined communication symbol. It may be that, for one or more different frequency tones of the predefined communication symbol, the symbol indicator values associated with the respective combiners are updated based on data derived from different sensors of the plurality of sensors.

The sensors of the plurality of sensors having the highest received signal strengths for the respective tones of the predefined communication symbol may be predetermined. For example, a predefined test communication symbol comprising one or more frequency tones in a particular frequency passband may be received by each of the plurality of sensors and converted from the time domain to the frequency domain by the time to frequency domain converter 322. The processing circuitry 320 may analyse the frequency components of the passband in the frequency domain data derived from the signals from each of the plurality of sensors to determine which sensor of the plurality of sensors have the highest received signal strengths for the respective passband. Subsequently, when updating the symbol indicator values associated with the respective combiners, the processing circuitry 320 may select frequency components of the predefined communication symbol which are in the respective passband from the frequency domain values derived from the sensor determined to have the highest received signal strengths for the respective passband. The same process may be applied to each of the passbands in which frequency tones of the predefined communication symbol are provided (e.g., in the same test communication symbol for a plurality of passbands or different test communication symbols for different passbands or any combination thereof).

Additionally or alternatively, the sensors of the plurality of sensors having the highest received signal strengths for the respective tones of the predefined communication symbol may be determined or predetermined individually for each frequency tone of the predefined communication symbol, for example in a similar way to that described above. That is, the processing circuitry 320 may analyse the frequency components in the frequency domain data derived from the signals from each of the plurality of sensors to determine which sensor of the plurality of sensors have the highest received signal strengths for the respective frequency tone. Subsequently, when updating the symbol indicator values associated with the respective combiners, the processing circuitry 320 may select frequency components of the predefined communication symbol corresponding to the respective frequency tone from the frequency domain values derived from the sensor determined to have the highest received signal strengths for the respective frequency tone. The same process may be applied to each of the frequency tones of the predefined communication symbol (e.g., in the same test communication symbol for a plurality of frequency tones or different test communication symbols for different frequency tones or any combination thereof).

FIG. 10 depicts a flow diagram 1000 of a method of decoding a received communication signal. The flow diagram 1000 may be performed by, for example, the processing circuitry 320 of the apparatus 300 described in relation to FIG. 3, or by any other suitable processing circuitry or apparatus. It is to be understood that any of the techniques or features discussed herein may be combined in any combination with any of the techniques or features discussed in the following in relation to the flow diagram 1000.

The received communication signal may obtained from a receiver (e.g., comprising one or more transducers) in accordance with any of the examples disclosed herein. For example, the receiver may be configured to receive acoustic signals, by way of an acoustic communication channel such as the drill string 100 discussed with reference to FIG. 1. Alternatively, the receiver may be configured to receive any other type of signals (e.g., including but not limited to electromagnetic or fluid (e.g., mud or product) pulse signals).

In accordance with any of the examples disclosed herein, the received communication signal may be an (e.g., digitised) electrical signal generated by way of an analogue to digital converter sampling output(s) of the one or more transducers of the receiver at a sampling rate. Accordingly, the received communication signal may correspond to a plurality of discrete sampled values (referred to herein as "receiver data").

The received communication signal may comprise one or more predefined communication symbols disclosed herein, such as, for example, any one or more of the communication symbols discussed in relation to FIGS. 2a-c, or any one or more other communication symbol(s) disclosed herein.

At block 1010, the received communication signal is converted to the frequency domain to provide frequency domain data. Converting the received communication signal to the frequency domain to provide frequency domain data may be in accordance with any of the examples disclosed herein. For example, the said converting may be based on any suitable technique, including but not limited to the fast Fourier transform (FFT). In accordance with examples disclosed herein, block 1010 may comprise repeatedly (e.g., periodically, cyclically, substantially continuously or otherwise) receiving (e.g., a stream of) groups of samples of receiver data from the receiver and (e.g., successively) converting each of the said groups of samples of receiver data into corresponding groups of frequency domain samples. Each of the respective groups of samples of receiver data may be based on a respective detection time window i.e., a group of samples of receiver data may be samples of time domain data received by the receiver within a respective time window. The receiver data may be apportioned into detection time windows to provide for the groups of samples of receiver data in accordance with any of the examples disclosed herein. For example, it may be that the receiver data is apportioned into respective groups of samples corresponding to a plurality of contiguous detection time windows.

Alternatively, it may be that the receiver data is apportioned into respective groups of samples corresponding to a plurality of temporally overlapping and temporally offset detection time windows.

At block 1020, amplitudes of one or more selected frequency components of the frequency domain data are combined, the one or more frequency components being selected according to a predefined communication symbol comprising one or more selected frequency toes corresponding to the one or more selected frequency components. The said combining (e.g., accumulating or summing) may be in accordance with any of the examples disclosed herein. For example, the said combining may be based on one or more combiners (such as e.g., the one or more combiners 324-1 to 324-k discussed in relation to FIG. 3).

It may be that the one or more combiners each have associated symbol indicator data, wherein the symbol indicator data associated with each of one or more combiners is updated based on amplitudes of selected frequency components of the frequency domain data corresponding to respective selected frequency tones of a predefined communication symbol (e.g., to be detected in the receiver data), in accordance with any of the examples disclosed herein.

In examples where the said combining is based on a plurality of combiners, it may be that the respective combiners of the plurality are to capture different instances of the predefined communication symbol which are temporally offset from each other in the received communication signal, in accordance with any of the examples disclosed herein.

In some examples, it may be that the predefined communication symbol comprises a plurality of selected frequency tones provided sequentially in a predefined time sequence, in accordance with any of the examples disclosed herein. In these examples, the said combining of the amplitudes of the one or more selected frequency components of the frequency domain data may be based on a combiner having associated symbol indicator data, wherein the symbol indicator data associated with the combiner is updated based on amplitudes of selected frequency components of the frequency domain data corresponding to the respective selected frequency tones of the predefined communication symbol received at detection times (e.g., based on detection time windows) offset from each other based on (e.g., according to an order in which the predefined frequency are provided in) the predefined time sequence of the said symbol, in accordance with any of the examples disclosed herein.

Alternatively, the said combining of the said amplitudes may be based on a plurality of combiners each having associated symbol indicator data, in accordance with any of the examples disclosed herein. In these examples, it may be that, for each of the plurality of combiners, the associated symbol indicator data is updated based on amplitudes of selected frequency components of the frequency domain data corresponding to the respective selected frequency tones of the predefined communication symbol received at detection times (e.g., based on detection time windows) offset from each other based on (e.g., according to an order in which the predefined frequency tones are provided in) the predefined time sequence, in accordance with any of the examples disclosed herein. In these examples, it may be that the updating of the symbol indicator data associated with the respective combiners is based on frequency components of the frequency domain data corresponding to the respective selected frequency tones of the symbol obtained from respective portions of the communication signal received for respective time periods which are offset from each other, in accordance with any of the examples disclosed herein.

In accordance with any of the examples disclosed herein, it may be that each combiner comprises one or more combiner bins.

In examples wherein each combiner comprises a single combiner bin, each combiner may operate in accordance with the first example discussed above (e.g., with reference to the combiners 324-1 to 323-k of FIG. 3). For example, each combiner bin of each combiner may have an associated symbol indicator value, wherein each of the symbol indicator values is updated based on respective frequency components of the frequency domain data corresponding to the respective selected frequency tones of the predefined communication symbol, and wherein the respective frequency components of the frequency domain data are obtained from respective portions of the communication signal received in respective detection time windows. For example, each of the said symbol indicator values may be updated based on successive groups of frequency domain values (e.g., provided by the converting at block 1010), wherein the successive groups of frequency domain values correspond to successive (e.g., contiguous) detection time windows of the receiver data. it may be that, for each the said groups of frequency domain values, the symbol indicator values associated with each of the combiners is updated based on amplitudes of one or more selected frequency components of that group of frequency domain values, the one or more frequency components being selected in accordance with a respective set of one or more selected frequency tones of the predefined communication symbol.

In examples where the predefined communication symbol comprises a plurality of sets of one or more frequency tones in a predefined time sequence, the set of frequency tones based on which the symbol indicator value of each combiner bin is updated may change for each successive detection time window to the next set of frequency tones in accordance with the order in which the sets of frequency tones are provided in the predefined time sequence of the predefined communication symbol, in accordance with any of the examples disclosed herein.

For each of the combiners, the symbol indicator value for their combiner bin may be output as the symbol indicator data for that combiner (e.g., when a symbol indicator value of a combiner bin has been updated based on all of the sets of the frequency tones in the predefined communication symbol), in accordance with any of the examples disclosed herein.

In examples where each combiner comprises a plurality of combiner bins, each combiner may operate in accordance with the second example discussed above (e.g., with reference to the combiners 324-1 to 324-k of FIG. 3). For example, each of the combiner bins may have an associated symbol indicator value, wherein the symbol indicator values associated with the respective combiner bins are updated based on respective frequency components of the frequency domain data corresponding to the respective selected frequency tones of the symbol, the respective frequency components of the frequency domain data being obtained from respective portions of the communication signal received in respective detection time window, in accordance with examples disclosed herein. For example, each of the plurality of combiner bins of each of the combiners may receive a respective stream of successive groups of frequency domain values (e.g., provided by the converting at block 1010), the successive groups of frequency domain values corresponding to successive (e.g., contiguous) detection time windows of the receiver data. For each combiner, a symbol indicator value of each combiner bin of that combiner may be updated based on a different stream of successive groups of frequency domain values, wherein the streams may be temporally offset from each other (e.g., each by a predetermined fraction of a tone length), but temporally overlapping with each other. It may be that successive groups of frequency domain values of each of the said streams correspond to respective successive detection time windows of the receiver data. It may be that the detection time windows of the streams are temporally overlapping with and temporally offset from each other (e.g., by a predetermined fraction of a tonal length).

It may be that for each received group of frequency domain values, the symbol indicator values associated with a respective combiner bin of the plurality of combiner bins of each of the one or more combiners may be updated based on amplitudes of one or more (e.g., different) selected frequency components of that group of frequency domain values, the one or more frequency components being selected in accordance with a respective set of one or more selected frequency tones of the predefined communication symbol.

In examples where the predefined communication symbol comprises a plurality of sets of one or more frequency tones in a predefined time sequence, the set of frequency tones based on which the symbol indicator value of each of the plurality of combiner bins of each of the one or more combiners is updated may change for each successive detection time window to the next set of frequency tones in accordance with the order in which the sets of frequency tones are provided in the predefined time sequence of the predefined communication symbol, in accordance with any of the examples disclosed herein.

In accordance with any of the examples disclosed herein, when the symbol indicator value of a combiner bin has been updated based on all of the sets of frequency tones in the predefined communication symbol, the symbol indicator value may be output to provide symbol indicator data for that combiner bin. When the symbol indicator values of the respective combiner bins of a combiner have been updated based on all of the sets of frequency tones in the predefined communication symbol, the symbol indicator value of the respective combiner bin may be combined (e.g., concatenated) with the symbol indicator values of any of the plurality of combiner bins of the combiner which have already been updated based on all of the sets of frequency tones in the predefined communication symbol. When the symbol indicator values of all of the combiner bins of the combiner have been combined, symbol indicator data based on the combination of the symbol indicator values for that combiner may be output.

In accordance with any of the examples disclosed herein, it may be that the received communication signal is received by each of a plurality of sensors. In these examples, it may be that the combining at block 1020 comprises combining amplitudes of a plurality of selected frequency components of the frequency domain data corresponding to the selected frequency tones of the predefined communication symbol received by different sensors of the plurality of sensors (e.g., according to a prior determination of which sensor of the plurality of sensors is to detect the respective frequency components).

At block 1030, the predefined communication symbol is detected in the received communication signal depending on the combined amplitudes of the one or more selected frequency components. Detecting the predefined communication symbol in the received communication signal depending on the combined amplitudes of the one or more selected frequency components of the frequency domain data may be in accordance with any of the examples disclosed herein. It may be that the method comprises detecting (or the processing circuitry is configured to detect) the predefined communication symbol (or one or more instances of the predefined communication symbol) in the received communication signal depending on the symbol indicator data of one or more combiners. For example, the said detecting may comprise detecting the predefined communication symbol or a plurality of instances thereof in the received communication signal based on the symbol indicator data of each combiner, in accordance with any of the examples disclosed herein (e.g., by peak detection).

It may be that the said detecting is in accordance with the symbol detection mode disclosed herein.

In some examples, it may be that the said detecting comprises onset detection in accordance with the onset detection mode disclosed herein. For example, the combining at block 1020 may be based on a plurality of combiners and onset detection may comprise determining that the received communication signal comprises the predefined communication symbol by determining, for each of a plurality of (e.g., consecutive) detection time windows, a combiner bin of the plurality of combiners having the highest associated symbol indicator value, and determining that the received communication signal comprises the predefined communication symbol based on the symbol indicator values associated with the combiner bins having the highest symbol indicator values over the plurality of detection time windows, in accordance with any of the examples disclosed herein.

In some examples, block 1030 may comprise switching between symbol detection mode and onset detection mode in accordance with any of the examples disclosed herein.

In some examples, it may be that the combining at block 1020 comprises combining amplitudes of one or more selected frequency components of the frequency domain data based on a first group of combiners for capturing a first predefined communication and based on a second group of combiners for capturing a second predefined communication symbol. In these examples, the detecting at block 1030 may comprise determining, in the onset detection mode of the first and second groups of combiners, the symbol of the first and second predefined communication symbols being captured, and stopping or pausing attempting to detect the other of the first and second predefined communication symbols (e.g., so as to save processing resource and electrical power), in accordance with any of the examples disclosed herein.

In some examples, block 1030 may further comprise decoding detected symbol(s) (e.g., into a bit stream) in accordance with examples disclosed herein.

In some examples, the method of the flow diagram 1000 may further comprise analysing phases, amplitudes or phases and amplitudes of the one or more frequency components of the frequency domain data corresponding to the selected frequency tones of the predefined communication symbol to determine one or more amplitude, phase or amplitude and phase compensation factors (e.g., to normalise amplitudes of different frequency components, to restore a phase relationship between the frequency components, or both), in accordance with any of the examples disclosed herein. In some examples, the method of the flow diagram 1000 may further comprise applying the one or more amplitude, phase or amplitude and phase compensation factors to one or more selected frequency components of the frequency domain data, in accordance with any of the examples disclosed herein.

Alternatively, in some examples, the method of the flow diagram 1000 may further comprise causing transmission of a signal indicative of the amplitude, phase or amplitude and phase pre-compensation factors, in accordance with any of the examples disclosed herein.

The following describes encoding and decoding techniques in accordance with various examples of the present disclosure.

It is to be understood that communication data encoded in accordance with the following techniques may be decoded in accordance with any one or more of the decoding techniques disclosed herein, or via any other suitable decoding technique. For example, communication data encoded in accordance with the following techniques may be decoded by the processing circuitry 320 of the apparatus 300 based on the one or more combiners 324-1 to **324-*k*** thereof. Alternatively, communication data encoded in accordance with the following techniques may be decoded based on any suitable alternative techniques, including but not limited to those based on correlating received communication data with one or more reference data, e.g., the reference data comprising the predefined symbols based on which the communication data is encoded.

It is also to be understood that communication data decoded in accordance with the following techniques may be additionally decoded in accordance with any one or more of the decoding techniques disclosed herein, or via any other suitable decoding technique. For example, communication data decoded in accordance with the following techniques may be additionally decoded based on the techniques discussed in relation to the processing circuitry 320 of the apparatus 300. Alternatively, communication data decoded in accordance with the following techniques may be additionally decoded based on any other suitable techniques, including but not limited to those based on correlating received communication data with one or more reference data.

Figure 11:
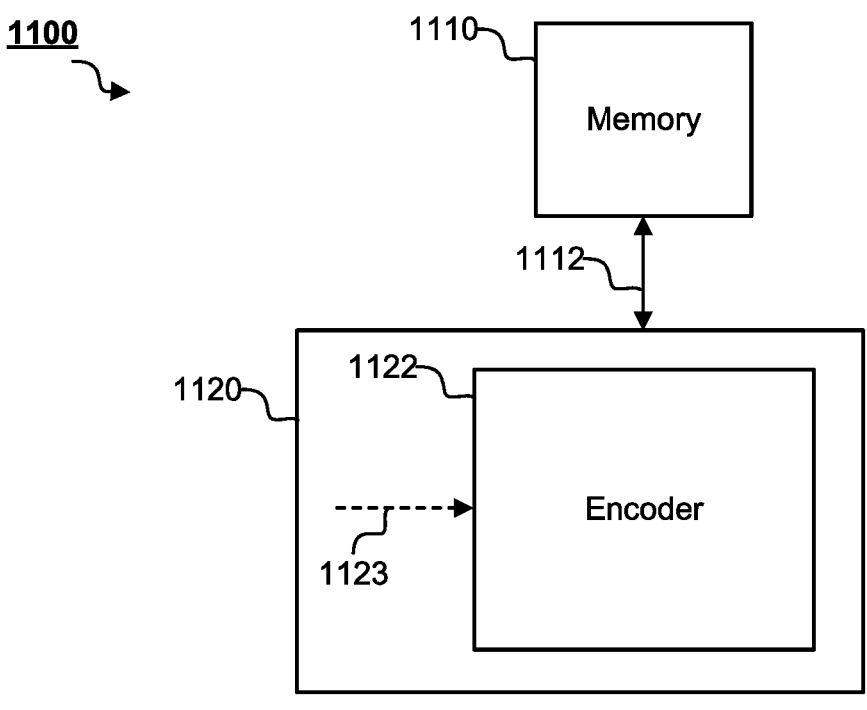
FIG. 11 schematically illustrates another apparatus of a communications node of FIG. 1.

FIG. 11 schematically illustrates an apparatus 1100 of the first communications node 110 for encoding communication data. The apparatus 1100 may encode communication data using any keying technique, including but not limited to any keying technique disclosed herein, such as on/off keying or multi-bit keying. The second communications node 112 may have an apparatus comprising the same or similar features. Indeed, it will be assumed in the following discussion that the second communications node 112 has an apparatus comprising the same features as those discussed in relation to the apparatus 1100 shown in FIG. 11. As such, the second communications node 112 will not be described separately here.

The communication data may comprise any type of data including, for example, any type of data disclosed herein or any other type of data. In some examples, the communication data may comprise any one or more of: command or control data (e.g., to be communicated from the first node 110 to the second node 112, for example, to control, activate or modify the operation of downhole equipment (e.g. a test valve or a sand screen or packer), request sensor data from downhole monitoring equipment (e.g., any one or more of: pressure data from one or more pressure sensors; temperature data from one or more temperature sensors; weight data from one or more weight sensors; torque data from one or more torque sensors) or command the second node 112 to reconfigure the codec it will use to code or decode communication signals, i.e., to change communications protocols) for example based on a data rate or a type of sensor data that is to be communicated); (e.g., packetized) telemetry data or (e.g., packetized) sensor data (e.g., from one or more downhole tools or sensors situated in a borehole or well); synchronisation data for synchronising communications between a plurality of communications nodes (e.g., the first node 110 and the second node 112); acknowledgement data to acknowledge safe receipt of command or control data.

In another example, event driven data may be communicated. For example, event driven data (e.g., flags) may be communicated from sub-surface tools (e.g., to a surface node) related to events occurring in-well. Event driven data may be preset or autonomously communicated, for example by sub-surface tools, for example to a surface node (e.g., as opposed to in response to a command from the surface). For example, progressive alarms, which may be based on thresholds to indicate if certain parameters are being exceeded, for example, or alarms signifying an event has occurred (e.g., a packer, sand screen or liner being fully set, or that there has been a failure to fully set), may be communicated.

The apparatus 1100 may comprise processing circuitry 1120 and a memory 1110 communicatively coupled 1112 to the processing circuitry 1120, for example by wired connection(s) or by any other suitable communicative coupling means. The processing circuitry 1120 may be the same processing circuitry as processing circuitry 320 described above with reference to FIG. 3 or the processing circuitry 1120 may be different processing circuitry from the processing circuitry 320 described above with reference to FIG. 3. The memory 1110 may be the same memory as the memory 310 described above with reference to FIG. 3 or the memory 310 may be a different memory from the memory 310 described above with reference to FIG. 3. The processing circuitry 1120 may be configured to cause transmission of a communication signal comprising the communication data, for example, by way of a transmitter (not shown) communicatively coupled to the processing circuitry 1120 (e.g., by wired or wireless connection(s) or by any other suitable communicative coupling means). The communication signal may comprise, for example, one or more predefined communication symbols in accordance with any of the communication symbols disclosed herein, such as, for example, any of the communication symbols discussed in relation to FIGS. 2*a-c*.

The transmitter may comprise one or more transducers including but not limited to: acoustic transducer(s), such as a piezoelectric transducer; electromagnetic transducer(s); fluid (e.g., mud or product) transducer(s). However, it will be assumed herein that the transmitter is an acoustic transmitter. It may be that the transducer(s) are capable of converting electrical signals to acoustic signals, acoustic signals to electrical signals or both. The transmitter may be configured to transmit acoustic signals, for example by way of an acoustic communication channel such as the drill string 100. The communication channel may be a downhole communication channel. It may be that a portion of the downhole communication channel extends above the surface, for example to couple with a communication node at or above the surface. The downhole communication channel may even extend above the surface node, for example to couple to a cement head, tree, well-head or top drive (whether on the sea bed, on land or on rig) which may be provided above the surface node. A portion of the channel above the surface node may influence signals transmitted or detected by the surface node, for example by causing signal echoes or reflections. The transmitter may be operable to transmit signals over a plurality of frequency bands. The transmitter may be communicatively coupled to the communication channel, for example by one or more couplers. It may be that the node (e.g., the node 110 or the node 112) is configured to transmit acoustic signals by the transmitter converting digitised electrical communication signal(s) comprising communication data to analogue communication signal(s) by way of a digital to analogue converter and passing the analogue communication signal(s) to the transducer(s). The processing circuitry 1120 may be configured to encode the communication data for transmission in the communication signal.

In some examples, the transmitter may be part of a transceiver operable to both transmit and receive communication signals. In these examples, the transceiver may comprise a discrete transmitter and a discrete receiver, which may, for example, each comprise a respective transducer such as a respective acoustic transducer, or the transceiver may comprise an integrated transmitter and receiver which share hardware. For example, the transceiver may comprise an integrated transmitter and receiver which share a transducer such as an acoustic transducer, or any other type of transducer.

The processing circuitry 1120 may comprise general purpose processing circuitry or special purpose processing circuitry. The functionality of the processing circuitry 1120 described herein may be implemented in software, hardware or firmware, or a combination of any of software, hardware and firmware. For example, the processing circuitry 1120 may be configured to retrieve and execute computer program instructions stored in the memory 1110 to thereby provide its functionality described herein. The memory 1120 may comprise any suitable memory such as cache memory, random access memory (RAM), read only memory (ROM), flash memory, magnetic or optical disk or any combination thereof.

The functionality of the processing circuitry 1120 is described further below in relation to a functional block comprising an encoder 1122.

The encoder 1122 may be arranged to obtain communication data 1123 and to encode the communication data in units of individual communication symbols of one or more predefined communication symbols. It may be that a smallest unit of information encodable by the encoder 1122 is an individual communication symbol (e.g., a single predefined communication symbol in accordance with any of the predefined communication symbols disclosed herein). It may be that the one or more predefined communication symbols are "predefined" in that the one or more communication symbols are defined prior to encoding communication data therewith by the encoder 1122.

The encoder 1122 may be arranged to encode first communication data in units of individual communication symbols of one or more predefined first communication symbols. The encoder 1122 may be arranged to encode second communication data in units of individual communication symbols of one or more predefined second communication symbols.

In some examples, the first communication data and the second communication data may be transmitted such that the transmitted encoded first and second communication data overlap in time with each other. For example, the first communication data and the second communication data may be transmitted simultaneously or substantially simultaneously. In other examples, the first communication data and the second communication data may be transmitted at times offset from each other such that the transmitted encoded first and second communication data are temporally offset from and temporally overlap with each other. In other examples, the second communication data may be transmitted after transmission of (e.g., the entirety of) the first communication data (e.g., such that the transmitted first and second communication data do not overlap each other in time), or vice versa.

It may be that the first communication data comprises a first communication message (e.g., to be transmitted from one of the first communications node 110 and the second communications node 112 to the other of the first communications node 110 and the second communications node 112).

It may be that the second communication data comprises a second communication message (e.g., to be transmitted from said one of the first communications node 110 and the second communications node 112 to said other of the first communications node 110 and the second communications node 112).

In accordance with communication symbols disclosed herein, the one or more predefined first communication symbols of the first communication data may each comprise one or more selected frequency tones. Similarly, the one or more predefined second communication symbols of the second communication data may each comprise one or more selected frequency tones.

In some examples, it may be that at least one of the first communication symbols and the second communication symbols comprise more than one selected frequency tones. For example, it may be that: each of the first communication symbols comprise a plurality of selected frequency tones; each of the second communication symbols comprise a plurality of selected frequency tones; or each of the first communication symbols and each of the second communication symbols comprise a plurality of selected frequency tones.

As will be discussed further below, it may be that the one or more predefined first communication symbols are different from the one or more predefined second communication symbols.

As an illustrative example, it may be that the first communication data encoded based on the first communication symbols comprises relatively low-bit rate command or control data (e.g., in accordance with any command control data disclosed herein) and the second communication data comprises relatively higher-bit rate packetized data (e.g., in accordance with any packetized data disclosed herein). It may be that the first communication data is of higher priority than the second communication data; that is, it may be more important that the first communication data is received (e.g., by the second node 112) than for the second communication data to be received (e.g., by the second node 112).

Accordingly, it may be that the first communication symbol(s) are to have greater noise immunity than the second communication symbol(s). In this case, it may be that the one or more predefined first communication symbols differ from the one or more predefined second communication symbols in a way or ways which provide for greater noise immunity.

As will be discussed further below, in these examples, the first communication data and the second communication data may be transmitted such that the transmitted encoded first and second communication data overlap in time with each other. For example, it may be that e.g., the second node 112 is operable to receive the above-described higher priority, lower-bit rate data at the same time as, or at a time overlapping with reception of the above-described lower-priority, higher-bit rate data.

Accordingly, in these examples, or in any other suitable example, each of the one or more predefined first communication symbols may differ from each of the one or more predefined second communication symbols in a way or ways which enable each of the first communication symbols to be discriminated from each of the second communication symbols at a receiver when received simultaneously or substantially simultaneously. For example, each of the one or more predefined first communication symbols may be orthogonal or pseudo-orthogonal to each of the one or more predefined second communication symbols. Additionally or alternatively, it may be that the first communication symbol(s) are adapted e.g., to provide the second communication symbol(s), for example depending on changing communication conditions of the communication channel (e.g., changes in frequencies which are suitable for communication on the communication channel, for example due to changes in frequency dependent attenuation or frequency dependent noise of the communication channel), for example due to changing downhole conditions (e.g., drilling vs. not drilling) to provide the second communication symbol(s). In this case, it may be that the both the first communication data and the second communication data both comprise packetized data. The second communication symbol(s) may be better adapted for communication conditions on the communication channel than the first communication symbol(s). Thus, the adaptation of the first communication symbol(s) to provide the second communication symbol(s) may facilitate improved noise immunity, improved bit rates or improved signal to noise ratios, thereby improving the quality of communications. In these examples, it may be that the second communication data is transmitted after transmission of (e.g., the entirety of) the first communication data (e.g., such that the transmitted first and second communication data do not overlap each other in time). Accordingly, in these examples, and in any other suitable example, the second communication symbol(s) may not necessarily be orthogonal or pseudo-orthogonal to the first communication symbol(s) (however, they may be).

As will also be discussed further below, it may be that at least one of the first communication data and the second communication data is encoded based on (e.g., using) a (e.g., respective) plurality of different corresponding communication symbols. That is, it may be that: the first communication data is encoded based on (e.g., using) a plurality of different first communication symbols; the second communication data is encoded based on (e.g., using) a plurality of different second communication symbols; or the first communication data is encoded based on (e.g., using) a plurality of different first communication symbols and the second communication data is encoded based on (e.g., using) a plurality of different second communication symbols. In some examples, it may be that the first communication data is encoded based on (e.g., using) a first number of (e.g., different) first communication symbols, and the second communication data is encoded based on (e.g., using) a second number of (e.g., different) second communication symbols where the first number is not equal to the second number.

The above-discussed differing communication symbols may differ from each other in accordance with any one or more of the ways described herein in which a communication symbol may differ from another.

For example, the ways in which the one or more predefined first communication symbols may differ from the one or more predefined second communication symbols may be in accordance with any one or more of the ways described herein in which a communication symbol may differ from another, including but not limited to the ways described in the specific examples below.

Similarly, the ways in which the above-discussed plurality of different first communication symbols may differ from each other may be in accordance with any of the ways described herein in which a given communication symbol may differ from another, including but not limited to the ways described in the specific examples below.

Similarly, the ways in which the above-discussed second communication symbols may differ from each other may be in accordance with any of the ways described herein in which a given communication symbol may differ from another, including but not limited to the ways described in the specific examples below.

As discussed above, it may be that the first communication data and the second communication data are transmitted such that the transmitted encoded first and second communication data overlap in time with each other (e.g., the encoded first and second communication data may be transmitted simultaneously or substantially simultaneously with each other). In these examples, or in any other example, it may be that each of the one or more predefined second communication symbols comprise a different one or more selected frequency tones from the one or more predefined first communication symbols. For example, it may be that the one or more selected frequency tones of the respective second communication symbols are orthogonal or pseudo-orthogonal to the one or more selected frequency tones of the respective first communication symbols. For example, it may be that each of the one or more predefined first communication symbols comprise a respective group of selected frequency tones, and each of the one or more predefined second communication symbols comprise a respective group of selected frequency tones, wherein no individual selected frequency tone is common to both the respective groups of selected frequency tones of the first communication symbols and the respective groups of selected frequency tones of the second communication symbols. Symbol configurations such as those described immediately above may be one example technique for enabling first and second communication symbols transmitted e.g., simultaneously or e.g., substantially simultaneously to be discriminated from each other at a receiver.

In some examples, it may be that the one or more predefined first communication symbols each have a different number of frequency tones from each of the one or more predefined second communication symbols. For example, it may be that each of the one or more predefined first communication symbols comprises a first number of frequency tones, and each of the one more predefined second communication symbols comprises a second number of frequency tones, the second number being different from (e.g., greater than or less than) the first number. As already discussed herein, communication symbols having a greater number of frequency tones than others may have improved noise immunity due to increased frequency diversity. However, this improved noise immunity may come at the cost of a reduced data rate. Accordingly, it may be that each of the first communication symbols may be configured (e.g., by way of their constituent frequency tones, e.g., by having more tones per symbol than the second communication symbols) to provide a relatively high noise immunity but a relative low data rate, while each of the second communication symbols may be configured (e.g., by way of their constituent frequency tones, e.g., by having fewer tones per symbol than the first communication symbols) to provide a relatively lower noise immunity but a relatively higher data rate. In these examples, it may be that the first communication symbols and the second communications are transmitted such that the transmitted encoded first and second communication data overlap in time with each other (e.g., the encoded first and second communication data may be transmitted simultaneously or substantially simultaneously with each other). For example, in accordance with examples disclosed herein, it may be that the first and second communication data pertain to different types of data having different priorities (e.g., the first communication data may have a relatively higher priority than the second communication data) and that both the first and second communication data may be transmitted simultaneously or substantially simultaneously. Alternatively, the second communication data may be transmitted after transmission of the first communication data (and may optionally pertain to the same type data, such as packetized data or any other suitable type of data). In this case, the second communication symbols may comprise adapted variants of the first communication symbols.

In accordance with any example disclosed herein, the first communication symbols may be adapted to provide the second communication symbols in order to optimize or improve communication performance based on the second communication symbols. For example, it may be that noise in a communication channel (e.g., such as the communication channel between the first node 110 and the second node 112) has reduced, in which case the first communication symbols may be adapted to provide second communication symbols which are relatively less noise-immune but provide a relatively higher data rate than the first communication symbols. In other examples, it may be that noise in a communication channel (e.g., such as the communication channel between the first node 110 and the second node 112) has increased, in which case the first communication symbols may be adapted to provide second communication symbols which are relatively more noise-immune but provide a relatively lower data rate than the first communication symbols.

An illustrative example of communication symbols having a relatively high noise immunity is shown in FIG. 12, which shows four different communication symbols, each comprising a respective predefined time sequence comprising ten frequency tones fn1-fn10 (where n is the symbol number) transmitted sequentially offset in time from each other. Although four symbols are shown each with ten frequency tones, it will be understood that any suitable number of symbols each with any suitable number of frequency tones or sets of frequency tones may be provided. An illustrative example of frequency tones having a relatively lower noise immunity is shown in FIG. 13, which shows twelve different communication symbols, each comprising a respective predefined time sequence comprising four frequency tones fn1-fn4 (where n is the symbol number) transmitted sequentially offset in time from each other. Although twelve symbols are shown each with four frequency tones, it will be understood that any suitable number of symbols each with any suitable number of frequency tones or sets of frequency tones may be provided. Providing more tones per symbol and fewer symbols improves noise immunity. Providing fewer tones per symbol and more symbols may allow an improved data rate but at a cost of reduced noise immunity. Noise immunity and bit rate can thus be flexibly traded off depending on communication conditions and requirements by reconfiguring the symbol configurations dynamically over time.

The first and second communication symbols may differ from each other by way of the temporal configuration of the constituent frequency components of the respective symbols, such as whether the frequency components are temporally overlapping or whether they are provided in a predefined time sequence or any combination thereof.

As discussed, in some examples, it may be that one or more communication symbols of the first communication symbols and one or more communication symbols of the second communication symbols each comprise a respective plurality of selected frequency tones provided (e.g., transmitted) sequentially in a predefined time sequence. In these examples, it may be that one of the said one or more communication symbols of the first communication symbols and one of the said one or more communication symbols of the second communication symbols comprise a same group of selected frequency tones provided (e.g., transmitted) in a different time sequence order.

Additionally or alternatively, it may be that the respective symbols of the first communication symbols comprise different (e.g., groups of) selected frequency tones from the respective symbols of the second communication symbols. In these examples, it may be that the (e.g., groups of) selected frequency tones of the respective second communication symbols are orthogonal or pseudo-orthogonal to the (e.g., groups of) selected frequency tones of the respective first communication symbols.

Additionally or alternatively, it may be that the one or more predefined first communication symbols comprises a plurality of different first communication symbols each comprising a respective different one or more selected frequency tones.

Additionally or alternatively, it may be that the one or more predefined second communication symbols comprises a plurality of different second communication symbols each comprising a respective different one or more selected frequency tones.

Additionally or alternatively, it may be that the one or more predefined first communication symbols each comprise a plurality of selected frequency tones provided (e.g., transmitted) individually in a time sequence. In these examples, it may be that the one or more predefined second communication symbols each comprise a plurality of selected frequency tones provided (e.g., transmitted) such that they overlap with each other in time (e.g., provided simultaneously or substantially simultaneously i.e., in parallel with each other).

It may be that each of the one or more predefined first communication symbols and each of the or more predefined second communication symbols are based on respective symbol mappings. For example, it may be that first symbol mapping data (e.g., stored in the memory 1110) maps each of the one or more first communication symbols to their respective one or more selected frequency tones. Similarly, it may be that the second symbol mapping data (e.g., stored in the memory 1110) maps each of the one or more second communication symbols to their respective one or more selected frequency tones.

Additionally or alternatively, the one or more selected frequency tones of the first communication symbols (e.g., as specified by the first symbol mapping data) may correspond to frequencies at which a communication channel (e.g., such as the communication channel between the first node 110 an the second node 112) is (e.g., empirically) (pre) determined to provide low noise, low attenuation or low noise and low attenuation. Additionally or alternatively, the one or more selected frequency tones of the second communication symbols (e.g., as specified by the second symbol mapping data) may correspond to frequencies at which a communication channel (e.g., such as the communication channel between the first node 110 an the second node 112) is (e.g., empirically) (pre) determined to provide low noise, low attenuation or low noise and low attenuation.

In some examples, it may be that the encoder 1122 provides for dynamically reconfiguring symbol mapping data (e.g., the first or second symbol mapping data) to provide for improved flexibility and robustness.

For example, it may be that one or more characteristics of a communication channel (such as e.g., the communication channel between the nodes 110, 112) change following encoding of the first communication data by the encoder 1122 based on the first communication symbols (e.g., as specified by the first symbol mapping data). In such a case, it may be that the encoder 1122 can adapt or replace the first symbol mapping data to provide for the second symbol mapping data, wherein the second symbol mapping data may enable encoding of the second communication data using the second communication signals in a way that e.g., mitigates against or exploits the changed communication channel characteristics. For example, in accordance with examples discussed above, the second symbol mapping data may provide for corresponding second communication symbols having e.g., greater noise immunity or e.g., providing for an increased data rate relative to the first communication symbols.

In some examples, the first symbol mapping data may be adapted or replaced to provide the second symbol mapping data depending on (e.g., in response to) a (e.g., empirically) determined change in noise (e.g., noise level) on the communication channel. In these examples, it may be that encoder 1122 obtains a signal from another node indicating one or more frequency passbands or one or more frequency tones which are suitable or unsuitable for communication, depending on which the encoder 1122 may generate the second symbol mapping data accordingly. The second symbol mapping data may be configured such that constituent frequency tone(s) of the second communications symbol(s) reside in passband(s) determined (e.g., indicated in the received signal) to be suitable for communication, or such that constituent frequency tone(s) of the second communications symbol(s) comprise frequency tone(s) determined (e.g., indicated in the received signal) to be suitable for communication.

Additionally or alternatively the first symbol mapping data may be adapted or replaced to provide the second symbol mapping data depending on a (e.g., empirically) determined change of attenuation (e.g., attenuation level) on the communication channel. In these examples, the encoder 1122 may receive a signal (e.g., the same or a different signal from the signal indicated suitable passbands or suitable frequency ones) from another node indicating an attenuation level of the communication channel of one or more passbands or for one or more frequency tones, depending on which the encoder 1122 may generate the second symbol mapping data accordingly. The second symbol mapping data may comprise a tone weighting for weighting amplitudes of constituent frequency tone(s) of the second communication symbol(s) to compensate for the levels of attenuation (e.g., indicated in the received signal).

The first symbol mapping data may be adapted or replaced to provide the second symbol mapping data depending on one or more signals previously communicated on the communication channel. For example, it may be that previously received communication signal(s) (e.g., previously received by a receiver and detected by processing circuitry communicatively coupled therewith, the processing circuitry comprising e.g., the processing circuitry 1120, or any other processing circuitry communicatively couplable with the processing circuitry 1120 (e.g., either directly via any suitable wired or wireless communicative coupling means or e.g., indirectly via a storage medium, such as a memory, accessible to each of the said processing circuitries)) comprise one or more communication symbols in accordance with communication symbols disclosed herein. During detection of the said communication symbol(s) of the said previously received communication signal(s) (e.g., by processing circuitry), each of the amplitudes of the frequency components corresponding to the frequency tones of the said communication symbol(s) may be stored or buffered. Following a successful detection of the said communication symbol(s), the said stored or buffered amplitudes may be analysed to determine e.g., which passbands or e.g., which frequency tones are suitable or unsuitable for communication (e.g., provide for acceptable or desirable signal to noise ratios). It may be that the first symbol mapping data is adapted or replaced to provide the second symbol mapping data based on the said determination. For example, the resulting second symbol mapping data may be configured such that constituent frequency tones of the second communications symbol(s) reside in passband(s) suitable for communication. Additionally or alternatively, the said stored or buffered amplitudes may be analysed to determine a level of attenuation or noise for e.g., one or more passbands or e.g., one or more frequency tones. It may be that the first symbol mapping data is adapted or replaced to provide the second symbol mapping data based on the said determination. The resulting second symbol mapping data may comprise a tone weighting for weighting amplitudes of constituent frequency tones of the second communication symbol(s) to compensate the determined level of attenuation.

For example, it may be that a first node (such as node 110 comprising apparatus 1100) transmits a communication signal comprising one or more communication symbols each comprising one or more sets of frequency tones to a second node (e.g., node 112). It may be that the second node receives and analyses the communication signal to determine which of the communication symbols, or which of one or more groups of (e.g., groups of spectrally contiguous) frequency tones of the symbols, or which of the constituent frequency tones of the symbols, are suitable (or more suitable) for communication from the first node to the second node. It may be that the second node transmits a signal to the first node indicating which of the communication symbols, or which of one or more groups of (e.g., groups of spectrally contiguous) frequency tones of the symbols, or which of the constituent frequency tones of the symbols, are (e.g., more) suitable for communication from the first node to the second node. It may be that the first node adapts or replaces the first symbol mapping data to provide the second symbol mapping data based on the signal indicating which of the communication symbols, or which of one or more groups of (e.g., groups of spectrally contiguous) frequency tones of the symbols, or which of the constituent frequency tones of the symbols, are suitable for communication from the first node to the second node, for example to provide second symbols which are more suitable for communication from the first node to the second node (e.g., to provide second communication symbols comprising frequency tones in part(s) of the spectrum which are relatively less noisy, have relatively less attenuation or are both relatively less noisy and have relatively less attenuation than parts of the spectrum occupied by the first communication symbols). The first node may then send a signal indicative of the configuration of the second symbols to the second node. The first node may communicate data to the second node based on the second symbol mapping data (i.e., based on, e.g., by keying, the second communication symbols).

Additionally or alternatively, the first symbol mapping data may be adapted or replaced to provide the second symbol mapping data depending on a determined change in a type of communication. For example, a first type of communication may pertain to a first data type to be transmitted in isolation or infrequently (such as e.g., an acknowledgement of received data) and a second type of communication may pertain to a second data type to be transmitted periodically of frequently (such as e.g., sensor data). It may be critical or important that the first data type is successfully received by a receiving node. Accordingly, the first data type may be transmitted based on relatively noise immune communication symbols (e.g., providing for a relatively low data rate). It may be less critical or less important that the second data type is successfully received by a receiving node. Accordingly, the first data type may be transmitted based on communication symbols providing for a relatively higher data rate (e.g., which are relatively less noise immune). Depending on a determined change in the type of communication (e.g., a change in the type of data to be communicated), the first symbol data may be adapted or replaced to provide the second symbol mapping data in order to provide communication symbols (e.g., particularly) suitable for transmitting the changed data type.

In some examples, the processing circuitry 1120 may be arranged to obtain a signal (e.g., from another node) indicative of one or more amplitude, phase or amplitude and phase pre-compensation factors (e.g., to be applied to corresponding frequency tones to provide for improved reception thereof at a receiving node). In these examples, the processing circuitry 1120 may (e.g., as specified in corresponding (e.g., first or second) symbol mapping data generated based on the said obtained signal) apply amplitude, phase or amplitude and phase pre-compensation to one or more frequency tones of one or more predefined first communication symbols or to one or more frequency tones of one or more predefined second communication symbols based on the indicated amplitude, phase or amplitude and phase pre-compensation factors, for example, in communication signals to be sent to the other node. The receiving node may generate and transmit the signal indicative of one or more amplitude, phase or amplitude and phase pre-compensation factors based on signals comprising the respective frequency tones previously transmitted, for example from the node comprising processing circuitry 1120, to the other node.

As before, it may be that previously transmitted and received communication signal(s) (e.g., previously received by a receiving node and detected by processing circuitry communicatively coupled therewith, the processing circuitry comprising e.g., the processing circuitry 1120, or any other processing circuitry communicatively couplable with the processing circuitry 1120 (e.g., either directly via any suitable wired or wireless communicative coupling means or e.g., indirectly via a storage medium, such as a memory, accessible to each of the said processing circuitries)) comprise one or more communication symbols to which the pre-compensation factors are to be applied. When the said communication symbol(s) of the said previously transmitted and received communication signal(s) have been captured (e.g., by processing circuitry), the amplitudes, phases or amplitudes and phases of the different frequency components may be analysed (e.g., by the processing circuitry) to determine the respective pre-compensation factors, which may then be transmitted to and obtained by apparatus 1100 which can apply the pre-compensation factors as discussed.

In some examples, the processing circuitry 1120 may be arranged to cause signaling to a receiver (e.g., of the node 112) that communication data is to be encoded based on the second communication symbols. For example, the processing circuitry 1120 may notify the receiver of the change of encoding based on the first communication symbols to encoding based on the second communication symbols to enable the receiver to successfully receive and detect communication data encoded based on the second communication symbols.

Figure 14:
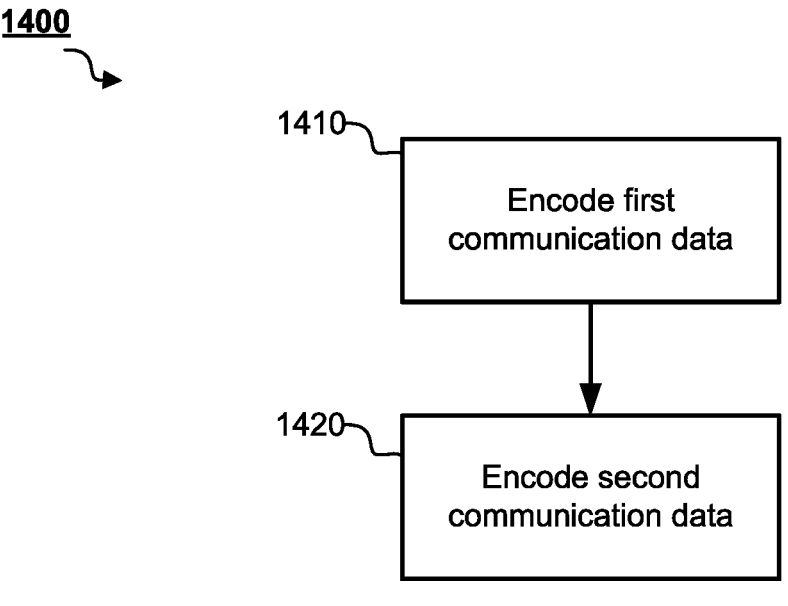
FIG. 14 is a flow diagram of a method of encoding communication data.

FIG. 14 depicts a flow diagram 1400 of a method of encoding communication data. The communication data may comprise any type of data including, for example, any type of data disclosed herein or any other type of data. The flow diagram 1400 may be performed by, for example, the processing circuitry 1120 of the apparatus 1100 described above with reference to FIG. 11, or by any other suitable processing circuitry or apparatus. It is to be understood that any of the techniques or features discussed herein may be combined in any combination with any of the techniques or features discussed in the following with reference the flow diagram 1400.

At block 1410, first communication data is encoded. The encoding of the first communication data may be in accordance with any of the examples disclosed herein, including any of the examples of encoding first communication data discussed with reference to FIG. 11. For example, encoding the first communication data may comprise encoding the first communication data in units of individual communication symbols of one or more predefined first communication symbols.

At block 1420, second communication data is encoded. The encoding of the second communication data may be in accordance with any of the examples disclosed herein, including any of the examples of encoding second communication data discussed with reference to FIG. 11. For example, encoding the second communication data may comprise encoding the second communication data in units of individual communication symbols of one or more predefined second communication symbols.

It is to be understood that the one or more predefined first communication symbols discussed with reference to FIG. 14 may correspond to any of the one or more predefined first communication symbols discussed above (e.g., with reference to FIG. 11), and may therefore comprise any feature(s) thereof. As such, for the sake of brevity, a full description of the one or more predefined first communication symbols pertaining to FIG. 14 will not be described separately here. Similarly, it is to be understood that the one or more predefined second communication symbols discussed with reference to FIG. 14 may correspond to any of the one or more predefined second communication symbols discussed above (e.g., with reference to FIG. 11), and may therefore comprise any feature(s) thereof. As such, for the sake of brevity, a full description of the one or more predefined second communication symbols pertaining to FIG. 14 will not be described separately here.

As discussed above (e.g., with reference to FIG. 11), the tone configurations of the first and second communication symbols used in the respective encoding of the first and second communication data by may be chosen to provide for the most suitable communication performance for the transmission thereof, depending on e.g., a data type of the respective communication data or e.g., one or more communication channel characteristics.

Encoding each of the first communication data and the second communication data may comprise encoding the said communication data using any keying technique, including but not limited to any keying technique disclosed herein such as on-off keying or multi-bit keying.

Encoding of each of the first communication data and the second communication data may be performed by an encoder (such as e.g., the encoder 1122 discussed in relation to FIG. 11) wherein a smallest unit of information encodable by the encoder is an individual communication symbol (e.g., a single predefined communication symbol in accordance with any of the predefined communication symbols disclosed herein).

Each of the one or more predefined first communication symbols and the one or more predefined second communication symbols may be "predefined" in that the said communication symbols are defined (e.g. by corresponding symbol mapping data) prior to encoding communication data (e.g., the first or second communication data) therewith.

It may be that the first communication data comprises a first communication message (e.g., to be transmitted from one communications node to another, such as e.g., from one of the first communications node 110 and the second communications node 112 discussed with reference to FIG. 1 to the other of the first communications node 110 and the second communications node 112).

It may be that the second communication data comprises a second communication message (e.g., to be transmitted to from one communications node to another over a communication channel, such as e.g., from one of the first communications node 110 and the second communications node 112 discussed in relation to FIG. 1 to the other of the first communications node 110 and the second communications node 112).

In accordance with any of the examples disclosed herein, it may be that each of the one or more predefined first communication symbols and each of the or more predefined second communication symbols are based on respective symbol mappings. For example, it may be that first symbol mapping data (e.g., stored in a such as the memory 1110 discussed with reference to FIG. 11) maps each of the one or more first communication symbols to their respective one or more selected frequency tones. Similarly, it may be that the second symbol mapping data (e.g., stored in a memory such as the memory 1110) maps each of the one or more second communication symbols to their respective one or more selected frequency tones.

In some examples, the method of encoding communication data of the flow diagram 1400 may further comprise adapting or replacing the first symbol mapping data to provide the second symbol mapping data depending on (e.g., in response to) any one or more of the following, in accordance with any of the examples disclosed herein such as any of the examples discussed with reference to FIG. 11 in relation to updating or adapting first symbol mapping data to provide second symbol mapping data: a (e.g., empirically) determined change in noise (e.g., noise level) on the communication channel (e.g., as indicated by a received signal from another node, such as the received signal indicating one or more suitable frequency passbands or tones discussed above, e.g., with reference to FIG. 11); a (e.g., empirically) determined change of attenuation (e.g., attenuation level) on the communication channel;

one or more signals previously communicated on the communication channel; a determined change in a type of communication.

In some examples, the method of encoding communication data of the flow diagram 1400 may further comprise obtaining a signal indicative of one or more amplitude, phase or amplitude and phase pre-compensation factors (e.g., to applied to corresponding frequency tones to provide for improved reception thereof at a receiving node), in accordance with any of the examples disclosed herein. In these examples, the said method may further comprise applying (e.g., as specified in corresponding (e.g., first or second) symbol mapping data generated based on the said obtained signal) amplitude, phase or amplitude and phase pre-compensation to one or more frequency tones of one or more predefined first communication symbols or to one or more frequency tones of one or more predefined second communication symbols based on the indicated amplitude, phase or amplitude and phase pre-compensation factors.

In some examples, the method of encoding communication data of the flow diagram 1400 may further comprise causing transmission of the first communication data and the second communication data (e.g., by way of a transmitter, including but not limited to any of the transmitters disclosed herein) in accordance with any of the examples disclosed herein. For example, causing transmission of the first communication data and the second communication data may comprise causing transmission of the first and second communication data such that the transmitted first and second communication data overlap in time with each other. For example, causing transmission of the first communication data and the second communication data may comprise causing simultaneous or substantially simultaneous transmission of the first and second communication data. In other examples, causing transmission of the first communication data and the second communication data may comprise causing transmission of the first and second communication data at times offset from each other such that the transmitted first and second communication data are temporally offset from and temporally overlap with each other. In other examples, causing transmission of the first communication data and the second communication data may comprise causing transmission of the second communication data after transmission of (e.g., the entirety of) the first communication data (e.g., such that the transmitted first and second communication data do not overlap each other in time), or vice versa.

In some examples, the method of encoding communication data of the flow diagram 1400 may further comprise causing signaling (e.g., by way of a transmitter, including but not limited to any of the transmitters disclosed herein) to a receiver (e.g., of the node 112) that communication data is to be encoded based on the second communication symbols e.g., to enable the receiver to successfully receive and detect communication data encoded based on the second communication symbols, in accordance with any of the examples disclosed herein.

Figure 15:
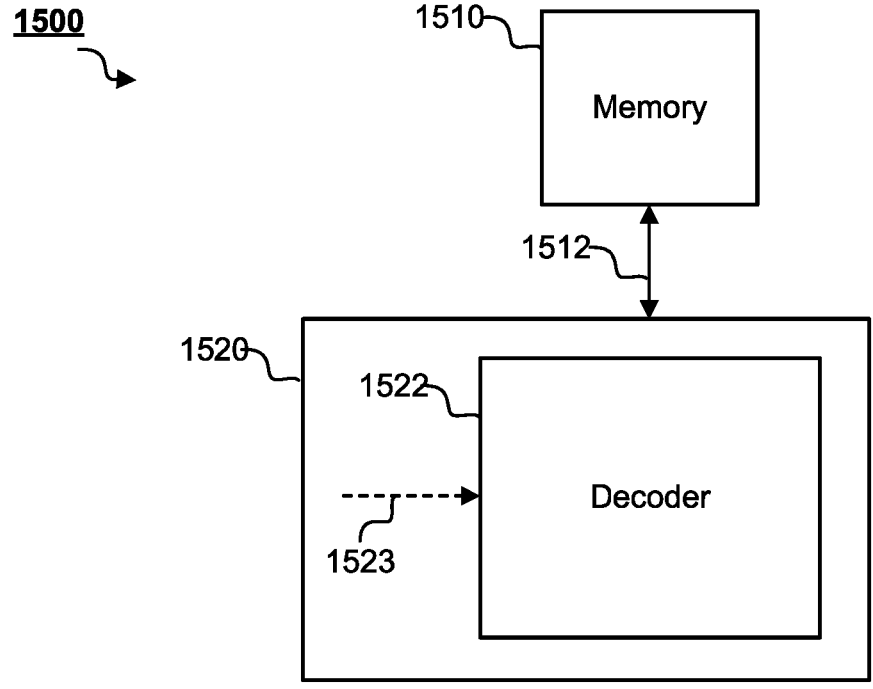
FIG. 15 schematically illustrates apparatus of a communications node of FIG. 1.

FIG. 15 schematically illustrates an apparatus 1500 of the first communications node 110 for decoding communication data. The apparatus 1500 may be operable to decode communication data originally encoded by, for example, the apparatus 1100. Accordingly, it is to be understood that the apparatus 1500 may comprise equivalent or corresponding features to those described with reference to the apparatus 1100.

The apparatus 1500 may decode communication data originally encoded by any keying technique, including but not limited to any keying technique disclosed herein, such as on-off keying or multi-bit keying. The second communications node 112 may have an apparatus comprising the same or similar features. Indeed, it will be assumed in the following discussion that the second communications node 112 has an apparatus comprising the same features as those discussed in relation to the apparatus 1100 shown in FIG. 11. As such, the second communications node 112 will not be described separately here.

The communication data may comprise any type of data including, for example, any type of data disclosed herein or any other type of data.

The apparatus 1500 may comprise processing circuitry 1520 and a memory 1510 communicatively coupled 1512 to the processing circuitry 1520, for example by wired connection(s) or by any other suitable communicative coupling means. The processing circuitry 1520 may be operable to both encode and decode communication data. The processing circuitry 1520 may be the same processing circuitry as one or both of the processing circuitry 320 described above with reference to FIG. 3 and the processing circuitry 1120 described above with reference to FIG. 11, and the memory 1510 may be the same memory as one or both of the memory 310 described above with reference to FIG. 3 and the memory 1110 described above with reference to FIG. 11. Alternatively, the processing circuitry 1520 may be different processing circuitry from either or both of the processing circuitry 320 described above with reference to FIG. 3 and the processing circuitry 1120 described above with reference to FIG. 11, and the memory 1510 may be a different memory from either or both the memory 310 described above with reference to FIG. 3 and the memory 1110 described above with reference to FIG. 11.

The processing circuitry 1520 may be configured to obtain a communication signal comprising the communication data, for example, from a receiver (not shown) communicatively coupled to the processing circuitry 1520 (e.g., by wired or wireless connection(s) or by any other suitable communicative coupling means). The communication signal may comprise, for example, one or more predefined communication symbols in accordance with any of the communication symbols disclosed herein, such as, for example, any of the communication symbols discussed in relation to FIGS. 2*a-c*.

The receiver may comprise one or more transducers including but not limited to: acoustic transducer(s), such as a piezoelectric transducer; electromagnetic transducer(s); fluid (e.g., mud or product) transducer(s). However, it will be assumed herein that the receiver is an acoustic receiver. It may be that the transducer(s) are capable of converting acoustic signals to electrical signals, electrical signals to acoustic signals or both. The receiver may be configured to receive acoustic signals, for example by way of an acoustic communication channel such as the drill string 100 discussed above (e.g., with reference to FIG. 1). The receiver may be operable to receive signals over a plurality of frequency bands. The receiver may be communicatively coupled to the communication channel, for example by one or more couplers. It may be that a node (e.g., the node 110 or the node 112) is configured to receive acoustic signals by the receiver converting received acoustic signals to electrical signals by way of an analogue to digital converter and passing the electrical signals to the processing circuitry 1520 for decoding of the communication data based thereon.

In some examples, the receiver may be part of a transceiver operable to both transmit and receive communication signals. In these examples, the transceiver may comprise a discrete transmitter and a discrete receiver, which may, for example, each comprise a respective transducer such as a respective acoustic transducer, or the transceiver may comprise an integrated transmitter and receiver which share hardware. For example, the transceiver may comprise an integrated transmitter and receiver which share a transducer such as an acoustic transducer, or any other type of transducer.

The processing circuitry 1520 may comprise general purpose processing circuitry or special purpose processing circuitry. The functionality of the processing circuitry 1520 described herein may be implemented in software, hardware or firmware, or a combination of any of software, hardware and firmware. For example, the processing circuitry 1520 may be configured to retrieve and execute computer program instructions stored in the memory 1510 to thereby provide its functionality described herein. The memory 1520 may comprise any suitable memory such as cache memory, random access memory (RAM), read only memory (ROM), flash memory, magnetic or optical disk or any combination thereof.

The functionality of the processing circuitry 1520 is described further below in relation to a functional block comprising an decoder 1522. The decoder 1522 may be arranged to obtain communication data 1523 (e.g., comprising first and second communication data). The communication data 1523 may have been originally encoded based on one or more predefined communication symbols (e.g., by an encoder such as the encoder 1122 discussed above (e.g., with reference to FIG. 11), or by any other suitable encoder). The decoder 1522 may be arranged to decode the communication data 1523 in units of individual communication symbols of one or more predefined communication symbols. It may be that a smallest unit of information decodable by the decoder 1522 is an individual communication symbol (e.g., a single predefined communication symbol in accordance with any of the predefined communication symbols disclosed herein). It may be that the one or more predefined communication symbols are "predefined" in that the one or more communication symbols are defined (e.g., by corresponding symbol mapping data in a memory such as the memory 1510) prior to decoding communication data therewith by the decoder 1522.

The one or more predefined communication symbols may correspond to those used in the original encoding of the communication data 1523 by a transmitting node. For example, the decoder 1522 may be arranged to decode first communication data (e.g., of the obtained communication data 1523) in units of individual communication symbols of one or more predefined first communication symbols (wherein e.g., the first communication data was originally encoded (e.g., by an encoder of a transmitting node such as the encoder 1122 discussed above with reference to FIG. 11) based on (e.g., using) the one or more predefined first communication symbols). Similarly, the decoder 1522 may be arranged to decode second communication data (e.g., of the obtained communication data 1523) in units of individual communication symbols of one or more predefined second communication symbols (wherein e.g., the second communication data was originally encoded (e.g., by an encoder of the transmitting node such as the encoder 1122 discussed above with reference to FIG. 11) based on (e.g., using) the one or more predefined second communication symbols).

It is to be understood that the one or more predefined first communication symbols discussed with reference to FIG. 15 may correspond to any of the one or more predefined first communication symbols discussed above (e.g., with reference to FIG. 11), and may therefore comprise any feature(s) thereof. As such, for the sake of brevity, a full description of the one or more predefined first communication symbols pertaining to FIG. 15 will not be described separately here. Similarly, it is to be understood that the one or more predefined second communication symbols discussed with reference to FIG. 15 may correspond to any of the one or more predefined second communication symbols discussed above (e.g., with reference to FIG. 11), and may therefore comprise any feature(s) thereof. As such, for the sake of brevity, a full description of the one or more predefined second communication symbols pertaining to FIG. 15 will not be described separately here.

As discussed above (e.g., with reference to FIG. 11), the tone configurations of the first and second communication symbols used in the respective encoding of the first and second communication data by a transmitting node may have been chosen to provide for the most suitable communication performance for the transmission thereof, depending on e.g., a data type of the respective communication data or e.g., one or more communication channel characteristics.

In some examples, it may be that the decoder 1522 is arranged to attempt to decode communication data based on each of one or more different sets of different predefined communication symbol(s) (e.g., as specified in corresponding symbol mapping data stored in a memory such as the memory 1510) (e.g., one of the sets comprising the one or more predefined first communication symbols and another of the sets comprising the one or more predefined second communication symbols). In these examples, the decoder 1522 may determine whether (if any) one of the sets of predefined communication symbol(s) provides for a successful decoding of the communication data (e.g., in which case the predefined communication symbol(s) of the one set would correspond to the one or more predefined communication symbols based on which the communication data was originally encoded by a transmitting node). The decoder 1522 may discriminate a successful decoding from an unsuccessful one based on any suitable technique, including but not limited to any of the techniques disclosed herein such as any of the peak detection techniques described in relation to the symbol detection mode of the combiners 324-1 to 324-k shown in FIG. 3, or an onset detection mode, such as the onset detection mode described in relation to the combiners 324-1 to 324-k shown in FIG. 3, or any other technique. Additionally or alternatively, it may be that the decoder 1522 is arranged to receive a signal (e.g., from processing circuitry of a transmitting node such as the processing circuitry 1120 discussed above with reference to FIG. 11) indicative of (e.g., a particular set of) predefined communication symbol(s) to be used in decoding subsequent communication data. For example, it may be that decoder 1522 is arranged to attempt to decode communication data based on the one or more predefined first communication symbols (e.g., by default e.g., upon start-up), and it may be that, responsive to receiving a signal indicating a change of encoding communication data based on the predefined first communication symbols to encoding communication data based on the predefined second communication symbols at the transmitting node, the decoder 1522 subsequently attempts to decode communication data based on the one or more predefined second communication symbols.

In some examples, the first communication data and the second communication data may have been transmitted such that the transmitted first and second communication data overlap in time with each other. For example, the first communication data and the second communication data may have been transmitted simultaneously or substantially simultaneously. In other examples, the first communication data and the second communication data may have been transmitted at times offset from each other such that the transmitted first and second communication data are temporally offset from and temporally overlap with each other. In other examples, the second communication data may have been transmitted after transmission of (e.g., the entirety of) the first communication data (e.g., such that the transmitted first and second communication data do not overlap each other in time), or vice versa.

It may be that the first communication data comprises a first communication message (e.g., having been transmitted from one of the first communications node 110 and the second communications node 112 to the other of the first communications node 110 and the second communications node 112).

It may be that the second communication data comprises a second communication message (e.g., having been transmitted from said one of the first communications node 110 and the second communications node 112 to said other of the first communications node 110 and the second communications node 112).

In some examples, the processing circuitry 1520 may be arranged to generate and cause transmission (by way of a transmitter (including but not limited to any of the transmitters disclosed herein) communicatively coupled therewith (not shown)) of a signal indicative of one or more amplitude, phase or amplitude and phase pre-compensation factors to be applied to corresponding frequency tones of corresponding communication symbols at a transmitting node.

As before, it may be that previously transmitted and received communication signal(s) (e.g., previously received by a receiving node and detected by processing circuitry communicatively coupled therewith, the processing circuitry comprising e.g., the processing circuitry 1520, or any other processing circuitry communicatively couplable with the processing circuitry 1520 (e.g., either directly via any suitable wired or wireless communicative coupling means or e.g., indirectly via a storage medium, such as a memory, accessible to each of the said processing circuitries)) comprise one or more communication symbols to which the pre-compensation factors are to be applied. When the said communication symbol(s) of the said previously transmitted and received communication signal(s) have been captured (e.g., by processing circuitry), the amplitudes, phases or amplitudes and phases of the different frequency components may be analysed (e.g., by the processing circuitry) to determine the respective pre-compensation factors, which may then be transmitted to and obtained by a transmitting node which can apply the pre-compensation factors as discussed.

Figure 16:
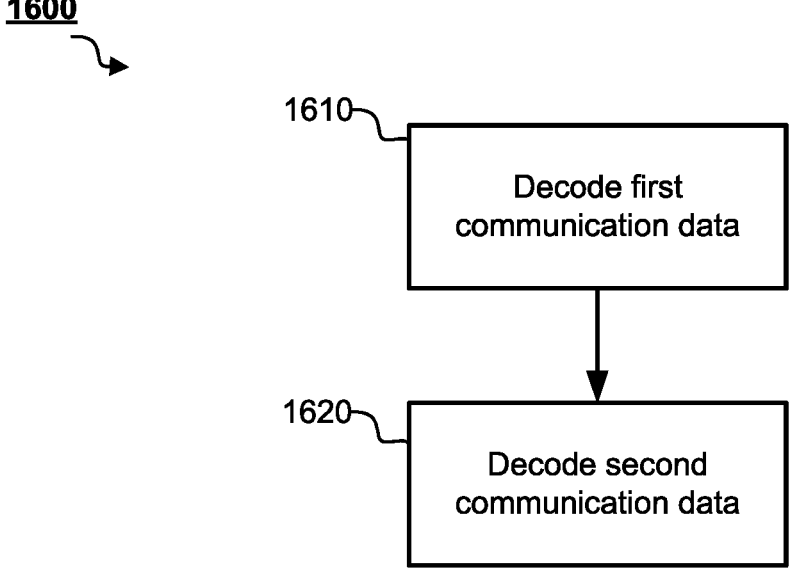
FIG. 16 is a flow diagram of a method of decoding communication data.

FIG. 16 depicts a flow diagram 1600 of a method of decoding communication data. The communication data may comprise any type of data including, for example, any type of data disclosed herein or any other type of data. The flow diagram 1600 may be performed by, for example, the processing circuitry 1520 of the apparatus 1500 described above with reference to FIG. 15, or by any other suitable processing circuitry or apparatus. It is to be understood that any of the techniques or features discussed herein may be combined in any combination with any of the techniques or features discussed in the following with reference the flow diagram 1600.

At block 1610, first communication data is decoded. The decoding of the first communication data may be in accordance with any of the examples disclosed herein, including any of the examples of decoding first communication data discussed with reference to FIG. 15. For example, decoding the first communication data may comprise decoding the first communication data in units of individual communication symbols of one or more predefined first communication symbols (e.g., corresponding to those used in the original encoding of the first communication data by a transmitting node).

At block 1620, second communication data is decoded. The decoding of the second communication data may be in accordance with any of the examples disclosed herein, including any of the examples of encoding second communication data discussed with reference to FIG. 15. For example, encoding the second communication data may comprise decoding the second communication data in units of individual communication symbols of one or more predefined second communication symbols (e.g., corresponding to those used in the original encoding of the second communication data by a transmitting node).

It is to be understood that the one or more predefined first communication symbols discussed with reference to FIG. 16 may correspond to any of the one or more predefined first communication symbols discussed above, e.g., with reference to FIG. 11, and may therefore comprise any feature(s) thereof. As such, for the sake of brevity, a full description of the one or more predefined first communication symbols pertaining to FIG. 16 will not be described separately here. Similarly, it is to be understood that the one or more predefined second communication symbols discussed with reference to FIG. 16 may correspond to any of the one or more predefined second communication symbols discussed above (e.g., with reference to FIG. 11), and may therefore comprise any feature(s) thereof. As such, for the sake of brevity, a full description of the one or more predefined second communication symbols pertaining to FIG. 16 will not be described separately here.

As discussed above (e.g., with reference to FIG. 11), the tone configurations of the first and second communication symbols used in the respective encoding of the first and second communication data by a transmitting node may be chosen to provide for the most suitable communication performance for the transmission thereof, depending on e.g., a data type of the respective communication data or e.g., one or more communication channel characteristics.

Decoding each of the first communication data and the second communication data may comprise decoding the said communication data using any keying technique (e.g., corresponding to the keying technique used in the original encoding of the respective first and second communication data), including but not limited to any keying technique disclosed herein such as on-off keying or multi-bit keying.

The decoding of each of the first communication data and the second communication data may be performed by a decoder (such as e.g., the decoder 1522 discussed with reference to FIG. 15) wherein a smallest unit of information decodable by the decoder is an individual communication symbol (e.g., a single predefined communication symbol in accordance with any of the predefined communication symbols disclosed herein).

Each of the one or more predefined first communication symbols and the one or more predefined second communication symbols may be "predefined" in that the said communication symbols are defined (e.g. by corresponding symbol mapping data) prior to decoding communication data (e.g., the first or second communication data) therewith.

In some examples, the first communication data and the second communication data may have been transmitted (e.g., by a transmitting node) such that the transmitted first and second communication data overlap in time with each other. For example, the first communication data and the second communication data may have been transmitted simultaneously or substantially simultaneously. In other examples, the first communication data and the second communication data may have been transmitted (e.g., by a transmitting node) at times offset from each other such that the transmitted first and second communication data are temporally offset from and temporally overlap with each other. In other examples, the second communication data may have been transmitted (e.g., by a transmitting node) after transmission of (e.g., the entirety of) the first communication data (e.g., such that the transmitted first and second communication data do not overlap each other in time), or vice versa.

It may be that the first communication data comprises a first communication message (e.g., to be transmitted from one communications node to another, such as e.g., from one of the first communications node 110 and the second communications node 112 discussed with reference to FIG. 1 to the other of the first communications node 110 and the second communications node 112).

It may be that the second communication data comprises a second communication message (e.g., to be transmitted to from one communications node to another over a communication channel, such as e.g., from one of the first communications node 110 and the second communications node 112 discussed with reference to FIG. 1 to the other of the first communications node 110 and the second communications node 112).

In some examples, the method of decoding communication data of the flow diagram 1600 may further comprise attempting to decode communication data based on each of one or more different sets of different predefined communication symbol(s) (e.g., as specified in corresponding symbol mapping data stored in a memory) (e.g., one of the sets comprising the one or more predefined first communication symbols and another of the sets comprising the one or more predefined second communication symbols), in accordance with any of the examples disclosed herein. In these examples, it may be determined whether (if any) one of the sets of predefined communication symbol(s) provides for a successful decoding of the communication data (e.g., in which case the predefined communication symbol(s) of the one set would correspond to the one or more predefined communication symbols based on which the communication data was originally encoded by a transmitting node). In these examples, a successful decoding may be discriminated from an unsuccessful one based on any suitable technique, including but not limited to any of the techniques disclosed herein such as any of the peak detection techniques described in relation to the symbol detection mode of the combiners 324-1 to 324-$k$ shown in FIG. 3, or an onset detection mode such as the onset detection mode described in relation to the combiners 324-1 to 324-$k$ shown in FIG. 3, or any other technique.

Additionally or alternatively, the method of decoding communication data of the flow diagram 1600 may further comprise receiving a signal indicative of (e.g., a particular set of) predefined communication symbol(s) to be used in decoding subsequent communication data, in accordance with any of the examples disclosed herein.

In some examples, the method of decoding communication data of the flow diagram 1600 may further comprise generating and causing transmission (e.g., by way of a transmitter, including but not limited to any of the transmitters disclosed herein) (e.g., to a transmitting node) a signal indicative of one or more amplitude, phase or amplitude and phase pre-compensation factors to be applied to corresponding frequency tones of corresponding communication symbols at a transmitting node.

As before, it may be that previously transmitted and received communication signal(s) comprise one or more communication symbols to which the pre-compensation factors are to be applied. When the said communication symbol(s) of the said previously transmitted and received communication signal(s) have been captured, the amplitudes, phases or amplitudes and phases of the different frequency components may be analysed to determine the respective pre-compensation factors, which may then be transmitted to and obtained by a transmitting node which can apply the pre-compensation factors (e.g., to transmitted communication symbols) as discussed.

Thus, generating the signal indicative of one or more amplitude, phase or amplitude and phase pre-compensation factors may comprise receiving a communication signal comprising one or more communication symbols to which the pre-compensation factors are to be applied and analysing said communication signal to determine the respective pre-compensation factors.

Figure 17:
FIG. 17 schematically illustrates an apparatus of a communications node.

FIG. 17 schematically illustrates an apparatus 1700 for decoding a received communication signal. The apparatus 1700 may be an apparatus of a communications node such as node 110 or node 112. As will be discussed further below, the apparatus 1700 corresponds to an example of the apparatus 300 shown in FIG. 3. Accordingly, for the sake of brevity, an exhaustive description of the apparatus 1700 will not be described here. It is to be understood that unless otherwise stated, any one or more of the features discussed in relation to the apparatus 300 may be combined in any combination with any one or more of the features discussed in the following in relation to the apparatus 1700.

The apparatus 1700 may be arranged to decode, in a communication signal received over a communication channel (such as the drill string 100, or any other communication channel), a plurality of messages. As will be discussed further below, each of the plurality of messages may have been transmitted by a transmitter (e.g., of another communications node e.g., the node 112) and may comprise any type of data, including any type of data disclosed herein such as such as command or control data or packetized data (e.g., sensor data), or any other type of data. In some examples, each of the plurality of messages may be predefined (e.g., they may comprise predefined data e.g., transmitted as part of a predefined calibration protocol, as will be discussed further below). In other examples, it may be that one or more or all of the plurality of messages (e.g., the data of the plurality of messages) are not predefined.

The apparatus 1700 may be arranged to decode each of the plurality of messages in units of individual communication symbols, wherein each of the plurality of messages is decoded using a respective one of a plurality of different predefined communication symbols. Each of the said predefined communication symbols may be in accordance with any one of the communication symbols disclosed herein, such as, for example, any of the communication symbols discussed in relation to FIGS. 2*a-c*, and each of the said predefined communication symbols may differ from each other in terms of their respective frequency tone configurations in accordance with any examples disclosed herein.

The apparatus 1700 may be configured to determine a validity of each of the plurality of messages decoded from the received communication signal, for example, by way of an error detection check or by way of a comparison to predefined messages associated therewith (e.g., in the case where the plurality of messages are predefined).

As will be discussed further below, in some examples, the apparatus 1700 may evaluate the communication channel by way of which it has received the communication signal in order to determine communication symbols which are suitable or unsuitable for data communication on the communication channel. In these examples, the apparatus 1700 may, depending on the determined validity of each of the plurality of messages decoded from the received communication signal, generate an indication of a suitability for communication over the communication channel of one or more of the predefined communication symbols (or the constituent frequency tones thereof) corresponding to the said messages (i.e., symbols used in decoding the said messages) (e.g., the said indication comprising a respective indication for each of the said one or more predefined communication symbols or the said constituent frequency tones thereof). For example, if a decoded message were determined to be invalid, the said indication may indicate the predefined communication symbol used in decoding that message (or the constituent frequency tones thereof) to be unsuitable for communication over the communication channel. Conversely, if a decoded message were determined to be valid, the said indication may indicate the predefined communication symbol used in decoding that message (or the constituent frequency tones thereof) to be suitable for communication over the communication channel.

Having generated the above-mentioned indication, the apparatus 1700 may cause communication of the said indication to another communications node (e.g., the node having transmitted the messages, e.g., the second communications node 112), based on which the other communications node may adapt or reconfigure the communication symbols it uses to encode data. Additionally or alternatively, the apparatus 1700 may pause or stop the operation of circuitry configured to attempt to detect symbols indicated to be unsuitable for communication (e.g., and therefore unlikely to be detected). The above-described process of evaluating the communication channel, generating the indication of the suitability for communication over the communication channel of the predefined communication symbol(s) and e.g., causing communication of the said indication to another communications node or e.g., pausing or stopping the operation of the above-mentioned circuitry is subsequently referred to as being part of a channel sounding process.

As will discussed further below, in some examples the apparatus 1700 may, in addition to or in isolation from providing for the above-mentioned channel sounding process, enable a particularly noise immune detection technique that is robust against noise localised to given spectral portions of the communication channel. In these examples, it may be that each of the plurality of messages transmitted in the communication signal pertain to (e.g., comprise or consist of) respective copies of the same data. The data may comprise, for example, command data (e.g., corresponding to an instruction for the apparatus 1700 to cause performance of a predefined operation, such as e.g., to open a valve on a downhole tool to which the apparatus 1700 is communicatively coupled, or any other suitable predefined operation), or any other type of data. In these examples, the apparatus 1700 may be configured to perform (or cause performance of) an (e.g., single) operation corresponding to the said data (e.g., an operation as commonly instructed by each of the said messages—i.e., the same operation is instructed by each of the messages) depending on (e.g., responsive to) validly decoding any one or more of the said messages.

Advantageously, there is frequency diversity between each of the said messages because each of the said messages is decoded using a respective one of a plurality of different predefined communication symbols (e.g., where different symbols provide frequency diversity, e.g., by comprising different combinations of frequency tones from each other), and therefore, it may be likely that at least some of the said messages have a sufficient signal to noise ratio to be validly decoded by the apparatus 1700 even in the presence of noise localised to certain spectral portions on the communication channel. Hence, redundantly transmitting a plurality of messages pertaining to copies of the same data and causing performance of an (e.g., single) operation commonly instructed by each of the said messages (i.e., the same operation is instructed by each of said messages) depending on validly decoding any one or more the said messages as described above may provide for a particularly robust method for communicating the said data.

In the following discussion, the apparatus 1700 will be described in more detail under the assumption that the first communications node 110 comprises the apparatus 1700. The second communications node 112 may have an apparatus comprising the same or similar features to those of the apparatus 1700. Indeed, it will be assumed in the following discussion that the second communications node 112 has an apparatus comprising the same features as those discussed in relation to the apparatus 1700. As such, the second communications node 112 will not be described separately here.

The apparatus 1700 may comprise processing circuitry 1720 (corresponding to an example configuration of the processing circuitry 1320 discussed in relation to the apparatus 300) and a memory 1710 (corresponding to the memory 310 discussed in relation to the apparatus 300) communicatively coupled 1712 to the processing circuitry 1720 by any suitable communicative coupling means (including but not limited to any communicative coupling means discussed in relation to the communicative coupling between the memory 310 and the processing circuitry 320 of the apparatus 300).

The processing circuitry 1720 may be configured to obtain a received communication signal 1723 (which may correspond to an example of the received communication signal 323 discussed in relation to the apparatus 300) from a receiver comprising one or more sensors (e.g., accelerometers, strain gauges or piezoelectric transducers), such as the receiver discussed in relation to the apparatus 300.

The received communication signal may have been received from a transmitter (such as a transmitter of the second communications node 112) having transmitted the said signal with one or more messages encoded therein. The one or more messages may comprise any type of data, including any type of data disclosed herein such as command or control data or packetized data (e.g., sensor data), or any other type of data. In some examples, each of the one or more messages may be predefined (e.g., they may comprise predefined data e.g., transmitted as part of a predefined calibration protocol). In other examples, it may be that one or more or all of the messages (e.g., the data of the one or more messages) are not predefined.

The transmitter (or e.g., an encoder of the transmitter) may have encoded each of the one or more messages using (e.g., by way of keying in accordance with any suitable keying technique, such as e.g., on-off keying, or e.g., multi-bit keying or any other keying technique) a respective (e.g., different) predefined communication symbol in accordance with any one of the communication symbols disclosed herein, such as, for example, any of the communication symbols discussed in relation to FIGS. 2a-c. For example, in examples where the said one or more messages comprises a single message, the transmitter may have encoded the single message using a single predefined communication symbol (e.g., comprising a plurality of selected frequency tones). In other examples where the said one or more messages comprise a plurality of messages, the transmitter may have encoded each of the plurality of messages using (e.g., by way of keying) a respective one of a plurality different predefined communication symbols (e.g., each of the plurality of different communication symbols comprising one or more selected frequency tones and having different frequency tone configurations from each other, in accordance with examples disclosed herein).

As will be discussed further below, the transmitter may be configured to encode message(s) in a communication signal using the same or different predefined communication symbols to those used by the processing circuitry 1720 of the apparatus 1700 to decode messages from the communication signal. Accordingly, for the sake of clarity, predefined communication symbol(s) used by the transmitter to encode message(s) are referred to as "transmitter symbols" and predefined communication symbols used by the processing circuitry 1720 of the apparatus 1700 to decode messages are referred to as "receiver symbols". Similarly, message(s) encoded by the transmitter are referred to as "transmitter message" and messages decoded by the processing circuitry 1720 of the apparatus 1700 are referred to as "receiver messages". It is to be understood that the terms "transmitter" and "receiver" in these expressions are merely labels and do not limit the corresponding symbols or messages.

Returning to the apparatus 1700, the processing circuitry 1720 may be configured to decode a plurality of messages in the received communication signal in units of individual (receiver) communication symbols, wherein each of the plurality of messages is decoded using a respective one of a plurality of different receiver symbols, each of the receiver symbols being in accordance with any one of the communication symbols disclosed herein, such as, for example, any of the communication symbols discussed in relation to FIGS. 2a-c. The processing circuitry 1720 may be configured to decode each of the said messages in the received communication signal 1723 by way of one or more combiners (e.g., in accordance with examples disclosed herein) to thereby attempt to detect instances of each of the plurality of receiver symbols and thereby decode each of the plurality of messages.

In some examples, the receiver symbols used by the processing circuitry 1720 in decoding each of the receiver messages may correspond to the transmitter symbols used by the transmitter in encoding the one or more transmitter messages. In these examples, the one or more transmitter messages may comprise a plurality of transmitter messages and there may be a one to one correspondence between transmitter messages and receiver messages.

In other examples, it may be that the receiver symbols used by the processing circuitry 1720 in decoding each of the receiver messages do not correspond to (i.e., may differ from) the transmitter symbols used by the transmitter in encoding the one or more transmitter messages. In these examples, the receiver symbols may be based on the constituent frequency tones of the transmitter symbol(s) encoded by the transmitter but differ from the transmitter symbol(s) in terms of their respective frequency tone configuration (e.g., the receiver symbols may each comprise or consist of a respective subset of the frequency tones of a transmitter symbol). Such examples may advantageously provide for particularly flexible and robust systems (e.g., particularly for one-way communication systems where the transmitter is not operable to receive data) whereby the transmitter may continue to encode messages used fixed transmitter symbols while the processing circuitry may adapt the configuration of the receiver symbols in order to improve reception performance. In these examples, the receiver messages may each respectively correspond to one or more portions of the one or more transmitter messages. That is, the one or more transmitter messages may be sub-divided to derive the respective plurality of receiver messages. As an illustrative example, the transmitter may transmit a single transmitter message encoded using a single transmitter symbol comprising the frequency tones f1, f2, f3, and f4. The transmitter message may comprise the bit stream "10" encoded by way of an on-off keying pattern of the transmitter symbol comprising an on-keyed instance of the transmitter symbol (i.e., an on-keyed instance of each of the frequency tones f1, f2, f3, and f4) temporally contiguously followed by an off-keyed instance of the transmitter symbol (i.e., an off-keyed instance of each of the frequency tones f1, f2, f3, and f4). In this illustrative example, the processing circuitry 1720 may be configured to detect: a first receiver symbol SR1 to thereby detect a first receiver message MR1; and a second receiver symbol SR2 to thereby detect a second receiver message MR2. In this example, SR1 may comprise the frequency tones $f_1$ and $f_2$, and SR2 may comprise the frequency tones $f_3$ and $f_4$. Accordingly, the first receiver message MR1 may correspond to the portions of the transmitter message comprising keyed instances (e.g., both on and off-keyed instances) of the frequency tones $f_1$ and $f_2$, and the second receiver message MR2 may correspond to the portions of the transmitter message comprising keyed instances of the frequency tones $f_3$ and $f_4$.

In examples where a plurality of receiver symbols each comprise or consist of a respective subset of the frequency tones of a transmitter symbol, the symbol indicator values of the combiners configured to detect the receiver symbols may be combined to provide a combined symbol indicator value indicative of whether the transmitter symbol has been successfully detected.

In examples where the one or more transmitter messages comprise a single transmitter message encoded using (e.g., by way of keying) a single transmitter symbol, the single transmitter symbol may comprise a plurality of different frequency tones spread across two or more passbands. Such symbols may be referred to as "spread-spectrum" or "broadband" symbols. In other examples where the one or more transmitter messages comprise a plurality of transmitter messages encoded using respective ones of a plurality of different transmitter symbols, it may be that each transmitter symbol corresponds to a respective passband of the communication channel; for example, it may be that each transmitter symbol comprises a respective plurality of frequency tones spread across a respective passband of the communication channel.

In some examples, the one or more transmitter messages may have encoded therein a plurality of copies of the same data e.g., to provide for redundancy and e.g., to thereby provide for the more robust detection of the data as described above. In some examples, each copy of the said data may be encoded in a different transmitter message (i.e., the one or more transmitter messages may comprise a plurality of transmitter messages each of which corresponds to a respective copy of the said data). In other examples, each copy of the said data may be encoded in one or more portions (e.g., in a respective portion) of the one or more transmitter messages. For example, the one or more transmitter messages may comprise a single transmitter message encoded by way of on-off keying a single transmitter symbol comprising a plurality of selected frequency tones, and each copy of the said data may correspond to respective keyed instances of one or more respective frequency tones of (e.g., a respective portion of) the single transmitter symbol.

The functionality of the processing circuitry 1720 is described further below in relation to a plurality of functional blocks of the processing circuitry 1720. The functional blocks comprise: a time domain to frequency convertor 1722 (corresponding to an example of the time domain to frequency converter 322 discussed in relation to the apparatus 300); a plurality of groups of combiners 1724-1 to 1724-L (e.g., where L may be an integer greater than 1); and a symbol detector 1726 (which may be an example of the symbol detector 326 discussed in relation to the apparatus 300).

As with the time domain to frequency converter 322 of the apparatus 300, the time domain to frequency domain converter 1722 is arranged to convert time domain data to frequency domain data (e.g., to perform a discrete Fourier transform). It may be that the time domain to frequency domain converter 1722 is arranged to repeatedly (e.g., periodically, cyclically, substantially continuously or otherwise) receive (e.g., a stream of) groups of samples of receiver data from the above-discussed receiver (the receiver data being time domain data) and to (e.g., successively or otherwise) convert each of the groups of samples of receiver data into corresponding groups of frequency domain samples. The respective groups of samples of the receiver data may each be based on a respective detection time window. That is, a group of samples of receiver data may be samples of time domain data received by the receiver within a respective time window. The receiver data may be apportioned into detection time windows in accordance with any example disclosed herein. For example, the receiver data may be apportioned into non-overlapping contiguous detection time windows in accordance with examples disclosed herein. In these examples, each combiner of the one or more groups of combiners 1724-1 to 1724-L may comprise a single combiner bin, in accordance with examples disclosed herein, such as the first example discussed in relation to the one or more combiners 324-1 to 324-k of the apparatus 300. In other examples, the receiver data may be apportioned into temporally overlapping and temporally offset detection time windows in accordance with examples disclosed herein. In these examples, each combiner of the one or more combiners 1724-1 to 1724-L may comprise a plurality of combiner bins, in accordance with examples disclosed herein, such as the second example discussed in relation to the one or more combiners 324-1 to 324-k of the apparatus 300. As discussed herein, apportioning the receiver data in this way and implementing combiners having a respective pluralities of combiner bins may provide for the more robust determination of the presence of absence of the predefined communication symbol(s) to be detected by each of the combiners.

The plurality of groups of combiners 1724-1 to 1724-L of the apparatus 1700 may be arranged to provide for the detection of instances of the receiver symbols in the received communication signal, and thereby to enable decoding of the plurality of receiver messages.

Each of the one or more groups of combiners 1724-1 to 1724-L may correspond to different instances of the one or more combiners 324-1 to 324-k discussed in relation to the apparatus 300, wherein each of the said groups of combiner(s) may be arranged to capture different ones of the plurality of receiver symbols.

The number of groups of combiners 1724-1 to 1724-L may depend on the number of different receiver symbols the processing circuitry 1720 is to detect. For example, the plurality of groups of combiners 1724-1 to 1724-L may comprise one group of combiners for each of the plurality of receiver symbols the apparatus 1700 is arranged to detect, each of the groups of combiners being arranged to capture a different one of the plurality of receiver communication symbols.

The number of combiners in each of the groups of combiners 1724-1 to 1724-L may depend on an encoding configuration (e.g., a configuration of selected frequency tones of the transmitter symbol(s) and e.g., a keying method used in encoding the transmitter symbol(s)) of the transmitter (or e.g., an encoder thereof) from which the apparatus 1700 is arranged to receive data. If, for example, the said encoding configuration gives rise to a communication signal comprising multiple instances of a given receiver symbol at temporally offset and temporally overlapping detection times, the group of one or more combiners arranged to capture that receiver symbol may comprise a corresponding plurality of combiners arranged to detect the said symbol at temporally overlapping and temporally offset detection times, in accordance with examples disclose herein. As another example, if the processing circuitry 1720 is not (e.g., precisely) synchronised with the received communication signal, each of the one or more groups of combiners 1724-1 to 1724-L may comprise a plurality of combiners arranged to capture the same receiver symbol at temporally overlapping and temporally offset detection times. Doing so may help to ensure (or at least increase the likelihood) that at least one combiner in each of the groups of combiners 1724-1 to 1724-L is substantially synchronised with the received communication signal or at least improve the probability that instances of the receiver symbols will be adequately detected.

For the sake of simplicity, the following assumes that each of the groups of combiners 1724-1 to 1724-L comprise a respective single combiner. Accordingly, in the following, the plurality of groups of combiners 1724-1 to 1724-L are referred to as a "plurality of combiners 1724-1 to 1724-L" by default, and the expression "plurality of groups of combiners 1724-1 to 1724-L" is only used in relation to specific examples in which at least one of the plurality of groups of combiners 1724-1 to 1724-L comprises a respective plurality of combiners. It is to be understood that the present disclosure is not so limited and that any and all parts of the following description may be extended to one or more groups of respective pluralities of combiners.

Each of the plurality of combiners 1724-1 to 1724-L may be configured to, based on corresponding frequency domain data provided by the time domain to frequency domain converter 1722, generate respective symbol indicator data indicative of a presence or absence of a respective receiver symbol (i.e., associated with that combiner) for each of a plurality of different (e.g., temporal) portions of the received communication signal. Each of the said portions may have a duration longer than or substantially equal to a symbol length of the corresponding receiver symbol. For a given combiner of the plurality of combiners 1724-1 to 1724-k, for each of the said different portions of the received communication signal, that combiner may combine amplitudes of one or more selected frequency components of the frequency domain data corresponding to that portion of the received communication signal (e.g., as provided by the time domain to frequency domain converter 1722) to thereby generate respective symbol indicator data for each of the said portions. The said one or more selected frequency components may be selected according to the receiver symbol which that combiner is arranged to detect. For example, the said one or more selected frequency components may correspond to the constituent frequency tone(s) of the receiver symbol that combiner is arranged to detect. The operation of a combiner generating symbol indicator data by combining amplitudes of one or more selected frequency tones has been described above. Accordingly, an exhaustive description of the operation of each of the plurality of combiners 1724-1 to 1724-L is not repeated here. Each of the plurality of combiners 1724-1 to 1724-L may generate respective symbol indicator data based on the combining of amplitudes one or more respective selected frequency components in accordance with any of the techniques disclosed herein.

The temporal relationship between the plurality of different portions of the received communication signal based on which each of the one or more combiners 1724-1 to 1724-L generates respective symbol indicator data may be predefined. For example, the said temporal relationship may be predefined in accordance with the encoding configuration of the transmitter having transmitted the received communication signal. For example, for each combiner of the plurality of combiners 1724-1 to 1724-L, the temporal relationship between the plurality of portions of the received communication signal (which portions correspond to different possible instances of the symbol in the communication signal) to be captured by that combiner may be predefined in accordance with a configuration of keyed instances (e.g., both on and off-keyed instances in the case of on-off keying) of the frequency tones of that receiver symbol transmitted by the transmitter in the communication signal given the encoding configuration of the encoder of the transmitter. The temporal relationship between the said plurality of portions may be defined in terms of temporal duration and temporal location of the said keyed instances (e.g., relative to each other) in the received communication signal.

Figure 18:
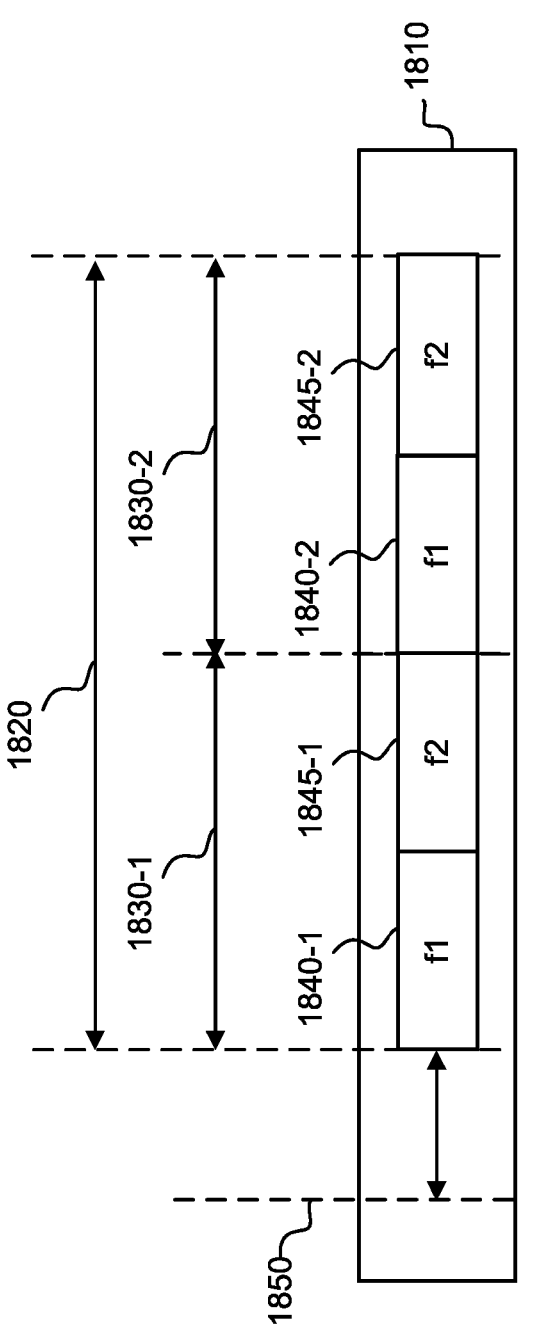
FIG. 18 schematically illustrates example a communication signal.

As an illustrative example, consider the illustration shown in FIG. 18 which shows a received communication signal 1810. In this illustrative example, the encoding configuration of the encoder of the corresponding transmitter having transmitted the signal 1810 is such that it encodes a single transmitter message by way of on-off keying a single transmitter symbol $S_{T1}$ comprising the frequency tones $f_1$ and $f_2$. In this illustrative example, the received communication signal 1810 comprises a transmitter message 1820 comprising a first (e.g., on or off) keyed instance 1830-1 of $S_{T1}$, and a second (e.g., on or off) keyed instance 1830-2 of $S_{T1}$.

The first and second keyed instances of the transmitter symbol $S_{T1}$ 1840-1, 1840-2 may comprise, for example, respective on-keyed or off-keyed instances of the said symbol depending on the data encoded thereby. In this illustrative example, the receiver symbols may differ from but be based on one or more frequency tones of the transmitter symbol $S_{T1}$ (e.g., a plurality of receiver symbols may each comprise a respective subset of the frequency tones of the transmitter symbol $S_{T1}$). For example, the processing circuitry 1720 may be configured to detect: a first receiver message comprising a keying pattern of a first receiver symbol $S_{R1}$ comprising the frequency tone $f_1$; and a second receiver message comprising a keying pattern of a second receiver symbol $S_{R2}$ comprising the frequency tone $f_2$. In this illustrative example, the one or more combiners 1724-1 to 1724-*l* of the processing circuitry 1720 may comprise two combiners: a first combiner 1724-1 arranged to capture $S_{R1}$, and a second combiner 1724-2 arranged to capture $S_{R2}$. In this illustrative example, the first combiner 1724-1 may be arranged to generate symbol indicator data (indicative of the presence or absence of $S_{R1}$) for each of a plurality of different portions of the received communication signal 1810 having a configuration corresponding to the configuration of the portions 1840-1 and 1840-2, and the second combiner 1724-2 may be arranged to generate symbol indicator data (indicative of the presence or absence of $S_{R2}$) for each of a plurality of different portions of the received communication signal 1810 having a configuration corresponding to the configuration of the portions 1845-1 and 1845-2.

In some examples, the (e.g., absolute) temporal position in the received communication signal of each of the keyed (e.g., on or off-keyed) instances of the respective frequency tone(s) of the plurality of receiver symbols to be detected by the combiners 1724-1 to 1724-L may be known, e.g., relative to a known feature of the received communication signal, such as e.g., synchronisation data (e.g., as indicated by the dashed line 1850 shown in FIG. 18). In these examples, for each of the one or more combiners 1724-1 to 1724-L, each of the corresponding plurality of different portions of the received communication signal may be selected to coincide with (or to at least encompass) each keyed (e.g., on or off-keyed) instance of the frequency tone(s) of the receiver symbol in the received communication signal that that combiner is to detect.

In other examples, it may be that the (e.g., absolute) temporal position in the received communication signal of each of the keyed (e.g., on or off-keyed) instances of the respective frequency tone(s) of the plurality of receiver symbols to be detected by the combiners 1724-1 to 1724-L is not known. In these examples, for each of the combiners 1724-1 to 1724-L, each of the corresponding plurality of different portions of the received communication signal may be selected such that the configuration thereof (e.g., in terms of duration and relative spacing to each other) corresponds to the configuration in the received communication signal of the keyed instances (e.g., on or off-keyed instances in the case of on-off keying) in the received communication signal of the frequency tone(s) of the receiver symbol that that combiner is to detect (e.g., given the encoding configuration of the transmitter having transmitted the said signal). However, in this case, the portions of the communication signal may not be selected to coincide with each keyed instance of the said frequency tones in the communication signal because the (e.g., absolute) temporal position of the said keyed instances may not be known. In this case, each of the plurality of groups of combiners 1724-1 to 1724-L may comprise respective pluralities of combiners. It may that for a given group, each combiner in that group is arranged to detect instances of the same selected frequency tone(s) of the same receiver symbol in respective different pluralities of different portions of the received communication signal, each of the respective different pluralities having the same relative configuration (corresponding to the predefined temporal relationship of the keyed instances of the corresponding selected frequency tone(s) of the said receiver symbol in the received communication signal), each of the respective different pluralities of different portions of the received communication signal being temporally overlapping and temporally offset from each other e.g., to thereby help to ensure (or at least increase the likelihood) that at least one combiner in that group is substantially aligned to the instances of the corresponding receiver communication symbol in the received communication signal.

Each of the plurality of combiners (or plurality of groups of combiners, where applicable) 1724-1 to 1724-L may provide their respective symbol indicator data to the symbol detector 1726, based on which the symbol detector 1726 may decode a corresponding plurality of messages.

For example, in decoding each of the said plurality of messages, the symbol detector 1726 may detect a respective keying pattern of the receiver symbol associated with that message (i.e., the receiver symbol used to decode that message) in the corresponding plurality of different portions of the received communication signal depending on the symbol indicator data for the said portions as provided by a respective one of the combiners 1724-1 to 1724-L.

A keying pattern of a symbol (e.g., a receiver symbol) may comprise any keying or modulation of the said symbol. In some examples, the said keying may comprise on-off keying (e.g., in accordance with examples disclosed herein), multi-bit keying (e.g., in accordance with examples disclosed herein), or any other suitable type of keying or modulation.

The symbol detector 1726 is configured to determine a validity of each of the said decoded receiver messages.

In some examples, the symbol detector 1726 may determine the validity of each of the said decoded receiver messages by applying an error detection check thereto. The error detection check may be in accordance with a predefined error detecting scheme depending on any one of: a cyclic redundancy check; a hamming code; a parity check; a checksum; or by way of any other suitable error detecting scheme. In these examples, the transmitter may be configured to encode the transmitter message(s) in accordance with the said predefined error detecting scheme.

Additionally or alternatively, the received communication signal may have been received as part of a predefined calibration protocol wherein the one or more transmitter messages are predefined. In these examples, the one or more transmitter messages may comprise respective predefined data encoded by respective predefined keying pattern(s) of respective predefined transmitter symbol(s). In these examples, a keying pattern of a transmitter symbol may comprise an on-off keying of that symbol comprising at least one on-keyed instance (i.e., at least one presence of) the said symbol (e.g., in a given time period) and at least one off-keyed instance (i.e., at least one absence of) the said symbol (e.g., in the given time period) in a predefined order. For example, an on-off keying pattern of a predefined transmitter symbol may comprise an on-keyed instance of the said symbol contiguously followed by an off-keyed instance of the said symbol. Such an on-off keying pattern may be represented by the bit string "10". It is to be understood that the above examples are purely for illustrative purposes and the present disclosure is not so limited. For example, the on-off keying pattern may be based on the bit pattern 1101001. A predefined transmitter message may comprise any suitable data, and therefore the corresponding predefined keying pattern of a transmitter symbol may comprise any suitable pattern of any type of keying or modulation of the said symbol. In some examples, each of the one or more transmitter messages may comprise different transmitter symbols keyed in accordance with the same keying pattern. In other examples, each of the one or more transmitter messages may comprise respective ones of a plurality of (e.g., different) keying patterns.

In examples where the received communication signal is received as part of a predefined calibration protocol, the processing circuitry 1720 may determine the validity of each of the receiver messages detected in the received communication signal by comparing each of the said receiver messages to respective predefined messages (e.g., stored in the memory 1710) associated therewith (e.g., associated with the receiver symbol used in decoding that message).

For example, in examples where the receiver symbols detected by the processing circuitry 1720 correspond to the transmitter symbols encoded by the transmitter (and therefore, where there is a one to one correspondence between transmitter and receiver messages), the respective predefined message associated with each of the detected receiver messages may comprise the equivalent transmitter message of the equivalent transmitter symbol. For illustrative purposes, consider an example where, as part of a predefined calibration protocol, the transmitter transmits a plurality of predefined transmitter messages comprising a first predefined transmitter message corresponding to a predefined on-off keying pattern of a first transmitter symbol $S_{T1}$ corresponding to the bit string "10", and a second predefined transmitter message corresponding to a predefined on-off keying pattern of a second transmitter symbol $S_{T2}$, also corresponding to the bit string "10". In this example, the processing circuitry 1720 may be configured to detect instances of a first receiver symbol $S_{R1}$ (corresponding to $S_{T1}$) to thereby detect a first receiver message (e.g., by way of detecting a keying pattern of $S_{R1}$), and to detect instances of a second receiver symbol $S_{R2}$ (corresponding to $S_{T2}$) to thereby detect a second receiver message (e.g., by way of detecting a keying pattern of $S_{R2}$). In this example the predefined message associated with the first receiver message corresponds to the bit string "10" (i.e., the corresponding transmitter message encoded by the equivalent transmitter symbol $S_{T1}$), and the predefined message associated with the second receiver message also corresponds to the bit string "10" (i.e., the corresponding transmitter message encoded by the equivalent transmitter symbol $S_{T2}$).

In examples where the receiver symbols differ from but are based on the one or more transmitter symbols encoded by the transmitter, the respective predefined message associated with each of the said receiver symbols may correspond to a keying pattern in the one or more transmitter messages of the constituent frequency tone(s) of that receiver symbol. Such a keying pattern may be predefined.

In comparing each of the decoded receiver messages to a respective predefined message associated therewith, the processing 1720 circuitry may determine a (e.g., level of) correspondence (e.g., a match or no match) between each of the detected receiver messages (comprising respective modulations of respective receiver symbols) and the predefined message associated therewith, based on which an indication of a suitability of that receiver symbol for data communication on the communication channel (e.g., with another node) may be determined. For example, if there is a match, the respective symbol may be determined to be suitable for communication with the transmitting node; if there is no match, the respective symbol may be determined to be unsuitable for communication with the transmitting node.

As an illustrative example, consider an example where the transmitter encodes predetermined transmitter message(s) in the communication signal such that the communication signal comprises a first predefined receiver message comprising a predefined on-off keying pattern of a first receiver symbols $S_{R1}$ corresponding to the bit string "10", and a second predefined receiver message comprising a predefined on-off keying pattern of a second receiver symbol $S_{R2}$ also corresponding to the bit string "10". In this example, the processing circuitry 720 may be arranged to detect instances of the receiver symbol $S_{R1}$ to thereby (e.g., attempted to validly) decode the first receiver message. In this example the predefined message associated with the first receiver message corresponds to the bit string "10". If the processing circuitry were to detect a first receiver message by detecting a keying pattern of $S_{R1}$ corresponding to the on-off keying pattern "10", the processing circuitry 1720 may compare the decoded first receiver message with the predefined message associated therewith, based on which the processing circuitry 1720 may determine there to be a (e.g., high level of) correspondence therebetween. Accordingly, in this particular illustrative example, the processing circuitry 1720 may generate an indication indicating $S_{R1}$ to be suitable for communication on the communication channel. In this illustrative example, the processing circuitry 1720 may (e.g., erroneously to due e.g., noise in the communication channel) decode a second receiver message by detecting a keying pattern of $S_{R2}$ corresponding to the on-off keying pattern "11", and may compare the decoded second receiver message with the predefined message associated therewith ("10"), based on which the processing circuitry 1720 may determine there to be a lack of (e.g., or a low level of) correspondence therebetween. Accordingly, in this particular illustrative example, the processing circuitry 1720 may generate an indication indicating $S_{R2}$ to not be suitable for communication on the communication channel. It is to be understood that the above-discussed examples are merely for illustrative purposes and do not limit the present disclosure.

In some examples, the processing circuitry 1720 may generate an indication of a suitability of one or more or each of the predefined receiver communication symbols for communication depending on the determined validity of each of the corresponding receiver messages decoded thereby. The communication symbols constituent in the said indication may be referred to as "test symbols". For example, if a decoded receiver message is determined to be invalid, the processing circuitry 1720 may generate an indication that the predefined receiver communication symbol used in decoding that message (or the constituent frequency tones thereof) is (are) not suitable for communication over the communication channel (e.g., with the transmitting node). Conversely, if a decoded receiver message is determined to be valid, the processing circuitry 1720 may generate an indication that the predefined receiver communication symbol used in decoding that message (or the constituent frequency tones thereof) is (are) suitable for communication over the communication channel (e.g., with the transmitting node).

In some examples, the processing circuitry (e.g., symbol detector 1726) may cause communication of the above-mentioned indication to another communications node (e.g., the node having transmitted the received communication signal, e.g., the second communications node 112), based on which the other communications node may adapt or reconfigure communication symbols used to transmit data to the first node 110. Additionally or alternatively, the processing circuitry (e.g., symbol detector 1726) may pause or stop operation of any combiner or combiners arranged to detect receiver symbols identified to be unsuitable for communication on the communication channel, e.g., to save power. In some examples, the pausing or stopping operation of the said combiner(s) may depend on (e.g., be responsive to) the generation of the indication that the said receiver symbol(s) are unsuitable for communication on the communication channel. Additionally or alternatively, the said pausing or stopping may depend on (e.g., be responsive to) an obtained signal (e.g., from the communications node having transmitted the received communication signal) indicating that the receiver symbol(s) that those combiner(s) are arranged to detect are not to be currently used for communication (e.g., by the communications node having transmitted the received communication signal).

As discussed above, in some examples, the or more receiver symbols detected by the processing circuitry 1720 may differ from (in terms of their respective frequency tone configuration) the transmitter symbol(s) encoded by the transmitter. It may be that, for example, each of the receiver symbols comprise groups of spectrally contiguous frequency tones. This may advantageously enable the identification of one or more passbands or spectrally contiguous parts thereof suitable for communication on the communication channel (e.g., with the node transmitting the received communication signal).

It may be that a transmitter symbol comprises a temporal sequence of N (e.g., spectrally contiguous) tones (e.g., N=64). It may be that the temporal sequence of N tones of the transmitter symbol comprises N (e.g., spectrally contiguous) frequency tones in order of (e.g., linearly) increasing or decreasing frequency. It may be that a plurality of receiver symbols each comprise a respective subset of M tones of the N tones of the transmitter signal, M being less than N (M may be a factor of N, e.g., M=8). It may be that a plurality of receiver symbols each comprise a temporal sequence of (e.g., spectrally contiguous) frequency tones, the temporal sequence of each of the plurality of receiver symbols being a respective subset of the temporal sequence of (e.g., spectrally contiguous) frequency tones of the transmitter symbol. It may be that each of the plurality of receiver symbols comprises or consists of a discrete portion of the transmitter symbol which does not overlap with the portions of the transmitter symbol corresponding to the other receiver symbols of the plurality of receiver symbols. It may be that successive portions of the transmitter symbol corresponding to the receiver symbols are combined by different combiners, each of said combiners being configured to detect a respective receiver symbol in a different (e.g., spectrally contiguous) temporal portion of the transmitter symbol. Thus, it may be that each of the receiver symbols comprises a respective group of tones spanning a respective (e.g., distinct) portion of the frequency spectrum. For example, it may be that the frequency ranges spanned by the respective groups of tones of the respective receiver symbols do not spectrally overlap with each other.

It may be that the frequency tones of the temporal sequence of the one or more transmitter symbols are not arranged in a temporal order of (e.g., spectrally contiguous) increasing or decreasing (e.g., linearly increasing or decreasing) frequency. This may, for example, provide for temporal diversity in respect of the frequency tones for each of the receiver symbols, and thereby mitigate against e.g., transient spikes in noise on the communication channel giving rise to erroneous determinations as to the suitability of communication symbols for communication on the communication channel. As will be discussed further below, employing receiver symbols which differ from the transmitter symbol(s) may require a selective mapping between the combiners arranged to detect the respective receiver symbols and the corresponding portions or sub-portions of the received communication signal comprising the corresponding frequency tones, depending on the configuration of the one or more transmitter symbols. Frequency tones from the received communication signal may be selectively mapped to respective combiners corresponding to the respective receiver symbols based on the selective mapping to ensure that the respective combiners combine respective (e.g., spectrally contiguous) groups of tones of the respective receiver symbols. As above, the respective groups of tones of the receiver symbols may span respective (e.g., distinct) portions of the frequency spectrum. For example, it may be that the frequency ranges spanned by the respective groups of tones of the respective receiver symbols do not spectrally overlap with each other.

As an illustrative example, a received communication signal may comprise a transmitter message corresponding to an on-off keying pattern corresponding to the bit pattern "10" of a single transmitter symbol $S_{T1}$, $S_{T1}$ comprising 16 sets of single frequency tones in the following order:

$$S_{T1}=f_{10},f_1,f_{14},f_8,f_4,f_{12},f_2,f_3,f_5,f_{16},f_6,f_7,f_9,f_{11},f_{13},f_{15}.$$

Continuing with this example, the one or more combiners 1724-1 to 1724-L may comprise two combiners each arranged to detect, for each of a plurality of different portions of the received communication signal, symbol indicator data indicative of the presence or absence of a respective one of two different receiver symbols, $S_{R1}$-$S_{R2}$, having the following tone configuration:

$$S_{R1}=f_1,f_2,f_3,f_4,f_5,f_6,f_7,f_8$$

$$S_{R2}=f_9,f_{10},f_{11},f_{12},f_{13},f_{14},f_{15},f_{16}.$$

Although the constituent tones $f_1$ to $f_8$ of $S_{R1}$ are listed in numerical order above, it will be understood that the temporal sequence of tones defined by symbol $S_{R1}$ conforms to the order in which the frequency tones $f_1$-$f_8$ appear in transmitter symbol $S_{T1}$. That is, the combiner arranged to detect symbol $S_{R1}$ is arranged to combine the amplitudes of the tones $f_1$-$f_8$ in the order $f_1$, $f_8$, $f_4$, $f_2$, $f_3$, $f_5$, $f_6$, $f_7$ as that is the order in which they appear in transmitter symbol $S_{T1}$. Similarly, although the constituent tones $f_9$ to $f_{16}$ of $S_{R2}$ are listed in numerical order above, it will be understood that the temporal sequence of tones defined by symbol $S_{R2}$ conforms to the order in which the frequency tones $f_9$-$f_{16}$ appear in symbol $S_{T1}$. That is, the combiner arranged to detect symbol $S_{R2}$ is arranged to combine the amplitudes of the tones $f_9$-$f_{16}$ in the order $f_{10}$, $f_{14}$, $f_{12}$, $f_{16}$, $f_9$, $f_{11}$, $f_{13}$, $f_{15}$ as that is the order in which they appear in transmitter symbol $S_{T1}$.

In examples where the plurality of receiver communication symbols differ from the one or more transmitter communication symbols, for a given combiner of the combiners 1724-1 to 1724-L, each portion of the plurality of different portions for which that combiner is to generate symbol indicator data may correspond to predefined sub-portions (e.g., as detected during a plurality of temporally non-contiguous detection time windows) of the received communication signal comprising the frequency tones of the receiver symbol associated with that combiner. It may be that the temporal location of each of the said sub-portions may be known relative to a known feature of the received communication signal (such as e.g., synchronisation data). It may be that the frequency domain data generated by the time domain to frequency domain converter corresponding to those sub-portions 1723 is selectively provided to that combiner.

Referring back to the illustrative example above, the plurality of different portions of the received communication signal based on which the combiner arranged to detect $S_{R1}$ is to generate symbol indicator data may correspond to those portions of the received communication signal comprising keyed instances (e.g., both on and off-keyed instances for on-off keying) of the frequency tones $f_1$-$f_8$ (e.g., in accordance with an encoding configuration of an encoder of the transmitter). Similarly, the plurality of different portions of the received communication signal based on which the combiner arranged to detect $S_{R2}$ is to generate symbol indicator data may correspond to those portions of the received communication signal comprising keyed instances (e.g., both on and off-keyed instances for on-off keying) of the frequency tones $f_9$-$f_{16}$ (e.g., in accordance with an encoding configuration of an encoder of the transmitter). Each of the said sub-portions may be known relative to a known feature of the received communication signal (such as e.g., synchronisation data), and based on the known encoding configuration of encoder of the corresponding transmitter having transmitted the said signal.

In some examples the one or more transmitter symbols may comprise a single predefined transmitter symbol, and the apparatus 1720 may be arranged to detect a plurality of different receiver symbols, where each of the said receiver symbols comprise selected frequency tones corresponding to respective subsets of the frequency tones of the single transmitter symbol. In such examples, the frequency tones of the single transmitter symbol may be mapped to respective different receiver symbols $SR_X$ where X is an index of the predefined receiver symbol (e.g., $SR_0$, $SR_1$, $SR_2$, etc), in accordance with the following equation:

$$SR_X = \text{int}(\text{tone number}/(\text{number of tones/BF})),$$

where int is a rounding function to round $SR_X$ is down to the nearest integer below the result of the above equation, number of tones is the number of frequency tones in the single transmitter symbol, tone number is the tone index of a particular frequency tone of the single transmitter symbol being mapped (e.g., $f_1$, $f_2$ etc.) and BF is the bifurcation factor corresponding to the number of receiver symbols into which the tones of the single transmitter symbol are mapped. In this example, the number of tones in each of the receiver symbols may be equal. However, this is merely one example and the present disclosure is not so limited. As above, different combiners or groups of combiners may be configured to capture the different receiver symbols $SR_X$ as discussed herein, and to thereby detect the message associated with the respective receiver symbols to determine whether those receiver symbols are suitable or unsuitable for data communication. It will be understood that, instead of the mapping involving calculating the receiver symbol to which the incoming frequency tones relate, the mapping between the tones of the incoming transmitter symbol and the receiver symbols may be preconfigured (pre-mapped).

As discussed above, in some examples, the processing circuitry 1720 may (e.g., in addition to or in isolation from generating the above-mentioned indication of the suitability of receiver symbols for communication on the communication channel) perform (or cause performance of) a (e.g., single) operation commonly instructed by each of one or more validly decoded receiver messages (i.e., each of the validly decoded receiver messages instruct the same operation). In these examples, the symbol detector 1726 may cause performance of the said operation depending on (e.g., responsive to) having determine one or more of such messages to have been validly decoded. The symbol detector 1726 may cause performance of the said operation by, for example, communicating with other circuitry (not shown).

While the above-described channel sounding process (i.e., pertaining to generating the indication of the suitability for communication over the communication channel of the predefined communication symbol(s) and e.g., causing communication of the said indication to another communications node or e.g., pausing or stopping the operation of the above-mentioned circuitry is subsequently referred to as being part of a channel sounding process) was described in relation to a plurality of receiver messages, it is to be understood that present disclosures extends to performing such a channel sounding processing with a single receiver message. The above-description is applicable to such examples with the exception that, in these examples, the plurality of groups of combiners 1724-1 to 1724-L may comprise a single group of combiners (or a single combiner where applicable).

Figure 19:
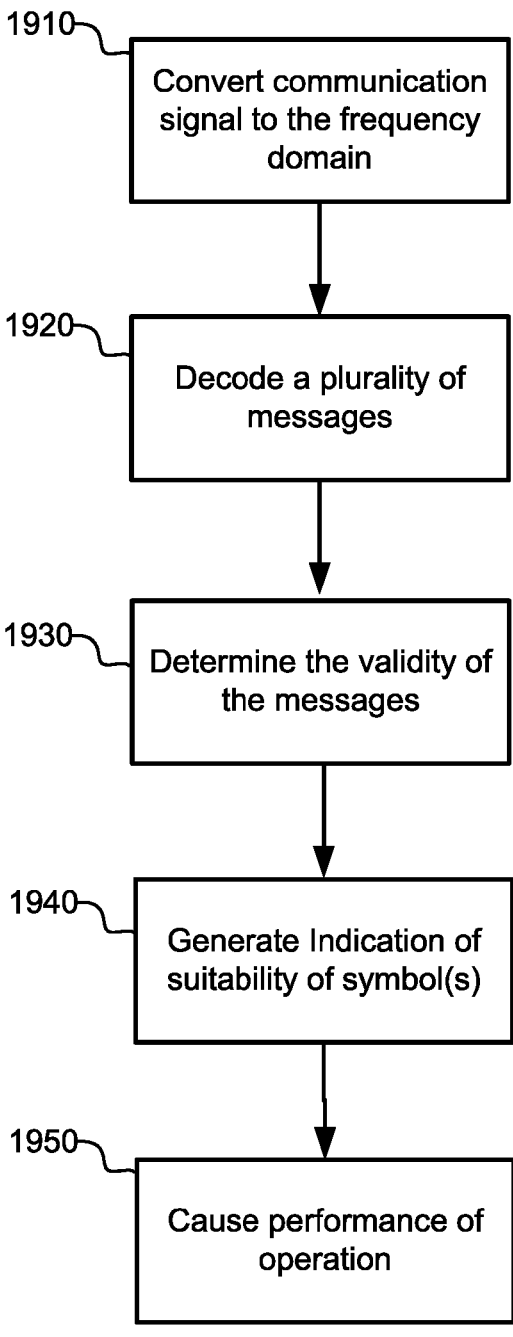
FIG. 19 is a flow diagram of a method of decoding a communication signal.

FIG. 19 depicts a flow diagram 1900 of a method of decoding a received communication signal. The flow diagram 1900 may be performed by, for example, the processing circuitry 1720 of the apparatus 1700 described in relation to FIG. 17, or by any other suitable processing circuitry or apparatus. It is to be understood that any of the techniques or features discussed herein may be combined in any combination with any of the techniques or features discussed in the following in relation to the flow diagram 1900.

The received communication signal may obtained from a receiver (e.g., comprising one or more sensors) in accordance with any of the examples disclosed herein.

At block 1910, the received communication signal is converted to the frequency domain to provide frequency domain data in accordance with examples disclosed herein.

At block 1920, one or more receiver messages may be decoded from the received communication signal depending on the frequency domain data in accordance with examples disclosed herein.

At block 1930, the validity of each of the one or more decoded receiver messages may be determined in accordance with examples disclosed herein.

In some examples, at block 1940, an indication of a suitability for communication over the communication channel by way of which the received communication signal was received of one or more of communication symbols (or the constituent frequency tones thereof) corresponding to the said messages (i.e., used in decoding the said messages) may be generated, in accordance with examples disclosed herein. In some examples, at block 1940, communication of the said indication to another communications node (e.g., the node having transmitted the messages, e.g., the second communications node 112), based on which the other communications node may adapt or reconfigure the communication symbols it uses to encode data, may also be caused. Additionally or alternatively, operation of circuitry configured to attempt to detect symbols indicated to be unsuitable for communication (e.g., and therefore unlikely to be detected) may be paused or stopped.

In some examples, at block 1950, performance of an (e.g., single) operation corresponding to data commonly instructed by one or more of the said messages having been validly decoded (i.e., said messages instructing the same operation) may be caused.

Figure 20:
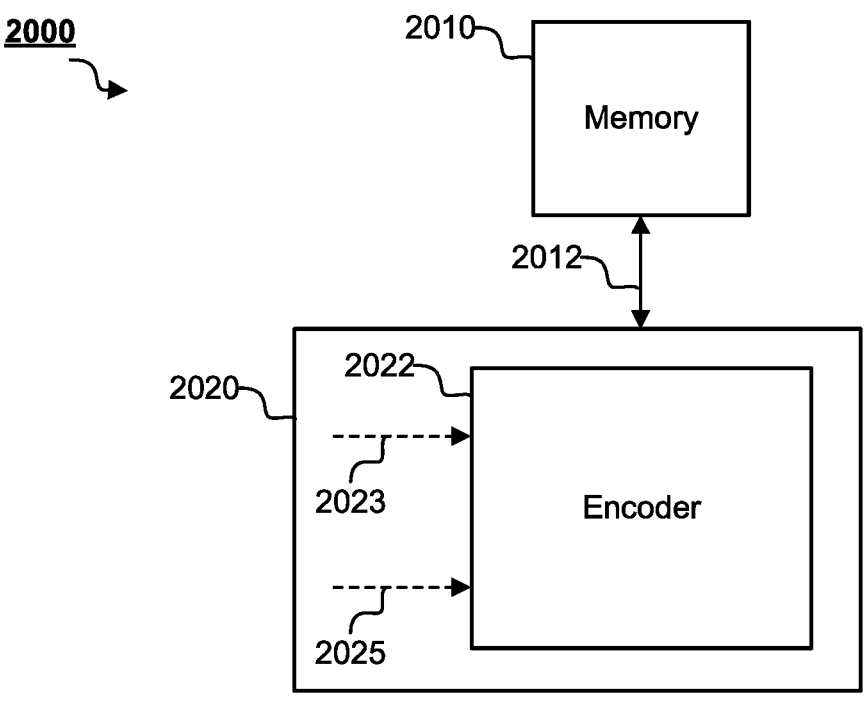
FIG. 20 schematically illustrates an apparatus of a communications node.

FIG. 20 schematically illustrates an apparatus 2000 for encoding communication data. The apparatus 2000 may be apparatus of a communications node such as the first communications node 110 or the second communications node 120. In the following discussion, the apparatus 2000 will be described in more detail under the assumption that the first communications node 110 comprises the apparatus 2000. The second communications node 112 may have an apparatus comprising the same or similar features to those of the apparatus 2000. Indeed, it will be assumed in the following discussion that the second communications node 112 has an apparatus comprising the same features as those discussed in relation to the apparatus 2000. As such, the second communications node 112 will not be described separately here. As will be discussed further below, the apparatus 2000 corresponds to an example of the apparatus 1100 shown in FIG. 11. Accordingly, for the sake of brevity, an exhaustive description of the apparatus 2000 will not be described here. It is to be understood that unless otherwise stated, any one or more of the features discussed in relation to the apparatus 1100 may be combined in any combination with any one or more of the features discussed in the following in relation to the apparatus 2000.

As will be discussed further below, the apparatus 2000 may provide for the encoding of communication data using communication symbols which have been adapted responsive to a channel sounding process identifying one or more communication symbols (or one or more frequency tones) suitable for communication (e.g., on a communication channel on which the encoded communication data is to be transmitted, such as e.g., the drill string 100). The channel sounding process may comprise, for example, the channel sounding process discussed in relation to the apparatus 1700.

The apparatus 2000 may comprise processing circuitry 2020 (corresponding to an example of the processing circuitry 1120 discussed in relation to the apparatus 1100) and a memory 2010 (corresponding to the memory 1110 discussed in relation to the apparatus 1100) communicatively coupled 2012 to the processing circuitry 2020, for example by wired connection(s) or by any other suitable communicative coupling means. The processing circuitry 2020 may be the same processing circuitry as processing circuitry 1720 described above with reference to FIG. 17 or the processing circuitry 2020 may be different processing circuitry from the processing circuitry 1720 described above with reference to FIG. 17. The memory 1910 may be the same memory as the memory 1710 described above with reference to FIG. 17 or the memory 1710 may be a different memory from the memory 1710 described above with reference to FIG. 17.

The functionality of the processing circuitry 2020 is described further below in relation to a functional block comprising an encoder 2222 (which corresponds to an example of the encoder 1122 discussed in relation to the apparatus 1100).

The encoder 2022 may be arranged to encode first communication data in units of individual communication symbols of one or more predefined first communication symbols, in accordance with any of the examples disclosed herein, including but not limited to the examples disclosed in relation to the apparatus 1100.

The encoder 2022 may be arranged to encode second communication data in units of individual communication symbols of one or more predefined second communication symbols, in accordance with any of the examples disclosed herein, including but not limited to the examples disclosed in relation to the apparatus 1100.

It may be that each of the one or more predefined first communication symbols and each of the one or more predefined second communication symbols are based on respective symbol mappings, in accordance with examples disclosed herein. For example, it may be that first symbol mapping data (e.g., stored in the memory 2010) maps each of the one or more first communication symbols to their respective one or more selected frequency tones. Similarly, it may be that the second symbol mapping data (e.g., stored in the memory 2010) maps each of the one or more second communication symbols to their respective one or more selected frequency tones In some examples, prior to encoding the second communication data, the encoder 2022 may be arranged to encode one or more channel sounding messages in units of individual communication symbols, each of the one or more channel sounding messages being encoded by a respective one of one or more predefined communication symbols. Each of the said one or more predefined communications symbols may correspond to any one of the communication symbols disclosed herein, including but not limited to any one of the communication symbols discussed in relation to FIGS. 2*a-c*, and any one of the communication symbols discussed in relation to the apparatus 1700.

It is to be understood that the term "channel sounding" in "one or more channel sounding messages" is merely used to highlight the channel sounding functionality provided by the said messages and does not limit the said messages e.g., in terms of the data they comprise. For example, the one or more channel sounding messages may comprise any type of data, including any type of data disclosed herein. In some examples, the one or more channel sounding messages may be predefined (e.g., as part of a predefined calibration protocol such as the predefined calibration protocol discussed in relation to the apparatus 1700), for example the one or more channel sounding messages may comprise predefined data. In other examples, it may be that the one or more channel sounding messages are not predefined.

In some examples (e.g., where the one or more channel sounding messages are not predefined), each of the one or more channel sounding messages may be encoded in accordance with a predefined error detecting scheme. For example, each of the one or more channel sounding messages may be encoded in accordance with a predefined error detecting scheme depending on any one of: a cyclic redundancy check; a hamming code; a parity check; a checksum; or any other suitable type of error detecting scheme.

In other examples (e.g., where the one or more channel sounding messages are part of a predefined calibration protocol), each of the one or more channel sounding messages may be predefined (e.g., each of the one or more channel sounding messages may comprise respective predefined data such as a respective predefined bitstream) and may be encoded by a corresponding predefined keying pattern of a respective predefined communication symbol, in accordance with examples disclosed herein. For example, each of the one or more channel sounding messages may be encoded by a respective predefined on-off keying pattern of a respective predefined communication symbol, where, for example, each such predefined on-off keying pattern comprises at least one on-keyed instance of the corresponding predefined communication symbol, and at least one off-keyed instance of the corresponding predefined communication symbol.

In some examples, the one or more channel sounding messages may comprise a single channel sounding message encoded by a single keying pattern of a single predefined communication symbol, wherein the single predefined communication symbol comprises a plurality of selected frequency tones. In such examples, the said plurality of different frequency tones may be spread across two or more passbands (e.g., to enable, as part of the above-described channel sounding process, the identification of suitable communication symbols or tones across regions of the frequency spectrum). Such predefined communication symbols may be referred to as "spread-spectrum" or "broadband" symbols.

In some examples, the one or more channel sounding messages may comprise a plurality of channel sounding messages, each of the plurality of channel messages being encoded by a different one of a plurality of (e.g., different) predefined communication symbols, each of the plurality of predefined communication symbols comprising one or more selected frequency tones. In these examples, it may be that the constituent frequency tones of the plurality of different predefined communication symbols are collectively spread across two or more passbands.

In some examples, the first communication data may comprise or consist of the above-mentioned one or more channel sounding messages. In other examples, the one or more channel sounding messages may be separate and distinct from the first communication data and e.g., may be transmitted at a different time than the first communication data.

In some examples, the one or more channel sounding messages may be part of a group of communication messages comprising additional data. The additional data may comprise, for example, payload data including any type of data disclosed herein, such as one or both of: command or control data disclosed herein; and packetized data (e.g., sensor data) disclosed herein. In some examples, the channel sounding messages message(s) may also enable a communications node (e.g., the second communications node 112) to synchronise with the node comprising the apparatus 2000. In such examples, the one or more channel sounding messages may also correspond to synchronisation data.

It may be that both the first communication data and the one or more channel sounding messages are transmitted before the encoding of the second communication data.

It may be that, prior to encoding of the second communication data, the encoder 2022 further obtains a signal 2025 (e.g., from the communications node 112) indicating a suitability for communication of at least one subset of the one or more selected frequency tones of the one or more predefined communication symbols (i.e., used in encoding the one or more channel sounding messages). For example, the encoded channel sounding message(s) may have been transmitted in a signal and the signal (or a corresponding signal e.g., a modified variant of the signal e.g., resulting from noise in or attenuation by a communication channel in which it propagated) may have been received by a receiver of another communications node (such as the second communications node 112). The said other communications node may, depending on the received communication signal (e.g., as part of a predefined calibration protocol, in accordance with any examples disclosed herein) transmit a signal indicating a suitability of at least one subset of the one or more selected frequency tones of the one or more predefined communication symbols using in encoding the channel sounding message(s) for data communication (e.g., on a communication channel on which the channel sounding message(s) were transmitted). For example, the signal may indicate one or more test communication symbols suitable for data communication (e.g., in accordance with the examples disclosed in relation to the apparatus 1700), each of the said test communication symbols comprising one or more (e.g., spectrally contiguous) selected frequency tones (e.g., selected frequency tones directly adjacent to each other in frequency or e.g., separated by one or more guard bands e.g., of predefined spectral width) corresponding to a subset of the one or more predefined communication symbols.

In some examples, the one or more test communication symbols may correspond to one or more of the one or more communication symbols using in encoding the one or more channel sounding messages (e.g., may have the same frequency tone configuration as said symbols). In some examples, the one or more test communication symbols may differ from one or more of the one or more communication symbols used in encoding the channel sounding message(s) (e.g., the one or more test symbols may have different frequency tone configurations from the said symbols, e.g., in accordance with examples disclosed in relation to the apparatus 1700, e.g., each of a plurality of the test symbols may comprise a respective subset frequency tones of a communication symbol used in encoding the channel sounding message(s)). In some examples, the signal may indicate one or more (e.g., individual or e.g., groups of) frequency tones suitable for data communication from the node comprising the apparatus 2000 to the other node by way of the communication channel. For example, the signal may indicate one or more groups of (e.g., spectrally contiguous) frequency tones suitable for data communication from the node comprising the apparatus 2000 to the other node by way of the communication channel.

It may be that the encoder 2020 adapts or replaces the first symbol mapping data to provide the second symbol mapping data depending on (e.g., in response to) the obtained signal indicating the suitability of the at least one subset of the one or more selected frequency tones of the one or more predefined communication symbols used in encoding the channel sounding message(s) for communication with the other node. The second symbol mapping data may be configured such that second communication symbols correspond to communication symbols (e.g., test communication symbols), or comprise frequency tones, indicated by the said signal to be suitable for data communication with the other node. In examples where the signal indicates a plurality of test communication symbols suitable (e.g., having spectrally contiguous frequency tones) for data communication with the other node, the second symbol mapping data may be configured such that one or more second communication symbols comprise a combination of (i.e., the constituent frequency tones of) two or more test communication symbols (e.g., the frequency tones of the two or more validated communication symbols being contiguous or non-contiguous with each other e.g., the two or more test communication symbols spanning neighbouring or disjoint portions of the frequency spectrum). Combining test communication symbols indicated to be suitable for communication in this way to provide one or more second communication symbols may advantageously allow test communication symbols to be relatively narrowband (and therefore provide for a more granular evaluation of the communication channel) while providing for the generation of relatively broadband and noise immune second communication symbol(s) (e.g., having a large number of (e.g. non-contiguous) frequency tones e.g. spread across a broad range of the frequency spectrum).

In some examples, the encoder 2020 may cause communication to another communications node (e.g., the second communications node 112) of indications of the configuration of the second communication symbols in accordance with the second symbol mapping data, for example prior to transmitting communication data based on the second communication symbols.

Figure 21:
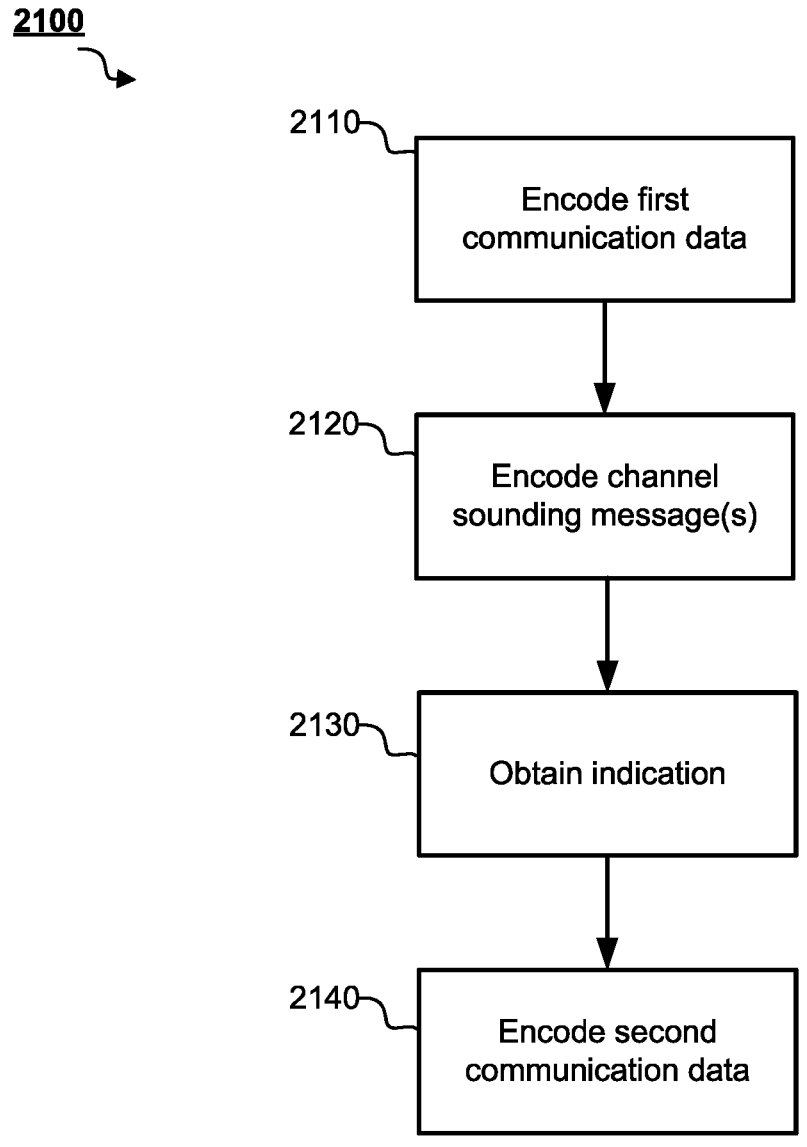
FIG. 21 is a flow diagram of a method of encoding a communication signal.

FIG. 21 depicts a flow diagram 2100 of a method of encoding communication data. The communication data may comprise any type of data including, for example, any type of data disclosed herein or any other type of data. The flow diagram 2100 may be performed by, for example, the processing circuitry 2020 of the apparatus 2000 described above with reference to FIG. 20, or by any other suitable processing circuitry or apparatus. It is to be understood that any of the techniques or features discussed herein may be combined in any combination with any of the techniques or features discussed in the following with reference the flow diagram 2100.

At block 2110, first communication data is encoded in units of individual communication symbols of one or more predefined first communication symbols, in accordance with any of the examples disclosed herein. For example, the encoding of the first communication data may be in accordance with any of the examples of encoding first communication data discussed with reference to FIG. 11 or FIG. 20.

At block 2120, one or more channel sounding messages are encoded in accordance with any of the examples disclosed herein, such as any of the examples of encoding one or more channel sounding messages discussed with reference to FIG. 20. In some examples, each of the one or more channel sounding messages may be encoded using a respective one of one or more predefined communication symbols, each of the one or more predefined communication symbols comprising one or more selected frequency tones. In some examples, the first communication data may comprise or consist of the above-mentioned one or more channel sounding messages. In these examples, block 2120 may not correspond to a separate operation from block 2110. In other examples, the one or more channel sounding messages may be separate and distinct from the first communication data and e.g., the channel sounding messages may be transmitted at a different time than the first communication data. In these examples, block 2120 may correspond to a separate and distinct operation from block 2120.

At block 2130, a signal indicating a suitability for communication of at least one subset of the one or more selected frequency tones of the one or more predefined communication symbols (i.e., used in encoding the one or more channel sounding messages messages) may obtained, in accordance with any of the examples disclosed herein.

At block 2140, second communication data is encoded in units of individual communication symbols of one or more predefined second communication symbols, in accordance with any of the examples disclosed herein. For example, the encoding of the second communication data may be in accordance any of the examples of encoding second communication data discussed with reference to FIG. 11 or FIG. 20. For example, the second communication symbols may depend on symbol mapping data (e.g., first symbol mapping data) that has been updated or replaced (e.g., to provide second symbol mapping data) depending on the said obtained signal, in accordance with examples disclosed herein.

Figure 22:
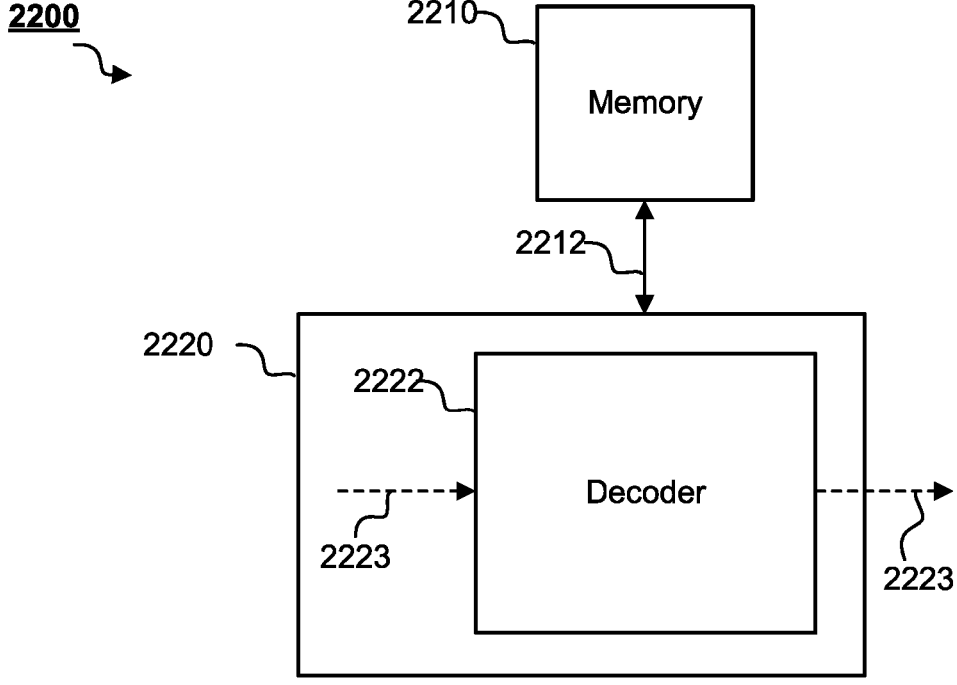
FIG. 22 schematically illustrates an apparatus of a communications node.

FIG. 22 schematically illustrates an apparatus 2200 for decoding communication data. The apparatus 2200 may be apparatus of a communications node such as the first communications node 110 or the second communications node 120. In the following discussion, the apparatus 2200 will be described in more detail under the assumption that the first communications node 110 comprises the apparatus 2200. The second communications node 112 may have an apparatus comprising the same or similar features to those of the apparatus 2200. Indeed, it will be assumed in the following discussion that the second communications node 112 has an apparatus comprising the same features as those discussed in relation to the apparatus 2200. As such, the second communications node 112 will not be described separately here. As will be discussed further below, the apparatus 2200 corresponds to an example of the apparatus 1500 shown in FIG. 15. Accordingly, for the sake of brevity, an exhaustive description of the apparatus 2200 will not be described here. It is to be understood that unless otherwise stated, any one or more of the features discussed in relation to the apparatus 1500 may be combined in any combination with any one or more of the features discussed in the following in relation to the apparatus 2200.

As will be discussed further below, the apparatus 2200 may provide for the decoding of communication data comprising communication symbols which have been adapted responsive to a channel sounding process identifying one or more communication symbols (or one or more frequency tones) suitable for communication (e.g., on a communication channel on which the encoded communication data is to be transmitted, such as e.g., the drill string 100). The channel sounding process may correspond to, for example, the channel sounding process discussed in relation to the apparatus 1700.

The apparatus 2200 may comprise processing circuitry 2220 (corresponding to an example of the processing circuitry 1520 discussed in relation to the apparatus 1500) and a memory 2210 (corresponding to the memory 1510 discussed in relation to the apparatus 1500) communicatively coupled 2212 to the processing circuitry 2220, for example by wired connection(s) or by any other suitable communicative coupling means. The processing circuitry 2220 may be the same processing circuitry as processing circuitry 1720 described above with reference to FIG. 17 or the processing circuitry 2220 may be different processing circuitry from the processing circuitry 1720 described above with reference to FIG. 17. The memory 2210 may be the same memory as the memory 1710 described above with reference to FIG. 17 or the memory 1710 may be a different memory from the memory 1710 described above with reference to FIG. 17.

The functionality of the processing circuitry 2220 is described further below in relation to a functional block comprising a decoder 2222 (which corresponds to an example of the decoder 1522 discussed in relation to the apparatus 1500).

The decoder 2222 may be arranged to decode first communication data in units of individual communication symbols of one or more predefined first communication symbols, in accordance with any of the examples disclosed herein, including but not limited to the examples disclosed in relation to the apparatus 1500.

The decoder 2022 may be arranged to decode second communication data in units of individual communication symbols of one or more predefined second communication symbols, in accordance with any of the examples disclosed herein, including but not limited to the examples disclosed in relation to the apparatus 1500.

In some examples, prior to decoding the second communication data, the decoder 2022 may be arranged to decode one or more channel sounding messages, the channel sounding message(s) being in accordance with any examples disclosed herein, including but not limited to the receiver messages discussed in relation the apparatus 1700 and the channel sounding messages discussed in relation to the apparatus 2000. In some examples, in decoding the channel sounding message(s), the decoder 2222 may detect a keying pattern of one or more predefined (e.g., receiver) communication symbols, in accordance with any examples disclosed herein.

In some examples, the first communication data may comprise or consist of the above-mentioned channel sounding message(s). In other examples, the one or more channel sounding messages may be separate and distinct from the first communication data and e.g., may be received at the decoder 2220 at a different time than the first communication data.

In some examples, the channel sounding message(s) may be part of a group of communication messages comprising additional data. The additional data may comprise, for example, payload data including any type of data disclosed herein, such as one or both of: command or control data disclosed herein; and packetized data (e.g., sensor data) disclosed herein. In some examples, the calibration message(s) may also enable the decoder 2222 to synchronise therewith. In such examples, the channel sounding message(s) may also correspond to synchronisation data.

It may be that the both the first communication data and the one or more channel sounding messages are decoded by the decoder 2222 before the decoding of the second communication data by the decoder 222.

It may be that, prior to decoding the second communication data, depending on (e.g., responsive to) decoding the one or more channel sounding message(s), the decoder 2022 generates and causes transmission (e.g., to the second communications node 112) of an indication of a suitability for data communication from another communication node (e.g., the second communications node 112) to the node comprising the apparatus 2200 (e.g., the first communications node 110) of one or more (e.g., test) communication symbols (e.g., in accordance with the examples disclosed herein), each of the communication symbols comprising one or more (e.g., spectrally contiguous) selected frequency tones.

It may be that, prior to the decoding the second communication data, the decoder 2222 obtains (e.g., based on a signal from the other communications node) a signal indicating a configuration of (e.g., the selected frequency tone(s) of) the one or more second communication symbols used for the encoding of the second communication data. Depending on (e.g., responsive to) obtaining the signal indicating the configuration of the one or more second communication symbols, the decoder 2222 may be arranged to decode the second communication data in units of individual communication symbols of the one or more second communication symbols in accordance with the said indicated configuration.

In this way, the adapted or reconfigured symbols subsequently transmitted by the other communications node to the apparatus 2200 will be better aligned to portions of the spectrum of the communication channel which are suitable for data communication from that node to the node comprising the apparatus 2200. Additionally or alternatively, the apparatus 2200 may pause or stop operation of circuitry (e.g., one or more combiners, as will be discussed below) arranged to detect communication symbols identified (e.g., by way of the above-mentioned channel sounding technique) to be unsuitable for data communication on the communication channel, e.g., to thereby reduce power consumption. In this way, the apparatus 2200 will stop or pause attempting to detect symbols which will no longer be used by the other communications node to communicate data thereto.

Figure 23:
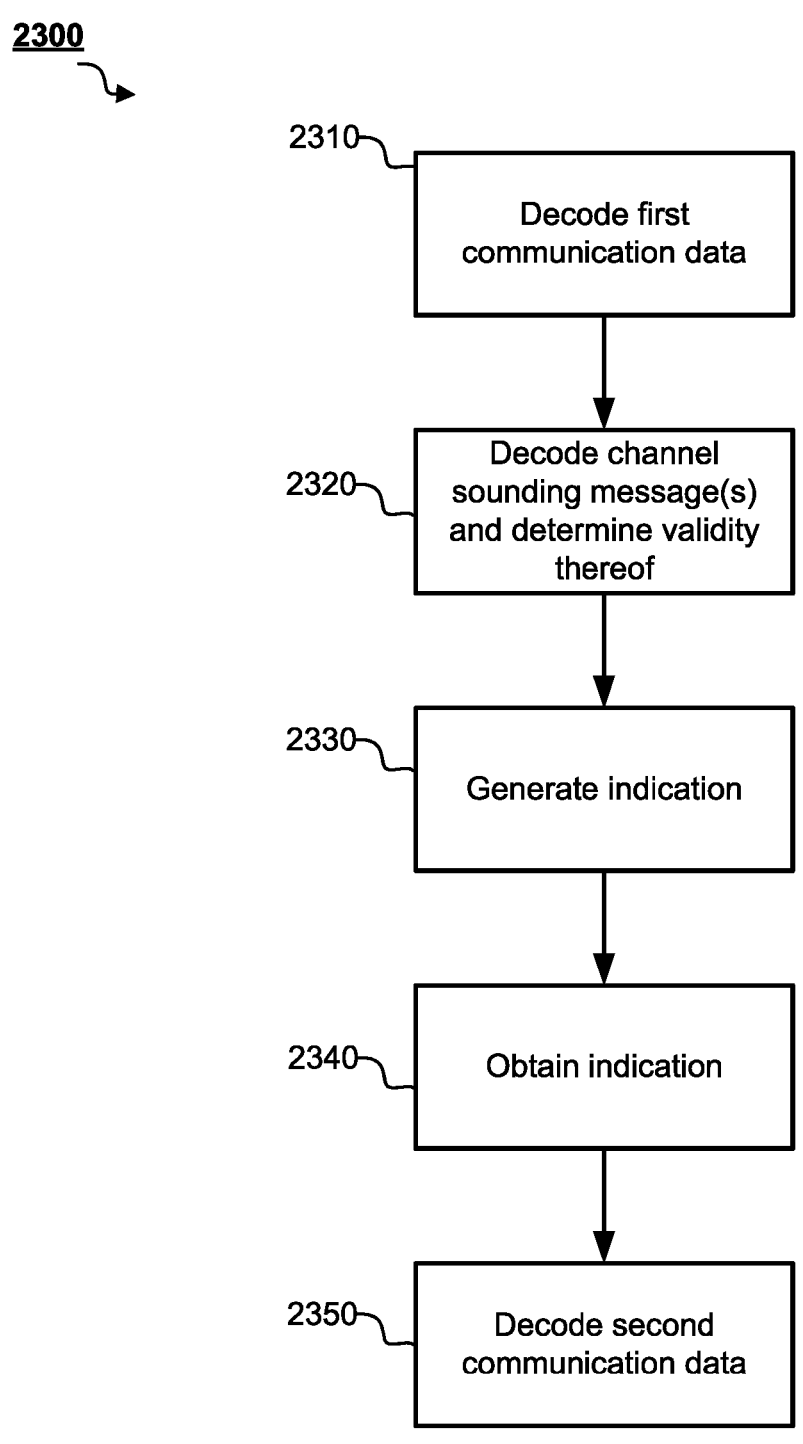
FIG. 23 is a flow diagram of a method of decoding a communication signal.

FIG. 23 depicts a flow diagram 2100 of a method of decoding communication data. The communication data may comprise any type of data including, for example, any type of data disclosed herein or any other type of data. The flow diagram 2300 may be performed by, for example, the processing circuitry 2220 of the apparatus 2200 described above with reference to FIG. 22, or by any other suitable processing circuitry or apparatus. It is to be understood that any of the techniques or features discussed herein may be combined in any combination with any of the techniques or features discussed in the following with reference the flow diagram 2300.

At block 2310, first communication data is decoded in units of in units of individual communication symbols of one or more predefined first communication symbols, in accordance with any of the examples disclosed herein. For example, the encoding of the first communication data may be in accordance any of the examples of encoding first communication data discussed with reference to FIG. 15 or FIG. 22.

At block 2320, one or more channel sounding messages are decoded and the validity thereof determined in accordance with examples disclosed herein, including any of the examples disclosed with reference to FIG. 22. In some examples, the first communication data may comprise or consist of the above-mentioned one or more channel sounding messages. In other examples, the one or more channel sounding messages may be separate and distinct from the first communication data and e.g., may be transmitted at a different time than the first communication data.

At block 2330, signaling of an indication of a suitability for communication of one or more (e.g., test) communication symbols (or one or more frequency tones) may be caused, in accordance with any of the examples disclosed herein, such as those discussed with reference to FIG. 22.

In some examples, at block 2340, an indication of the configuration of one or more second communication symbols used for the encoding of the second communication data may be obtained.

At block 2350, the second communication data may be decoded in units of individual communication symbols of one or more second communication symbols, in accordance with any of the examples disclosed herein. In some examples, at block 2350, the configuration of the one or more second communication symbols may be in accordance with the said indications obtained at block 2340.

The functionality of the processing circuitry described herein may be implemented in software, hardware or firmware or a combination of any of software, hardware and firmware. For example, the processing circuitry may be configured to retrieve and execute computer program instructions stored in memory to thereby provide its functionality described herein. The memory may comprise any suitable memory such as cache memory, random access memory (RAM), read only memory (ROM), flash memory, magnetic or optical disk or any combination thereof.

Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context demands otherwise. In particular, where the indefinite article is used, the specification is to be understood as contemplating plurality as well as singularity, unless the context demands otherwise. All of the features disclosed in this specification (including any accompanying claims, abstract and drawings), and all of the elements of any method or process so disclosed, may be combined in any combination, except combinations where at least some of such features and/or operations are mutually exclusive. Implementations are not restricted to the details of any foregoing examples.

The present disclosure also extends to the following numbered examples.

Example 1. A (e.g., computer-implemented) method of decoding a received communication signal (e.g., based on an acoustic communication signal received by way of a downhole communication channel, such as a solid downhole communication channel), the method comprising:

converting the received communication signal to the frequency domain to provide frequency domain data;

combining amplitudes of one or more selected frequency components of the frequency domain data, the one or more frequency components being selected according to a predefined communication symbol comprising one or more selected frequency tones corresponding to the one or more selected frequency components; and detecting the predefined communication symbol in the received communication signal depending on the combined amplitudes of the one or more selected frequency components of the frequency domain data.

Example 2. Apparatus for decoding a received communication signal (e.g., based on an acoustic communication signal received by way of a downhole communication channel, such as a solid downhole communication channel), the apparatus comprising processing circuitry (e.g., processing circuitry communicatively coupled to a memory), the processing circuitry to:

convert the received communication signal to the frequency domain to provide frequency domain data;

combine amplitudes of one or more selected frequency components of the frequency domain data, the one or more frequency components being selected according to a predefined communication symbol comprising one or more selected frequency tones corresponding to the one or more selected frequency components; and detect the predefined communication symbol in the received communication signal depending on the combined amplitudes of the one or more selected frequency components of the frequency domain data.

Example 3. The method or apparatus of Example 1 or Example 2 wherein the combining the amplitudes of the one or more selected frequency components comprises accumulating amplitudes of the one or more selected frequency components.

Example 4. The method or apparatus of Example 3, wherein accumulating amplitudes of the one or more selected frequency components comprises summing amplitudes of the one or more selected frequency components.

Example 5. The method or apparatus of any one preceding Example wherein the combining is based on at least one combiner having associated symbol indicator data, wherein the symbol indicator data associated with the combiner is updated (or to be updated) based on amplitudes of the selected frequency components of the frequency domain data corresponding to the respective selected frequency tones of the symbol.

Example 6. The method or apparatus of Example 5 wherein the combining is based on a plurality of combiners, each of the plurality of combiners having associated symbol indicator data, wherein the symbol indicator data associated with each of the combiners is updated (or to be updated) based on amplitudes of the selected frequency components of the frequency domain data corresponding to the respective selected frequency tones of the symbol.

Example 7. The method or apparatus of Example 6 wherein the respective combiners of the plurality of combiners are to capture (e.g., different instances of), for example in the associated symbol indicator data, the predefined communication symbol at times (e.g., based on detection time windows) which are temporally offset from each other (e.g., different instances of the predefined communication symbol in the received communication signal at times which are temporally offset from each other). For example, for each of the frequency components corresponding to the respective frequency tones of the predefined communication symbol, it may be that the method comprises updating the symbol indicator data associated with a first one of the plurality of combiners based on frequency domain data obtained from a first portion of the communication signal received during a first detection time window and updating the symbol indicator data associated with a second one of the plurality of combiners based on frequency domain data obtained from a second portion of the communication signal received during a second detection time window temporally offset from (in some cases temporally overlapping) the first detection time window. In this way, the first and second combiners may capture frequency components corresponding to each of the respective frequency tones of the predefined communication symbol based on frequency domain data obtained from portions of the communication signal received during detection time windows which are offset from (in some cases temporally overlapping) each other (e.g., thereby capturing in the symbol indicator data associated with the first and second combiners different instances of the predefined communication symbol in the received communication signal). It may that each of the combiners is to capture (e.g., in the associated symbol indicator data associated with the combiner) the predefined communication symbol in a respective communication stream of the received communication signal. Different combiners of the plurality of combiners may be to capture (e.g., in the symbol indicator data associated with the respective combiner) the predefined communication symbol in different communication streams of the received communication signal. It may be that the communication streams are temporally offset from each other. It may be that the symbol indicator data associated with the respective combiners is updated based on frequency components of the frequency domain data corresponding to the respective selected frequency tones of the symbol obtained from respective portions of the communication signal received for respective time periods which are offset from each other (e.g., to thereby capture (e.g., in the associated symbol indicator data) instances of the predefined communication symbol which are offset from each other in time in the received communication signal). It may be that the method comprises detecting (or the processing circuitry is to detect) different instances of the predefined communication symbol at times (e.g., based on detection time windows) offset from each other, e.g., based on the symbol indicator data of the combiners.

Example 8. The method or apparatus of any one of Examples 5 to 7 comprising decoding (or wherein the processing circuitry is to decode) the received communication signal based on the symbol indicator data.

Example 9. The method or apparatus of any one preceding Example wherein the predefined communication symbol comprises a plurality of selected frequency tones.

Example 10. The method or apparatus of Example 9 wherein the plurality of selected frequency tones comprise temporally overlapping orthogonal or pseudo-orthogonal frequency tones.

Example 11. The method or apparatus of Example 9 or Example 10 wherein the predefined communication symbol comprises a plurality of selected frequency tones provided sequentially in a predefined time sequence.

Example 12. The method or apparatus of Example 11 wherein the combining is based on at least one combiner having associated symbol indicator data, wherein the symbol indicator data associated with the combiner is updated (or to be updated) based on amplitudes of selected frequency components of the frequency domain data corresponding to the respective selected frequency tones of the symbol received at detection times (e.g., based on detection time windows) offset from each other (e.g. based on the predefined time sequence of the symbol, e.g., according to an order in which the predefined frequency tones are provided in the predefined time sequence of the symbol).

Example 13. The method or apparatus of Example 11 or 12 wherein the combining is based on a plurality of combiners each having associated symbol indicator data, the method comprising, for each of the combiners, updating (or the processing circuitry being to update) the associated symbol indicator data based on amplitudes of selected frequency components of the frequency domain data corresponding to the respective selected frequency tones of the symbol received at detection times (e.g., based on detection time windows) offset from each other (e.g., based on the predefined time sequence of the symbol, e.g., according to an order in which the predefined frequency tones are provided in the predefined time sequence of the symbol).

Example 14. The method or apparatus of Example 13 wherein the respective combiners of the plurality of combiners are to capture (or the method comprises capturing by way of respective combiners of the plurality of combiners), for example in the associated symbol indicator data, different instances of the predefined communication symbol which are temporally offset from each other in the received communication signal. For example, for each of the frequency components corresponding to the respective frequency tones of the predefined communication symbol, it may be that the method comprises updating the symbol indicator data associated with a first one of the plurality of combiners based on frequency domain data obtained from a first portion of the communication signal received during a first detection time window and updating the symbol indicator data associated with a second one of the plurality of combiners based on frequency domain data obtained from a second portion of the communication signal received during a second detection time window temporally offset from (in some cases temporally overlapping) the first detection time window. In this way, the first and second combiners may capture frequency components corresponding to each of the respective frequency tones of the predefined communication symbol based on frequency domain data obtained from portions of the communication signal received during detection time windows which are offset from each other (e.g., thereby capturing in the symbol indicator data associated with the first and second combiners different instances of the predefined communication symbol in the received communication signal). For example, it may that each of the combiners is to capture the predefined communication symbol in a respective communication stream of the received communication signal. Different combiners of the plurality of combiners may be to capture the predefined communication symbol in different communication streams of the received communication signal. It may be that the communication streams are temporally offset from each other. For example, the method may comprise updating (or the processing circuitry may be to update) the symbol indicator data associated with the respective combiners based on frequency components of the frequency domain data corresponding to the respective selected frequency tones of the symbol obtained from respective portions of the communication signal received for respective time periods which are offset from (and in some cases temporally overlapping) each other. It may be that the different instances of the predefined communication symbol are temporally offset from each other and temporally overlap each other in the received communication signal (e.g., different instances of the predefined communication symbol may be temporally offset from each other by at least a temporal tone length corresponding to the temporal duration of a tone or set of tones in the communication symbol, or at least by a detection time window).

Example 15. The method or apparatus of any one of Examples 5 to 14 further comprising capturing (or wherein the processing circuitry is to capture), for example in the symbol indicator data of the combiners, a plurality of the predefined communication symbols in the received communication signal at times offset from each other based on the symbol indicator data associated with at least a subset of the plurality of combiners. It may be that the method comprises detecting (or the processing circuitry is to detect) different instances of the predefined communication symbol at times (e.g., based on detection time windows) offset from each other, e.g., based on the symbol indicator data of the combiners.

Example 16. The method or apparatus of any of Examples 5 to 15 wherein each of the combiners comprises a plurality of combiner bins, each of the combiner bins having an associated symbol indicator value, wherein the symbol indicator values associated with the respective combiner bins are updated (or to be updated) based on respective frequency components of the frequency domain data corresponding to the respective selected frequency tones of the symbol.

Example 17. The method or apparatus of Example 16 wherein, for each of said respective frequency tones of the symbol, the symbol indicator values of the respective combiner bins of a (or each) respective combiner are updated based on portions of the communication signal received in respective detection time windows, wherein said detection time windows for said combiner are temporally offset from each other and temporally overlap each other.

Example 18. The method or apparatus of Example 16 or Example 17 wherein, for each of the combiners or for each of the combiner bins, the associated symbol indicator value is updated (or to be updated) based on an amplitude of a selected frequency component of the frequency domain data corresponding to a selected frequency tone of the symbol, the selected frequency component being varied over time according to an order in which the predefined frequency tones are provided in the predefined time sequence.

Example 19. The method or apparatus of Example 18 wherein, for each of the combiners, the associated symbol indicator data comprises (or is to comprise) the combination (e.g., concatenation) of associated symbol indicator values of its combiner bins (e.g., sequentially in a time sequence) after the respective combiner bins have been updated based on the amplitudes of the selected frequency components of frequency domain data corresponding to the frequency tones of the symbol.

Example 20. The method or apparatus of any one of Examples 16 to 19 wherein, for each of the combiners, updating the symbol indicator value associated with each of the plurality of combiner bins comprises changing the associated symbol indicator value of the respective combiner bin by an amount depending on a temporal alignment between a detection time window of a current selected frequency component of the combiner bin and a corresponding frequency tone of the predefined communication symbol in the received communication signal.

Example 21. The method or apparatus of any of Examples 16 to 20 further comprising determining (or wherein the processing circuitry is to determine) that the received communication signal comprises the predefined communication symbol by determining, for each of a plurality of (e.g., consecutive) detection time windows, a combiner bin of the plurality of combiners having the highest associated symbol indicator value, and determining that the received communication signal comprises the predefined communication symbol based on the symbol indicator values associated with the combiner bins having the highest symbol indicator values over the plurality of detection time windows.

Example 22. The method or apparatus of Example 21 wherein the predefined communication symbol is a first predefined communication symbol, wherein the method comprises (or wherein the processing circuitry is to):

attempting (or attempt) to capture a second predefined communication symbol in the received communication signal, the second predefined communication symbol comprising one or more selected frequency tones, the second predefined communication symbol being different from the first predefined communication symbol; and stopping or pausing (or to stop or pause) attempting to capture the second predefined communication symbol in the received communication signal depending on the determination that the received communication signal comprises the first predefined communication symbol.

Example 23. The method or apparatus of any one of Examples 5 to 22 comprising outputting (or wherein the processing circuitry is to output) symbol indicator data associated with different individual combiners of the plurality of combiners in order of increasing detection time offset.

Example 24. The method or apparatus of Example 23 as dependent on Example 21 or Example 22 comprising outputting (or wherein the processing circuitry is to output) symbol indicator data associated with different individual combiners of the plurality of combiners in order of increasing detection time offset depending on the determination that the received communication signal comprises the first predefined communication symbol.

Example 25. The method or apparatus of Example 23 or Example 24 further comprising decoding (or wherein the processing circuitry is to decode) data in the received communication signal based on the output symbol indicator data.

Example 26. The method or apparatus of any one preceding Example wherein the frequency tones of the predefined communication symbol comprise a stepped sequence of discrete frequency tones.

Example 27. The method or apparatus of any one preceding Example wherein the frequency tones of the predefined communication symbol each comprise a discrete frequency tone having a temporal tone length.

Example 28. The method or apparatus of any one preceding Example wherein the method comprises: analysing (or wherein the processing circuitry is to analyse) the phases, amplitudes or phases and amplitudes of the one or more frequency components of the frequency domain data corresponding to the selected frequency tones of the predefined communication symbol to determine one or more amplitude, phase or amplitude and phase compensation factors (e.g., to normalise amplitudes of different frequency components, to restore a phase relationship between the frequency components, or both); and applying (or wherein the processing circuitry is to apply) the one or more amplitude, phase or amplitude and phase compensation factors to one or more selected frequency components of the frequency domain data.

Example 29. The method or apparatus of any one preceding Example wherein the method comprises: analysing (or wherein the processing circuitry is to analyse) the phases, amplitudes or phases and amplitudes of the one or more frequency components of the frequency domain data corresponding to the selected frequency tones of the predefined communication symbol to determine one or more amplitude, phase or amplitude and phase pre-compensation factors (e.g., to normalise amplitudes of different frequency components, to restore a phase alignment between the frequency components, or both); and causing (or wherein the processing circuitry is to cause) a signal indicative of the amplitude, phase or amplitude and phase pre-compensation factors to be transmitted.

Example 30. The method or apparatus of any one preceding Example wherein the received communication signal is received (or to be received) by each of a plurality of sensors.

Example 31. The method or apparatus of Example 30 wherein the combining comprises combining amplitudes of a plurality of selected frequency components of the frequency domain data corresponding to the selected frequency tones of the predefined communication symbol received by different sensors of the plurality of sensors (e.g., according to a prior determination of which sensor of the plurality of sensors is to detect the respective frequency components).

Example 32. The method or apparatus of Example 30 or Example 31 wherein the received communication signal is an acoustic signal and wherein each of the plurality of sensors is operable to detect an acoustic signal.

Example 33. The method or apparatus of Example 32 wherein the plurality of sensors comprises one or more accelerometers.

Example 34. The method or apparatus of any one preceding Example wherein the predefined communication symbol is a first predefined communication symbol, and wherein the method comprises:

obtaining (or the processing circuitry is to obtain) a signal indicative that a second predefined communication symbol different from the first predefined communication symbol is to be received;

converting (or the processing circuitry is to convert) a second received communication signal to the frequency domain to provide second frequency domain data;

combining (or the processing circuitry is to combine) amplitudes of one or more selected frequency components of the second frequency domain data, the one or more frequency components of the second frequency domain data being selected according to the second predefined communication symbol comprising one or more selected frequency tones corresponding to the one or more selected frequency components; and detecting (or the processing circuitry is to detect) the predefined second communication symbol in the second received communication signal depending on the combined amplitudes of the one or more selected frequency components of the second frequency domain data.

Example 35. The method or apparatus of Example 34 wherein the combining amplitudes of one or more selected frequency components of the second frequency domain data is based on a second plurality of combiners, wherein the respective combiners of the second plurality of combiners are to capture (e.g., different instances of) the predefined communication symbol at times (e.g., based on detection time windows) which are temporally offset from each other (e.g., different instances of the predefined communication symbol which are offset from each other in the received communication signal). For example it may be that each of the second plurality of combiners have associated symbol indicator data, wherein the symbol indicator data associated with each of the combiners of the second plurality of combiners is updated based on amplitudes of selected frequency components of the frequency domain data corresponding to the respective selected frequency tones of the second symbol. It may be that the symbol indicator data associated with the combiners of the second plurality are updated based on amplitudes of selected frequency components of the frequency domain data corresponding to the respective selected frequency tones of the second symbol obtained from portions of the communication signal received at detection times (e.g., based on detection time windows) offset from each other according to an order in which the predefined frequency tones are provided in a predefined time sequence of the second predefined communication symbol. It may be that the method comprises updating the symbol indicator data associated with the respective combiners based on frequency components of the frequency domain data corresponding to the respective selected frequency tones of the symbol obtained from respective portions of the communication signal received for respective time periods which are offset from each other.

Example 36. The method or apparatus of any one preceding Example wherein the received communication signal is decoded (or to be decoded) in units of individual predefined communication symbols, each of the individual predefined communication symbols comprising one or more selected frequency tones.

Example 37. The method or apparatus of Example 36 performed by a decoder (or wherein the processing circuitry comprises or consists of a decoder), wherein a smallest unit of information decodable by the decoder is a predefined communication symbol.

Example 38. The method or apparatus of any one preceding Example further comprising: analysing (or wherein the processing circuitry is to analyse) the frequency domain data to determine one or more passbands which are suitable for communication; and causing (or the processing circuitry is to cause) transmission of a signal indicative of the one or more passbands being suitable for communication.

Example 39. The method or apparatus of Example 38 further comprising: decoding (or wherein the processing circuitry is to decode) a further received communication signal, the further received communication signal comprising one or more frequency components in at least one of the one or more passbands indicated as being suitable for communication.

Example 40. The method or apparatus of any one preceding Example further comprising: analysing (or wherein the processing circuitry is to analyse) the frequency domain data to determine one or more passbands which are unsuitable for communication; and causing (or wherein the processing circuitry is to cause) transmission of a signal indicative of the one or more passbands being unsuitable for communication.

Example 41. The method or apparatus of Example 40 further comprising: decoding (or wherein the processing circuitry is to decode) a further received communication signal, the further received communication signal omitting frequency components in the one or more passbands indicated as being unsuitable for communication.

Example 42. The method or apparatus of any one preceding Example comprising: for each of a plurality of different portions of the received communication signal, combining (or wherein the processing circuitry is to combine) amplitudes of one or more selected frequency components of the frequency domain data corresponding to that portion of the received communication signal to thereby generate respective symbol indicator data for that portion, the one or more selected frequency components being selected according to the predefined communication symbol; decoding (or wherein the processing circuitry is to decode) a message depending on the symbol indicator data for the said portions; determining (or wherein the processing circuitry is to determine) a validity of the message; and generating (or wherein the processing circuitry is to generate) an indication of a suitability of the predefined communication symbol for communication depending on the determined validity of the message.

Example 43. The method or apparatus of Example 42, wherein decoding the message in the plurality of different portions of the received communication signal comprises detecting (or wherein the processing circuitry is to detect) a keying pattern (e.g., an on-off keying pattern) of the predefined communication symbol in the plurality of different portions of the received communication signal depending on the symbol indicator data for the said portions.

Example 44. The method or apparatus of Example 42 or Example 43, wherein the determining the validity of the decoded message comprises applying (or wherein the processing circuitry is to apply) an error detection check to the said message.

Example 45. The method or apparatus of Example 44, wherein the error detection check is in accordance with a predefined error detecting scheme, the predefined error detecting scheme depending on any one of: a cyclic redundancy check; a hamming code; a parity check; a checksum.

Example 46. The method or apparatus of any of Examples 42 to 45, wherein determining the validity of the decoded message comprises determining (or wherein the processing circuitry is to determine) a correspondence between the decoded message and a predefined message associated therewith (e.g., associated with the predefined communication symbol corresponding to the decoded message).

Example 47. The method or apparatus of Example 46, wherein the decoded message is determined to be invalid depending on the decoded message not corresponding to the predefined message associated therewith.

Example 48. The method or apparatus of Example 46 or Example 47, wherein the decoded message is determined to be valid depending on the decoded message corresponding to the predefined message associated therewith.

Example 49. The method or apparatus of any one of Examples 42 to 48, wherein the indication of the suitability of the predefined communication symbol for communication indicates: the predefined communication symbol to be unsuitable for communication if the decoded message is determined to be invalid; or the predefined communication symbol to be suitable for communication if the decoded message is determined to be valid.

Example 50. The method or apparatus of any one of Examples 42 to 49, further comprising storing (or wherein the processing circuitry is to cause storage of) the indication of the suitability of the predefined communication symbol for communication.

Example 51. The method or apparatus of any one of Examples 42 to 50, further comprising causing (or wherein the processing circuitry is to cause) communication of the indication of the suitability of the predefined communication symbol (e.g., from a first communication node, such as a first communication node which received the communication signal, e.g., to a second communication node, such as a node which transmitted the communication signal).

Example 52. The method or apparatus of any one of Examples 42 to 51, wherein the combining comprises at least one combiner (e.g., implemented by the processing circuitry) attempting to capture the predefined communication symbol, the method further comprising (or wherein the processing circuitry is further to) stopping (stop) or pausing (pause) the combiner from attempting to capture the predefined communication symbol depending on the indication of the suitability of the predefined communication symbol for communication indicating the predefined communication symbol to be unsuitable for communication.

Example 53. The method or apparatus of any one of Examples 42 to 52, wherein each of the plurality of different portions of the received communication signal has a duration longer than or substantially equal to a symbol length of the predefined communication symbol.

Example 54. The method or apparatus of any one of Examples 42 to 53, wherein the predefined communication symbol comprises or consists of a plurality of spectrally contiguous frequency tones.

Example 55. The method or apparatus of any one of Examples 42 to 54, wherein the arrangement of the plurality of different portions of the received communication signal is predefined.

Example 56. The method or apparatus of any one of Examples 42 to 55, wherein each of the said portions of the received communication signal comprises a plurality of sub-portions of the communication signal detected during a plurality of temporally non-contiguous detection time windows in accordance with a predefined mapping (e.g., associated with the predefined communication symbol).

Example 57. The method or apparatus of any one preceding Example, wherein the predefined communication symbol is one of a plurality of predefined communication symbols, the method further comprising: decoding (or wherein the processing circuitry is to decode), in the received communication signal, a respective message for each predefined communication symbol of the plurality of predefined communication symbols; and determining (or wherein the processing circuitry is to determine) a validity of each of the decoded messages.

Example 58. The method or apparatus of Example 57, further comprising: for each of one or more of the plurality of predefined communication symbols, generating (or wherein the processing circuitry is to generate) an indication of a suitability of the said symbol for communication depending on the determined validity of the respective message corresponding to that symbol.

Example 59. The method or apparatus of Example 57 or 58, further comprising: causing (or wherein the processing circuitry is to cause) (e.g., a single) performance of an operation instructed by one or more of the messages determined to be valid.

Example 60. The method or apparatus of any one of Examples 57 to 59, wherein decoding the respective message for each predefined communication symbol of the plurality of predefined communication symbols comprises: for each of a plurality of different portions of the received communication signal, combining (or wherein the processing circuitry is to combine) amplitudes of one or more selected frequency components of the frequency domain data corresponding to that portion of the received communication signal to thereby generate respective symbol indicator data for that portion, the one or more selected frequency components being selected according to that predefined communication symbol; and decoding (or wherein the processing circuitry is to decode) the message for that predefined communication symbol in the plurality of different portions of the received communication signal depending on the symbol indicator data for the said portions.

Example 61. The method or apparatus of Example 60, wherein decoding the said message for that predefined communication symbol in the plurality of different portions of the received communication signal depending on the symbol indicator data for the said portions comprises: detecting (or wherein the processing circuitry is to detect) a keying pattern of that predefined communication symbol in the plurality of different portions of the received communication signal depending on the symbol indicator data for the said portions.

Example 62. The method or apparatus of Example 61, wherein the keying pattern is an on-off keying pattern.

Example 63. The method or apparatus of any one of Examples 57 to 62, wherein the determining the validity of each of the decoded messages comprises applying (or wherein the processing circuitry is to apply) an error detection check to each of the said messages.

Example 64. The method or apparatus of Example 63, wherein the error detection check is in accordance with a predefined error detecting scheme, the predefined error detecting scheme depending on any one of: a cyclic redundancy check; a hamming code; a parity check; a checksum.

Example 65. The method or apparatus of any one of Examples 57 to 64, wherein determining the validity of each of the decoded messages comprises determining (or wherein the processing circuitry is to determine) a correspondence between each of the decoded messages and a respective predefined message associated therewith (e.g., associated with the predefined communication symbol corresponding to that message).

Example 66. The method or apparatus of Example 65, wherein a decoded message is determined to be invalid depending on the said decoded message not corresponding to the predefined message associated therewith.

Example 67. The method or apparatus of Example 65 or Example 66, wherein a decoded message is determined to be valid depending on the said decoded message corresponding to the predefined message associated therewith.

Example 68. The method of any one of Examples 58-67, further comprising storing (or wherein the processing circuitry is to cause storage of) the said indication.

Example 69. The method or apparatus of any one of Examples 58-68, further comprising causing (or wherein the processing circuitry is to cause) communication of the said indication (e.g., from a first communication node, such as a first communication node which received the communication signal, e.g., to a second communication node, such as a communication node which transmitted the communication signal).

Example 70. The method or apparatus of any one of Examples 60 to 69, wherein, for each of the plurality of predefined communication symbols, the combining comprises at least one respective combiner (e.g., implemented by the processing circuitry) attempting to capture that predefined communication symbol, the method further comprising (or wherein the processing circuitry is further to) stopping (stop) or pausing (pause) the said combiner from attempting to capture that predefined communication symbol depending on the indication indicating that predefined communication symbol to be unsuitable for communication.

Example 71. The method or apparatus of any one of Examples 57 to 70, wherein, for each of the plurality of predefined communication symbols, each of the said portions of the received communication signal has a duration longer than or substantially equal to a symbol length of that predefined communication symbol.

Example 72. The method or apparatus of any one of Examples 57 to 71, wherein each of the plurality of predefined communication symbols comprises or consists of a respective plurality of spectrally contiguous frequency tones.

Example 73. The method or apparatus of any one of Examples 60 to 72, wherein the arrangement of the plurality of different portions of the received communication signal is predefined.

Example 74. The method or apparatus of any one of Examples 60 to 73, wherein, for each of one or more of the plurality of predefined communication symbols, each of the said portions of the received communication signal comprises a plurality of sub-portions of the communication signal detected during a plurality of temporally non-contiguous detection time windows in accordance with a predefined mapping associated with the respective symbol.

Example 75. A computer program product comprising computer program instructions for causing processing circuitry to perform in accordance with the processing circuitry of the apparatus or to cause performance of the method according to any one of Examples 1 to 74, or any one of Examples 139 to 150.

Example 76. A non-transitory computer readable medium comprising executable instructions for causing processing circuitry to perform in accordance with the processing circuitry of the apparatus or to cause performance of the method according to any one of Examples 1 to 74, or any one of Examples 139 to 150.

Example 77. A (e.g., computer-implemented) method of encoding communication data (e.g., for acoustic communication by way of a downhole communication channel, such as a solid downhole communication channel), the method comprising:

encoding first communication data in units of individual communication symbols of one or more predefined first communication symbols, the first communication symbols each comprising one or more selected frequency tones; and encoding second communication data in units of individual communication symbols of one or more predefined second communication symbols, the second communication symbols each comprising one or more selected frequency tones, the one or more predefined second symbols being different from the one or more predefined first symbols, wherein each of the first communication symbols, each of the second communication symbols, or each of the first and each of the second communication symbols comprise a plurality of selected frequency tones, and wherein encoding at least one of the first communication data and the second communication data comprises encoding the respective communication data based on a plurality of different communication symbols.

Example 78. Apparatus for encoding communication data (e.g., for acoustic communication by way of a downhole communication channel, such as a solid downhole communication channel), the apparatus comprising processing circuitry to:

encode first communication data in units of individual communication symbols of one or more predefined first communication symbols, the first communication symbols each comprising one or more selected frequency tones; and encode second communication data in units of individual communication symbols of one or more predefined second communication symbols, the second communication symbols each comprising one or more selected frequency tones, the one or more predefined second symbols being different from the one or more predefined first symbols;

wherein each of the first communication symbols, each of the second communication symbols, or the each of the first and each of the second communication symbols comprise a plurality of selected frequency tones; and wherein encoding at least one of the first communication data and the second communication data comprises encoding the respective communication data based on a plurality of different communication symbols.

Example 79. A (e.g., computer-implemented) method of decoding communication data (e.g., obtained from an acoustic communication signal received by way of a downhole communication channel, such as a solid downhole communication channel), the method comprising:

decoding first communication data in units of individual communication symbols of one or more predefined first communication symbols, the first communication symbols each comprising one or more selected frequency tones; and decoding second communication data in units of individual communication symbols of one or more predefined second communication symbols, the second communication symbols each comprising one or more selected frequency tones, the one or more predefined second symbols being different from the one or more predefined first symbols, wherein each of the first communication symbols, each of the second communication symbols, or the each of the first and each of the second communication symbols comprise a plurality of selected frequency tones, and wherein decoding at least one of the first communication data and the second communication data comprises decoding the respective communication data based on a plurality of different communication symbols.

Example 80. Apparatus for decoding communication data (e.g., obtained from an acoustic communication signal received by way of a downhole communication channel, such as a solid downhole communication channel), the apparatus comprising processing circuitry to:

decode first communication data in units of individual communication symbols of one or more predefined first communication symbols, wherein the first communication symbols each comprise one or more selected frequency tones; and decode second communication data in units of individual communication symbols of one or more predefined second communication symbols, wherein the second communication symbols each comprise one or more selected frequency tones, the one or more predefined second symbols being different from the one or more predefined first symbols, wherein each of the first communication symbols, each of the second communication symbols, or the each of the first and each of the second communication symbols comprise a plurality of selected frequency tones, and wherein decoding at least one of the first communication data and the second communication data comprises decoding the respective communication data based on a plurality of different communication symbols.

Example 81. The method or apparatus of any of Examples 77 to 80 wherein the first communication data comprises a first message and wherein the second communication data comprises a second message.

Example 82. The method or apparatus of any one of Examples 77 to 81 wherein one or both of the first communication symbols and the second communication symbols each comprise a respective plurality of selected frequency tones in a predefined time sequence.

Example 83. The method or apparatus of any one of Examples 77 to 82 wherein the first communication symbols each comprise a plurality of selected frequency tones comprising a stepped sequence of (e.g., discrete) frequency tones.

Example 84. The method or apparatus of any one of Examples 77 to 83 wherein the one or more predefined first communication symbols each comprise a respective plurality of selected frequency tones, each of the selected frequency tones comprising a (e.g., discrete) frequency tone having a temporal tone length.

Example 85. The method or apparatus of any one of Examples 77 to 84 wherein the one or more predefined second communication symbols each comprises a respective plurality of selected frequency tones comprising a stepped sequence of (e.g., discrete) frequency tones.

Example 86. The method or apparatus of any one of Examples 77 to 85 wherein the one or more predefined second communication symbols each comprises a respective plurality of selected frequency tones, each of the selected frequency tones comprising a (e.g., discrete) frequency tone having a temporal tone length.

Example 87. The method or apparatus of any one of Examples 77 to 86 wherein the one or more predefined first communication symbols are defined prior to encoding the first communication data and the one or more predefined second communication symbols are defined prior to encoding the second communication data.

Example 88. The method or apparatus of any one of Examples 77 to 87 wherein the one or more predefined first communication symbols comprises a first number of (e.g., different) communication symbols, each of the first number of (e.g., different) communication symbols comprising a respective one or more selected frequency tones, wherein the one or more predefined second communication symbols comprises a second number of (e.g., different) communication symbols, each of the second number of (e.g., different) communication symbols comprising a respective one or more selected frequency tones, wherein the first number is not equal to the second number.

Example 89. The method or apparatus of any one of Examples 77 to 88 wherein each of the one or more predefined second communication symbols comprise a different one or more selected frequency tones from the one or more predefined first communication symbols.

Example 90. The method or apparatus of Example 89 wherein the first communication symbols each have a different number of frequency tones from the second communication symbols.

Example 91. The method or apparatus of Example 90 wherein the selected frequency tones of the respective second communication symbols are orthogonal or pseudo-orthogonal to the selected frequency tones of the respective first communication symbols.

Example 92. The method or apparatus of any one of Examples 77 to 89 wherein a communication symbol of the first communication symbols and a communication symbol of the second communication symbols each comprise a respective plurality of selected frequency tones provided sequentially in a predefined time sequence, and wherein the symbol of the first communication symbols and the symbol of the second communication symbols comprise a same group of selected frequency tones provided in a different time sequence order.

Example 93. The method or apparatus of any one of Examples 77 to 92, wherein encoding the first communication data comprises (or is to comprise) encoding the first communication data by way of a first keying method and wherein encoding the second communication data comprises (or is to comprise) encoding the second communication data by a second keying method different from the first keying method.

Example 94. The method or apparatus of Example 93 wherein one of the first and second keying methods comprises on-off keying of the corresponding one or more predefined first or second communication symbols.

Example 95. The method or apparatus of Example 94 wherein the on-off keying is to communicate one bit of information per individual communication symbol.

Example 96. The method or apparatus of any one of Examples 93 to 95 wherein one of the first and second keying methods comprises multi-bit keying, the multi-bit keying comprising communicating n bits of information per individual communication symbol by encoding the respective communication data based on at least $2^n$ different communication symbols (e.g., where n is a positive integer value).

Example 97. The method or apparatus of any one of Examples 77 to 96 performed by an encoder (or wherein the processing circuitry comprises an encoder), wherein a smallest unit of information encodable by the encoder is an individual communication symbol.

Example 98. The method or apparatus of any one of Examples 77 to 97, wherein the one or more predefined first communication symbols each comprise a plurality of selected frequency tones in one or more predefined passbands of a communication channel.

Example 99. The method or apparatus of any one of Examples 77 to 98, wherein the one or more predefined second communication symbols each comprise a plurality of selected frequency tones in one or more predefined passbands of a communication channel.

Example 100. The method or apparatus of any one of Examples 77 to 99 wherein the one or more selected frequency tones of the first communication symbols, the one or more selected frequency tones of the second communication symbols, or the one or more selected frequency tones of the first communication symbols and the one or more selected frequency tones of the second communication symbols correspond to frequencies at which a communication channel is (e.g., empirically) (pre) determined to provide low noise, low attenuation or low noise and low attenuation.

Example 101. The method or apparatus of any one of Examples 77 to 100 wherein the first communication symbols each comprise a plurality of selected frequency tones, the method comprising causing (or the processing circuitry is to cause) transmission of the selected frequency tones of the respective first communication symbols (e.g., individually) in a time sequence, and wherein the second communication symbols each comprise a plurality of selected frequency tones, the method comprising causing (or the processing circuitry being to cause) transmission of the selected frequency tones of the respective second communication symbols such that they overlap with each other in time (e.g. causing transmission of the selected frequency tones of a symbol simultaneously, i.e., in parallel with each other).

Example 102. The method or apparatus of any one of Examples 77 to 101, wherein the first communication symbols each comprise a plurality of selected frequency tones, the method comprising causing (or the processing circuitry being to cause) transmission of at least first and second sets of the selected frequency tones of a respective first communication symbol sequentially in a time sequence, the first and second sets of selected frequency tones of the respective first communication symbol each comprising at least respective first and second frequency tones of the selected frequency tones of the first communication symbol, wherein the at least first and second frequency tones are transmitted such that they overlap with each other in time (e.g., a respective plurality of the selected frequency tones transmitted simultaneously with each other).

Example 103. The method or apparatus of any one of Examples 77 to 102 wherein the first communication symbols are based on first symbol mapping data and the second communication symbols are based on second symbol mapping data, wherein the method comprises:

adapting (or wherein the processing circuitry is to adapt) the first symbol mapping data to provide the second symbol mapping data, or replacing (or wherein the processing circuitry is to replace) the first symbol mapping data with the second symbol mapping data to provide the second symbol mapping data.

Example 104. The method or apparatus of Example 103, wherein the method comprises adapting (or the processing circuitry is to adapt) the first symbol mapping data to provide the second symbol mapping data, or replacing (or the processing circuitry is to replace) the first symbol mapping data with the second symbol mapping data to provide the second symbol mapping data, depending on (e.g., in response to) any one or more of: a determined change in an operating condition of a communication channel; a determined change in noise (e.g., noise level) on a communication channel; a determined change of attenuation (e.g., attenuation level) on a communication channel; one or more signals previously communicated on a communication channel; a determined change in a type of communication.

Example 105. The method or apparatus of Example 103 or Example 104, wherein the second symbol mapping data comprises a tone weighting for weighting (e.g., differently) amplitudes or phases of the respective one or more selected frequency tones of each of the one or more predefined second communication symbols, the tone weighting depending on any one or more of: the determined change in the operating condition of the communication channel; the determined change in noise (e.g., noise level) on the communication channel; the determined change of attenuation (e.g., attenuation level) on the communication channel; the one or more signals previously communicated on the communication channel; the determined change in a type of communication.

Example 106. The method or apparatus of any one of Examples 103 to 105 wherein the method comprises: obtaining (or wherein the processing circuitry is to obtain) a signal indicating one or more frequency passbands which are suitable or unsuitable for communication; and adapting (or the processing circuitry is to adapt) the first symbol mapping data to provide the second symbol mapping data, or replacing (or the processing circuitry is to adapt) the first symbol mapping data with the second symbol mapping data to provide the second symbol mapping data, depending on the received signal indicating the one or more frequency passbands which are suitable or unsuitable for communication.

Example 107. The method or apparatus of Example 106 wherein the one or more second communication symbols comprise one or more frequency tones in one or more frequency passbands indicated as being suitable for communication or wherein the one or more second communication symbols omit frequency tones in one or more frequency passbands indicated as being unsuitable for communication.

Example 108. The method or apparatus of any one of Examples 77 to 107 wherein the method comprises: obtaining (or the processing circuitry is to obtain) a signal indicative of one or more amplitude, phase or amplitude and phase pre-compensation factors; and applying (or the processing circuitry is to apply) amplitude, phase or amplitude and phase pre-compensation to one or more frequency components of one or more predefined first communication symbols or to one or more frequency components of one or more predefined second communication symbols based on the indicated amplitude, phase or amplitude and phase pre-compensation factors.

Example 109. The method or apparatus of Example 108 wherein the amplitude, phase or amplitude and phase pre-compensation factors relate to the respective one or more frequency components of the one or more predefined first or second communication symbols.

Example 110. The method or apparatus of any one of Examples 77 to 109 comprising causing (or wherein the processing circuitry is to cause) transmission of the encoded first and second communication data such that the transmitted encoded first and second communication data overlap in time with each other (e.g. causing simultaneous transmission of the encoded first and second communication data).

Example 111. The method or apparatus of any one of Examples 77 to 110 comprising causing (or the processing circuitry is to cause) transmission of the encoded second communication data after causing transmission of the encoded first communication data (e.g., so that they do not overlap each other in time).

Example 112. The method or apparatus of any one of Examples 77 to 111 further comprising causing signaling (or wherein the processing circuitry is to cause signaling) to a receiver that communication data is to be encoded based on the second communication symbols (e.g., prior to causing transmission of the encoded second communication data).

Example 113. The method or apparatus of any one of Examples 77 to 112 wherein the one or more first communication symbols comprises a plurality of communication symbols each comprising a respective different one or more selected frequency tones.

Example 114. The method or apparatus of any one of Examples 77 to 113 wherein the one or more second communication symbols comprises a plurality of communication symbols each comprising a respective different one or more selected frequency tones.

Example 115. The method or apparatus of any one of Examples 77 to 114 wherein the first communication data comprises command data for communicating a command.

Example 116. The method or apparatus of any one of Examples 77 to 115 wherein the second communication data comprises (e.g., packetized) sensor data.

Example 117. The method or apparatus of any one of Examples 77 to 116 wherein the first communication data is encoded (or to be encoded) to have a lower bit rate than the encoded second communication data (e.g., by way of the first predefined communication symbols having a greater number of frequency tones per symbol than the second predefined communication symbols, by way of the first predefined communication symbols being temporally longer than the first predefined communication symbols, or both).

Example 118. The method or apparatus of any one of Examples 77 to 117 wherein the first communication symbols are orthogonal or pseudo-orthogonal to the second individual communication symbols.

Example 119. The method or apparatus of any one of Examples 77 to 118 wherein the one or more predefined first communication symbols comprises a plurality of predefined first communication symbols and wherein different symbols of the predefined first communication symbols are orthogonal or pseudo-orthogonal to each other.

Example 120. The method or apparatus of any one of Examples 77 to 119 wherein the one or more predefined second communication symbols comprises a plurality of predefined second communication symbols, and wherein different symbols of the predefined second communication symbols are orthogonal or pseudo-orthogonal to each other.

Example 121. The method or apparatus of any one of Examples 103 to 120, further comprising: encoding (or wherein the processing circuitry is to encode) one or more channel sounding messages in units of individual communication symbols, each of the one or more channel sounding messages being encoded by a respective one of one or more predefined communication symbols, wherein each of the one or more predefined communication symbols comprises one or more selected frequency tones; obtaining (or wherein the processing circuitry is to obtain) a signal indicating a suitability of at least one subset of the one or more selected frequency tones of the one or more predefined communication symbols for communication; and adapting (or wherein the processing circuitry is to adapt) the first symbol mapping data to provide the second symbol mapping data, or replacing (or wherein the processing circuitry is to replace) the first symbol mapping data with the second symbol mapping data, depending on the said signal.

Example 122. The method or apparatus of Example 121, wherein each of the one or more channel sounding messages is encoded in accordance with a predefined error detecting scheme.

Example 123. The method or apparatus of Example 122, wherein the predefined error detecting scheme depends on any one of: a cyclic redundancy check, a hamming code, a parity check, a checksum.

Example 124. The method or apparatus of Example 121, wherein each of the one or more channel sounding messages comprises a respective predefined bit pattern to be encoded by a corresponding predefined keying pattern of a respective predefined communication symbol.

Example 125. The method or apparatus of Example 123, wherein the keying pattern is an on-off keying pattern.

Example 126. The method or apparatus of Example 125, wherein each on-off keying pattern corresponding to each of the respective predefined bit patterns comprises at least one on-keyed instance of the corresponding predefined communication symbol, and at least one off-keyed instance of the corresponding predefined communication symbol.

Example 127. The method or apparatus of any one of Examples 121 to 126, wherein the one or more channel sounding messages comprise a single channel sounding message encoded by a single keying pattern of a single predefined communication symbol, the single predefined communication symbol comprising a plurality of selected frequency tones.

Example 128. The method or apparatus of any one of Examples 121 to 127, wherein the second symbol mapping data maps at least one second communication symbol to one or more frequency tones of the at least one subset of the one or more selected frequency tones indicated to be suitable for communication.

Example 129. The method or apparatus of any one of Examples 121 to 128, further comprising causing (or wherein the processing circuitry is to cause) communication of an indication of the configuration of the frequency tones of the second communication symbols.

Example 130. The method or apparatus of Examples 79 to 129, further comprising: decoding (or wherein the processing circuitry is to decode) one or more messages in units of individual communication symbols, each of the one or more messages being decoded depending on a respective one of one or more predefined communication symbols, wherein each of the one or more predefined communication symbols comprises one or more selected frequency tones; determining (or wherein the processing circuitry is to determine) a validity of each of the one or more decoded messages; and generating (or wherein the processing circuitry is to generate) an indication of a suitability for communication of at least one of the one or more predefined communication symbols depending on the determined validity of at least one decoded message corresponding to the at least one of the one or more predefined communication symbols.

Example 131. The method or apparatus of Example 130, wherein the first communication data comprises the one or more messages.

Example 132. The method or apparatus of Examples 130 or Examples 131, wherein determining the validity of each of the one or more decoded messages comprises applying (or wherein the processing circuitry is to apply) an error detection check to each of the said messages.

Example 133. The method or apparatus of Example 132, wherein the error detection check is in accordance with a predefined error detecting scheme depending on any one of: a cyclic redundancy check; a hamming code; a parity check; a checksum.

Example 134. The method or apparatus of Example 130 or Example 131, wherein determining the validity of each of the one or more decoded messages comprises determining (or wherein the processing circuitry is to determine) a correspondence between each of the one or more decoded messages and a respective predefined message associated therewith.

Example 135. The method or apparatus of any one of Examples 130 to 134, further comprising: causing (or wherein the processing circuitry is to cause) communication of the said indication.

Example 136. The method or apparatus of any one of Examples 130 to 135, further comprising: obtaining (or wherein the processing circuitry is to obtain) a signal indicating a frequency tone configuration of the one or more predefined second communication symbols.

Example 137. A computer program product comprising computer program instructions for causing processing circuitry to perform in accordance with the processing circuitry of the apparatus or to cause performance of the method according to any one of Examples 1 to 136 or 151.

Example 138. A non-transitory computer readable medium comprising executable instructions for causing processing circuitry to perform in accordance with the processing circuitry of the apparatus or to cause performance of the method according to any one of Examples 1 to 136 or 151.

Example 139. The method or apparatus of any one of Examples 1 to 74 wherein the predefined communication symbol comprises a plurality of selected frequency tones provided sequentially in a predefined time sequence, wherein the combining (e.g., by the processing circuitry) is based on (e.g., performed by) a combiner having an associated symbol indicator value, wherein the symbol indicator value associated with the combiner is (e.g., sequentially) updated depending on amplitudes of selected frequency components of the frequency domain data corresponding to the respective selected frequency tones of the symbol (e.g., according to the predefined time sequence of the symbol), and wherein it is determined whether the received communication signal comprises the predefined communication symbol (e.g., determining that the received communication signal comprises the predefined communication symbol) depending on a variation over time (e.g., over a plurality of, e.g. consecutive, detection time windows, each of the detection time windows corresponding to a respective tone of the symbol in the time sequence) of the symbol indicator value associated with the combiner.

Example 140. The method or apparatus of Example 139 wherein it is determined (e.g., by the processing circuitry) that the received communication signal comprises the predefined communication symbol depending on the symbol indicator value associated with the combiner increasing (e.g., depending on a determination that the symbol indicator value associated with the combiner increases) over time (e.g., over a plurality of, e.g. consecutive, detection time windows, each of the detection time windows corresponding to a respective tone of the symbol in the time sequence).

Example 141. The method or apparatus of Example 139 or 140 wherein it is determined (e.g., by the processing circuitry) that the received communication signal comprises the predefined communication symbol depending on the symbol indicator value associated with the combiner increasing (e.g., depending on a determination that the symbol indicator value associated with the combiner increases) over time, wherein the increasing symbol indicator value is indicative that a predefined number of the selected tones of the communication symbol have been detected in the received communication signal (e.g., by way of a predefined number of step increases in the value of the symbol indicator value, e.g., wherein each of the predefined number of step increases are step increases greater than or equal to a predefined threshold quantity).

Example 142. The method or apparatus of Example 141 wherein the predefined number of the selected tones is less than the total number of selected tones in the communication symbol.

Example 143. The method or apparatus of any one of Examples 1 to 74 or 139 to 142 wherein the combining (e.g., by the processing circuitry) is based on (e.g., performed by) a plurality of combiners, each of the plurality of combiners having an associated symbol indicator value, wherein the symbol indicator value associated with each of the combiners is (e.g., sequentially) updated depending on amplitudes of selected frequency components of the frequency domain data corresponding to the respective selected frequency tones of the symbol (e.g., according to the predefined time sequence of the symbol), wherein the respective combiners of the plurality of combiners are to capture the predefined communication symbol at times which are temporally offset from each other, and wherein it is determined whether the received communication signal comprises the predefined communication symbol depending on a variation over time (e.g., over a plurality of, e.g. consecutive, detection time windows, each of the detection time windows corresponding to a respective tone of the symbol in the time sequence) of an onset value, wherein the onset value comprises or consists of the highest symbol indicator value of the symbol indicator values of the plurality of combiners at a given time.

Example 144. The method or apparatus of any one of Examples 1 to 74 or 139 to 143 wherein the combining is based on (e.g., performed by) one or more combiners wherein the combiner, or each of the plurality of combiners, comprises a plurality of combiner bins, each of the combiner bins having an associated symbol indicator value, wherein the symbol indicator values associated with the respective combiner bins are (e.g., sequentially) updated depending on respective frequency components of the frequency domain data corresponding to the respective selected frequency tones of the symbol (e.g., according to the predefined time sequence of the symbol, e.g., at respective times offset from the other combiner bins of the combiner, e.g., the time offsets between combiner bins (or at least between temporally adjacent combiner bins) being less than a temporal tone length or a detection time window corresponding to a respective tone of the symbol in the time sequence).

Example 145. The method or apparatus of Example 144 wherein it is determined (e.g., by the processing circuitry) whether the received communication signal comprises the predefined communication symbol depending on a variation over time (e.g., over a plurality of, e.g. consecutive, detection time windows, each of the detection time windows corresponding to a respective tone of the symbol in the time sequence) of an onset value, wherein the onset value comprises or consists of the highest symbol indicator value of the symbol indicator values of the plurality of combiner bins at a given time.

Example 146. The method or apparatus of any one of Examples 139 to 144 wherein, depending on a determination based on the symbol detection value or the onset value that a combiner is validly detecting a predefined communication symbol in the received communication signal, that combiner is transitioned (e.g., by the processing circuitry) from an onset detection mode to a symbol detection mode in which it is configured to output signals indicative of one or more instances of the predefined communication symbol in the received communication signal.

Example 147. The method or apparatus of any one of Examples 139 to 146 wherein the predefined communication symbol is a first predefined communication symbol and wherein, depending on a determination that the combiner is not validly detecting the first predefined communication symbol in the received communication signal based on the symbol indicator value or the onset value, operation of the first combiner is paused or stopped (e.g., by the processing circuitry) or wherein, depending on a determination that the combiner is validly detecting the first predefined communication symbol in the received communication signal based on the symbol indicator value or the onset value, (e.g., the processing circuitry) operation of a further combiner configured to detect selected frequency tones of a second predefined communication symbol different from the first predefined communication symbol is paused or stopped (e.g., by the processing circuitry).

Example 148. The method or apparatus of Example 147 wherein it is determined (e.g., by the processing circuitry) that a combiner is not validly detecting a predefined communication symbol depending on a determination that another combiner is validly detecting a corresponding (e.g., different) predefined symbol (e.g., based on a corresponding symbol indicator value or onset value associated with the another combiner) (e.g., if only one of the first and second combiners can validly detect a corresponding predefined symbol according to the communication protocol), or depending on a determination that the combiner is not validly detecting the predefined communication symbol based on the symbol indicator value or the onset value.

Example 149. The method or apparatus of any one of Examples 1 to 148 wherein the predefined communication symbol comprises a plurality of sets of selected frequency tones provided sequentially in a time sequence, wherein each of the sets of selected frequency tones of the sequence comprise one or more selected frequency tones (e.g., one or more or each of the sets of selected frequency tones comprise a plurality of selected frequency tones in parallel, e.g., partially or fully overlapping each other in time).

Example 150. The method or apparatus of Example 149 wherein one or more or each of the sets of selected frequency tones comprises one or more selected frequency tones (e.g., a plurality of partially or fully temporally overlapping frequency tones), wherein the combining is based on (e.g., performed by) at least one combiner and wherein, for each of a plurality of detection time windows, a symbol indicator value associated with each of the at least one combiner is updated depending on amplitude(s) (e.g., by summing amplitudes) of selected frequency component(s) of the frequency domain data corresponding to a respective set of selected frequency tones of the sequence of sets in accordance with the communication symbol.

Example 151. The method or apparatus of any one of Examples 77 to 136 wherein encoding the first communication data comprises encoding the first communication data by keying the first communication symbols. It may be that encoding the second communication data comprises encoding the second communication data by keying the second communication symbols.

The invention claimed is:

1. A method of decoding a received communication signal, the method comprising:

converting the received communication signal to a frequency domain to provide frequency domain data;

combining amplitudes of one or more selected frequency components of the frequency domain data, the one or more frequency components being selected according to a predefined communication symbol comprising one or more selected frequency tones corresponding to the one or more selected frequency components; and detecting the predefined communication symbol in the received communication signal depending on the combined amplitudes of the one or more selected frequency components of the frequency domain data, wherein the combining is based on a plurality of combiners, each of the plurality of combiners having associated symbol indicator data, wherein the symbol indicator data associated with each of the combiners is updated based on amplitudes of selected frequency components of the frequency domain data corresponding to the respective selected frequency tones of the symbol, and wherein the respective combiners of the plurality of combiners are to capture the predefined communication symbol at times which are temporally offset from each other.

2. The method of claim 1 comprising decoding the received communication signal based on the symbol indicator data of each of the plurality of combiners.

3. The method of claim 1 wherein the predefined communication symbol comprises a plurality of selected frequency tones.

4. The method of claim 3 wherein the plurality of selected frequency tones comprise temporally overlapping orthogonal or pseudo-orthogonal frequency tones.

5. The method of claim 3 wherein the predefined communication symbol comprises a plurality of selected frequency tones provided sequentially in a predefined time sequence.

6. The method of claim 1 wherein the respective combiners of the plurality of combiners are to capture different instances of the predefined communication symbol which are temporally offset from each other in the received communication signal.

7. The method of claim 6 comprising updating the symbol indicator data associated with the respective combiners based on frequency components of the frequency domain data corresponding to the respective selected frequency tones of the symbol obtained from respective portions of the communication signal received for respective time periods which are offset from each other.

8. The method of claim 1 wherein each of the combiners of the plurality of combiners comprises a plurality of combiner bins, each of the combiner bins of each of the combiners having an associated symbol indicator value, wherein the symbol indicator values associated with the respective combiner bins of each of the combiners are updated based on respective frequency components of the frequency domain data corresponding to the respective selected frequency tones of the symbol.

9. The method of claim 8 wherein, for each of said respective frequency tones of the symbol, the symbol indicator values of the respective combiner bins of each of the combiners of the plurality of combiners are updated based on portions of the communication signal received in respective detection time windows into which the received communication signal is apportioned, wherein said detection time windows are temporally offset from each other and temporally overlap each other.

10. The method of claim 8 further comprising determining that the received communication signal comprises the predefined communication symbol by determining, for each of a plurality of detection time windows, a combiner bin of the plurality of combiners having a highest associated symbol indicator value, and determining that the received communication signal comprises the predefined communication symbol based on the symbol indicator values associated with the combiner bins of the plurality of combiners having the highest symbol indicator values over the plurality of detection time windows.

11. The method of claim 1 comprising outputting symbol indicator data associated with different individual combiners of the plurality of combiners in order of increasing detection time offset.

12. The method of claim 11, further comprising decoding data in the received communication signal based on the output symbol indicator data.

13. The method of claim 1 wherein the method comprises: analysing, prior to the combining amplitudes of the one or more frequency components of the frequency domain data corresponding to the selected frequency tones of the predefined communication symbol, phases, amplitudes or phases and amplitudes of the one or more frequency components of the frequency domain data corresponding to the selected frequency tones of the predefined communication symbol the amplitudes of which are to be combined to determine one or more amplitude, phase or amplitude and phase compensation factors or pre-compensation factors; and applying the one or more amplitude, phase or amplitude and phase compensation factors to one or more selected frequency components of the frequency domain data or causing a signal indicative of the amplitude, phase or amplitude and phase pre-compensation factors to be transmitted.

14. The method of claim 1, wherein the combining amplitudes of the one or more selected frequency components of the frequency domain data, the one or more frequency components being selected according to a predefined communication symbol comprising one or more selected frequency tones corresponding to the one or more selected frequency components comprises:
for each of a plurality of different portions of the received communication signal, combining amplitudes of one or more selected frequency components of the frequency domain data selected according to the predefined communication symbol and corresponding to that portion of the received communication signal to thereby generate respective symbol indicator data for that portion; and wherein the method comprises:
decoding a message depending on the symbol indicator data for the said portions;
determining a validity of the message; and
generating an indication of a suitability of the predefined communication symbol for communication depending on the determined validity of the message.

15. The method of claim 1, wherein the predefined communication symbol is one of a plurality of predefined communication symbols, the method further comprising:
decoding, in the received communication signal, a respective message for each predefined communication symbol of the plurality of predefined communication symbols; and
determining a validity of each of the decoded messages.

16. The method of claim 15, wherein decoding the respective message for each predefined communication symbol of the plurality of predefined communication symbols comprises:
performing the said combining amplitudes for each of a plurality of different portions of the received communication signal by combining amplitudes of one or more selected frequency components of the frequency domain data selected according to that predefined communication symbol and corresponding to that portion of the received communication signal to thereby generate respective symbol indicator data for that portion; and
decoding the message for that predefined communication symbol in the plurality of different portions of the received communication signal depending on the symbol indicator data for the said portions.

17. The method of claim 16, wherein decoding the said message for that predefined communication symbol in the plurality of different portions of the received communication signal depending on the symbol indicator data for the said portions comprises:
detecting a keying pattern of that predefined communication symbol in the plurality of different portions of the received communication signal depending on the symbol indicator data for the said portions.

18. The method of claim 1 wherein each of the plurality of combiners has an associated symbol indicator value, wherein the symbol indicator value associated with each of the combiners is updated depending on amplitudes of selected frequency components of the frequency domain data corresponding to the respective selected frequency tones of the symbol, and wherein the method comprises determining whether the received communication signal comprises the predefined communication symbol depending on a variation over time of an onset value, wherein the onset value comprises or consists of a highest symbol indicator value of the symbol indicator values of the plurality of combiners at a given time.

19. The method of claim 1 wherein each of the plurality of combiners comprises a plurality of combiner bins, each of the combiner bins of each of the combiners having an associated symbol indicator value, wherein the symbol indicator values associated with the respective combiner bins are updated depending on respective frequency components of the frequency domain data corresponding to the respective selected frequency tones of the symbol, wherein the method comprises determining whether the received communication signal comprises the predefined communication symbol depending on a variation over time of an onset value, wherein the onset value comprises or consists of a highest symbol indicator value of the symbol indicator values of the plurality of combiner bins of the plurality of combiners at a given time.

20. Apparatus for decoding a received communication signal, the apparatus comprising processing circuitry communicatively coupled to a memory, the processing circuitry to:
convert the received communication signal to a frequency domain to provide frequency domain data;
combine amplitudes of one or more selected frequency components of the frequency domain data, the one or more frequency components being selected according to a predefined communication symbol comprising one or more selected frequency tones corresponding to the one or more selected frequency components; and detect the predefined communication symbol in the
received communication signal depending on the com-
bined amplitudes of the one or more selected frequency
components of the frequency domain data, wherein the combining is based on a plurality of combiners, each of the plurality of combiners having asso-
ciated symbol indicator data, wherein the symbol indi-
cator data associated with each of the combiners is to
be updated based on amplitudes of selected frequency
components of the frequency domain data corresponding to the respective selected frequency tones of the
symbol, and wherein the respective combiners of the plurality of
combiners are to capture the predefined communication
symbol at times which are temporally offset from each
other.

\* \* \* \* \*